June 27, 1950 J. O'D. SHEPHERD 2,513,112
DATA RECORDING SYSTEM EMPLOYING
RECORD CONTROLLED APPARATUS
Filed July 19, 1944 11 Sheets-Sheet 1
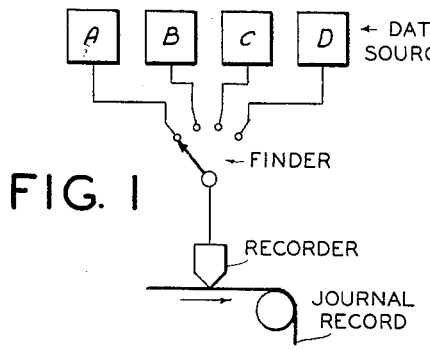
FIG. 1
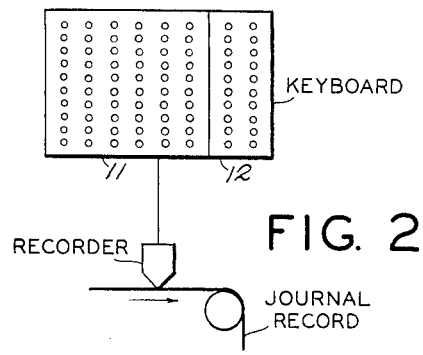
FIG. 2
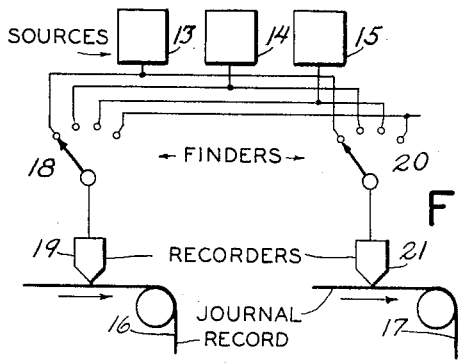
FIG. 3
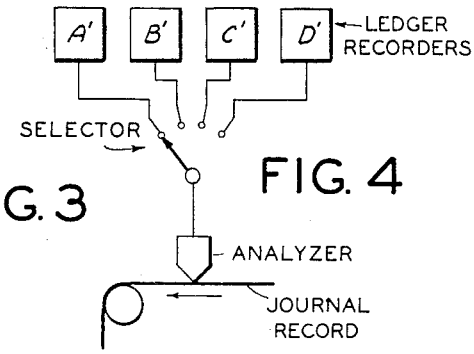
FIG. 4
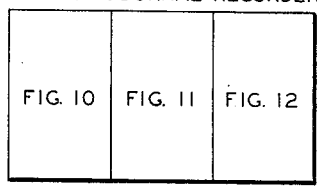
FIG. 6
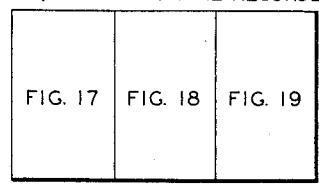
FIG. 7
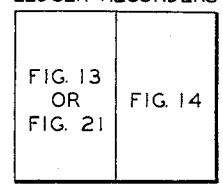
FIG. 8
FIG. 5
INVENTOR.
Judson O'D Shepherd June 27, 1950

J. O'D. SHEPHERD 2,513,112

DATA RECORDING SYSTEM EMPLOYING
RECORD CONTROLLED APPARATUS

Filed July 19, 1944

INVENTOR.
Judson O'D Shepherd

FIG. II

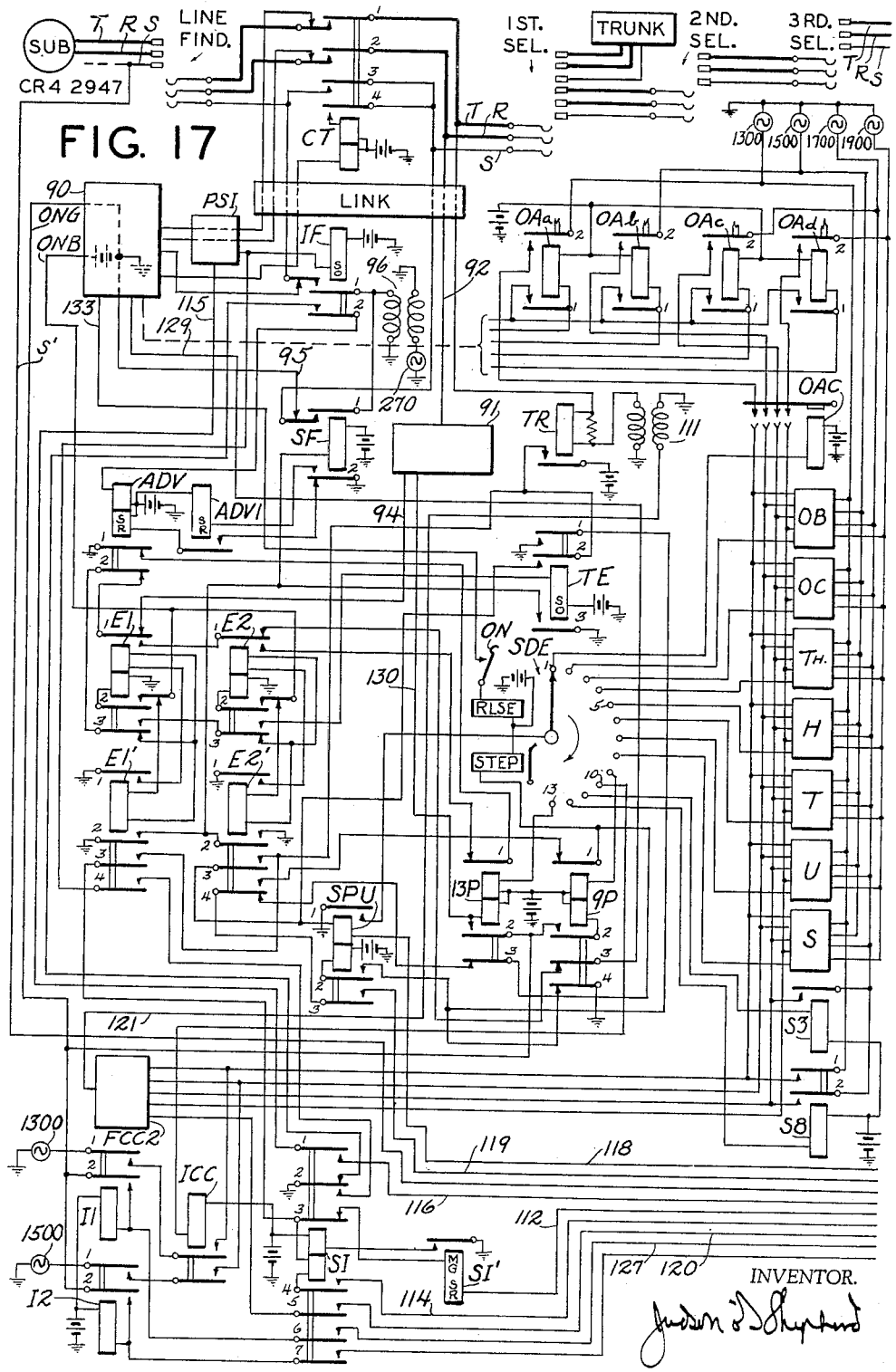

Patented June 27, 1950

2,513,112

UNITED STATES PATENT OFFICE 2,513,112

DATA RECORDING SYSTEM EMPLOYING RECORD CONTROLLED APPARATUS

Judson O'D. Shepherd, Atlanta, Ga.

Application July 19, 1944, Serial No. 545,651

19 Claims. (Cl. 179—7)

This invention relates to systems employable for the recording and reproducing of data. It is more particularly directed to journal-ledger arrangements whereby data entries are made in chronological order to form a journal record and the data of that record are subsequently accumulated by the separate accounts to which they relate to form ledger records. The latter records may be accounting machine cards of a well known type bearing data entries as punched holes, tickets having printed data entries, ledger sheets on which entries are made, or of other suitable form.

Accounting terms will be used in describing this invention and it is appropriate to set out, without expressing limitations, definitions of such terms as generally employed herein. An "entry" comprises a plurality of data or digits. The amount of 2947, for example, represents an entry of four digits. A "transaction" comprises a plurality of entries to form, in the preferred embodiments, a complete ledger record. The "journal" record consists of entries in substantially the chronological order of their development, and such a record normally will include a series of separate, interspersed entries of various transactions. It is the practice in accounting work to identify each journal entry so that each such entry may be posted to its proper ledger or account. The term "identification," as used herein, indicates the transaction, account or ledger designation. The term "source" will be used to indicate, in some embodiments of this invention, the point at which data for entry on the journal record are developed, or agency through which they are supplied to the journal if developed elsewhere. The source will bear an identification expressed numerically or in code which may be used, in some embodiments, as the identification of the entries of a transaction.

One application of the journal-ledger arrangement is for preparing ledger records of transactions, each of which may arise from a separate source. Automatic ticketing of toll telephone calls is one such application in which the sources may be senders, junctors, links, district circuits, outgoing trunks or other equipment elements, or points where data are developed, or through which data are transmitted. Such an application will be employed herein to describe this invention, but it will be understood that the invention is in no wise limited to this use. A transaction with automatic ticketing may comprise, as a separate entries, the identification of the telephone at which a toll call is originated, the called telephone number, including the central office designation thereof, the time of beginning of conversation, the time of its termination, and other data such as the central office equipment elements used in connection with the establishment or ticketing of the call.

One journal recorder is provided for a plurality of sources, the number of which is dependent on the traffic, as represented by entries, to be handled. Each source, when it has an entry to be recorded, connects itself over a plurality of conductors with the journal recorder and transmits to the latter, in accordance with a four-place code, the digits of the entry together with a code for the source (transaction) identification. An indication also is transmitted with the first entry of a transaction to so designate it, and another one for the last entry, and, where a transaction is not completed for various reasons, such as the called line being busy, the called party not answering, or the call being abandoned after partial dialing, an indication representative of this condition is also transmitted.

The journal recorder may be any suitable means for making a data and control record which may be subsequently sensed or analyzed to reproduce the recorded data and to effect control and recording operations therefrom. In the preferred embodiment, it will comprise known means for punching data designating holes in a paper tape several inches wide, with all of the digits of the data and the source identification, and in some cases a control indication, comprising an entry forming a transverse row of holes. The journal record tape is advanced an entry position after each entry. Inasmuch as it will generally take several minutes, depending on the length of conversation, for all entries of a complete transaction to be made, the journal record will comprise an interspersion of entries from many sources, each with identification of its source.

A plurality of ledger recorders are provided, preferably one for each different transaction, which may have concurrent interspersed entries which can be recorded on a single journal record or, expressed another way for the present automatic ticketing illustration, one corresponding to each source which may be served by a journal recorder. If there are thirty sources which may make entries on a single journal record, there will preferably be thirty ledger recorders to reproduce data from that journal record.

One journal analyzer and associated ledger recorders may be employed to analyze a plurality of different journal records. The journal recorder normally will operate far below its theoretical capacity, since the rate of entries throughout a day will vary greatly, and at the highest rate in the busy hour the recorder preferably will serve its associated sources with but little delay, resulting in smaller usage at other times. The analyzer, on the other hand, may function at substantially its maximum efficiency in analyzing a journal record. With automatic ticketing, a telephone central office may have, say, six journal recorders to serve a large number of sources. In the accounting office, where it is contemplated the ledger records will be prepared from the journal record, one analyzer and associated recorders may serve for all six journals, which will be run in sequence. One analyzer and associated ledger recorders can, moreover, be used for journals from a plurality of different offices, in which case the number of ledger recorders required with the analyzer preferably will be equal to the maximum number of sources handled by any one of the several journal recorders.

The ledger recorder may be of any suitable type to make a sensible or printed record, and preferably will be means to punch a conventional accounting machine card on a decimal basis, i. e., each digit comprising a single punched hole at a level on the card corresponding to the magnitude of the digit, and each digit having a predetermined longitudinal position on the card at which it may be punched. Such data may be entered in accordance with a code instead of on a decimal basis.

The journal analyzer is of a type suitable for developing data and control information from the type of journal record employed. In accordance with the preferred embodiment, this analyzer will detect the presence of holes representing data entries, control indications and transaction identifications in the journal record, and will correspondingly establish electrical circuit conditions in accordance therewith. Such sensing means are well known. After each entry has been sensed, the journal record is advanced to the next entry position.

The journal analyzer, in response to sensing a transaction identification, selects the corresponding ledger recorder. It then analyzes each digit of the entry, decodes or translates it from a code into a circuit condition on one of a plurality of conductors, which may be referred to hereinafter as the numerical conductors. The selected ledger recorder is connected to the numerical conductors and certain other control conductors over which information is passed between the recorder and the analyzer. Each digit of the entry is decoded and the recorder enters it in its proper location on the card. If code rather than decimal ledger entries are made, decoding of the data may be omitted.

It is a feature of this invention that the journal record is analyzed or sensed in the reverse order from that in which it was prepared. That is, the last journal entry of a transaction is sensed first and the first entry thereof is sensed last. Likewise, the digits of each entry are sensed and decoded in reverse order. That is, the data entry of 2947, which is in the proper descending order (thousands, hundreds, tens and units) for the data information, will be sensed and decoded in the reverse or ascending order of 7, 4, 9 and 2, although the entry on the ledger record will be in proper descending order since entries thereon may also be made in the reverse order. Reversed analysis and reversed entry on the ledger record has certain advantages which will be set out later.

When a recorder has completed entries on a card, that card is discharged and a fresh one is supplied to it by suitable known means. The cards may be pre-punched for the month and day of the journal record but, in the preferred embodiment, dials are provided which may be manually set for this date on a numerical basis, i. e., November 22 would be 11 22. As soon as a fresh card is inserted, the recorder enters this date in the last entry positions on the card and conditions itself for selection by the analyzer.

When the analyzer first encounters an entry for a particular recorder, it will be the last entry of a transaction, which, in the automatic ticketing illustration, is the time of conclusion of the conversation. The associated identification will cause the corresponding recorder to be selected and the entry made. This recorder will then be released, the journal record advanced an entry position, and that entry sensed to cause the corresponding recorder to enter it. It will be seen that if the first transaction involved a call of very long duration, every other source may have made one or more journal entries of a transaction, or possibly several complete transactions may have been entered from one of the sources before the chronological time of the beginning of a conversation of the first mentioned transaction is sensed. These intervening entries will, of course, be recorded by their proper recorders in the correct positions on their respective cards, the first mentioned recorder awaiting the entry of the time of the beginning of conversation. In this same general manner, other entries will be sensed to complete the ledger record of this transaction and, likewise, cards will be more or less concurrently punched by the other recorders for other transactions.

It is unnecessary for the journal record to carry an entry for the central office designation of the calling party, since a journal record is preferably individual to an office; i. e., bears records only of calls from telephones having, as part of their number, the designation of that office. The primary embodiment of this invention sets out arrangements whereby, prior to the analyzing of a journal, manually operable means are set to enter the designation of the originating office, which is, of course, the same for all transactions on a particular journal record. The designation of the calling office code is entered as the last entry, and when this is completed the recorder discharges the card and a fresh one is supplied for a new transaction.

The transaction cards so prepared may then be employed with conventional, or substantially so, accounting machines, which can sort them according to originating telephone numbers. These may be filed by such numbers throughout the month, or billing interval, and then placed in an automatic billing machine of known type which will analyze each such card and, in response to the entries on each, compute the tolls and associated taxes, summarize them, and print a toll bill for each originating number which has made one or more such toll cells, said bill to contain such detail information as desired which may be secured from each ledger card. It is also contemplated that long distance calls, which are handled by operators rather than by automatic ticketing means, may have a ledger card prepared by manual or semi-manual means for each call. These cards may be added to those prepared by automatic ticketing arrangements and a complete toll bill having both classes of calls may be printed with the total of the tolls and taxes summarized thereon.

The ledger cards, before being filed by originating telephone numbers, may be sorted by called offices or called points and all cards for a particular point may be run through an accounting machine which has been preset for that point and data corresponding thereto, whereby the toll and tax for each ledger card may be computed and recorded on that card. Subsequent sorting and filing by telephone numbers, and the later running of the cards for each telephone number through an automatic billing machine, will result in complete toll bills being printed. This will materially simplify the billing machine and increase its speed of operation, which is important since it is desirable to transmit bills to customers as soon as possible after the close of the billing period.

The latter arrangement, together with that set out in which automatic ticketing and long distance calls are billed by a common machine, may require, for uniformity, a somewhat larger card than that set out herein. For example, space would be required for entry of the toll and tax for the call on each card, and space would be required for entry of the distant city and state in code for long distance calls so that the billing machine will be able to sense them in sufficient detail to print at least an abbreviation of the city and state in which the called party is located.

The ledger cards may also be used to secure traffic data, such as holding times, number of calls to various points, and so on, by running them through an appropriate accounting machine.

One of the principal features of this invention is, as stated, the analyzing of the journal entry in the reverse order to that in which it was prepared. One advantage of this procedure is that it enables incomplete transactions to be detected before an entry from the journal is made on the ledger record. An arrangement which analyzes the journal record in the same direction as that in which it was made will result in ledger entries being made before it can be detected that the transaction is incomplete. For example, in connection with automatic ticketing, if the called party does not answer, the calling party will hang up and there will be no conversation interval for which a toll is to be computed. Consequently, a partially completed ledger card will be prepared which will not be needed and which must be sorted out from the completed cards. Each incomplete transaction, in accordance with the present invention, causes a corresponding indication to be entered on the journal record with the transaction identification. This is, of course, with reverse analysis, the first entry sensed by the journal analyzer for that transaction, and this indication is employed to disable the ledger recorder so that subsequent entries of that transaction will be ineffective. The first entry made on the journal record for a transaction, and therefore the last one of that transaction which is sensed, is accompanied by an indication that it is the beginning of a transaction and, in the case of an incomplete transaction which has resulted in the corresponding ledger recorder being disabled, this indication is employed to restore it to operation.

Another advantage of reverse analysis of the journal record, which is preferably accumulated in a roll, is that it is not necessary for it to be rewound before being analyzed.

Another feature of this invention is the transmission to the ledger recorders by the analyzer of the digits of an entry in their reverse order. This substantially simplifies the entry of the digits in their proper locations on the ledger record. An example will illustrate. Tens of minutes, minutes and tenths of minutes of a chronological time entry may be represented by a numerical entry between 1 and 599. Assume, for example, it is 12.4 minutes or, as recorded, 124 tenths of a minute in one case, 12 tenths in another, and 1 tenth in a third. If the digits are transmitted in their correct order, the first digit would, in either case, be a "1." Some means would have to be provided to assure that, in the first case, the "1" would be entered in the third place from the right, in the second case in the second place from the right and, in the third case, in the first place at the right. With reverse entry of the digits, the tenths of minutes, minutes and tens of minutes will be entered in that order, which eliminates special means for proper position selection. In accordance with the present invention, the ledger record is automatically positioned, at the end of one entry, for the entry of the lowest digit in the order of the next entry which, with chronological time, will be for tenths of minutes. This arrangement is particularly advantageous in the application of this invention to recording of financial transactions of a magnitude between 1 cent and, say, $999.99. When the last digit of a ledger entry is made, the analyzer detects it and advises the ledger recorder, which then skips the remaining digit positions of that entry and moves the card to the lowest order position (cents) for the next entry. If, for example, an entry is for 49¢, the analyzer, upon transmitting a 9 and a 4, determines that this is all of the entry and so advises the ledger recorder, which will advance the ledger card past the dollar, tens of dollars, and hundreds of dollars positions to the cents position for the next entry.

An additional advantage of reverse analysis and transmission of sensed digits to the ledger recorder in their reverse order is that it facilitates the preparation of ledger records with various numbers of entries made at various predetermined locations thereon. A ledger may, in one case, be employed in connection with transactions having only one or two entries and, in another case, for transactions having, say, six entries. Arrangements are set out herein whereby, at the beginning of a journal analysis, the several ledger recorders associated with the analyzer may be set up as a group to define the number of entries to form a complete transaction and the position of each entry on the ledger record. Alternative provisions are disclosed whereby the ledger recorders may be so set up individually in accordance with the requirements of the data to be entered by them from the journal. The ledger recorders individually may be adapted to care for transactions comprising practically any required number of entries within the ledger capacity, with each entry comprising a variable number of digits, and the entries may be made at substantially any desired locations on the ledgers.

These provisions preferably are effected by selective means which may be set for a group of ledger recorders, or for individual recorders, to designate the positions on the ledgers of the lowest order digit of each entry and, after at least this digit of an entry has been made and the ledger recorder released to indicate completion of the entry, to control advance of the ledger past unused digit positions to the position for the lowest order digit for the next entry. This is a very advantageous feature of the invention in that it provides, in a simple manner, desirable flexibility for entering a wide variety of data at substantially any ledger positions, particularly where the ledger records have predetermined entry positions, as with accounting machine cards or ruled ledger sheets.

Another feature of this invention is the provision of alarm arrangements operable upon detection of improper operation. One such arrangement disclosed causes the analyzer and the ledger recorder to be locked up should the last entry of a new transaction (the first entry of that transcation which is sensed) be directed to a ledger recorder which is serving another transaction. By locking up both instruments and providing a visual or audible alarm, an attendant can examine the instruments and the journal record toward determining the cause of the trouble.

A still further feature of this invention is arrangements whereby the journal record may be separated by days without losing an entry of a transaction, particularly with automatic ticketing and the like. Should such a record be arbitrarily discontinued at midnight, for example, and a new journal record started, it might be that one or more sources will then be handling a transaction to result in part of the entries appearing on the old record and part on the new. It would be difficult and troublesome to examine both records to consolidate the separated entries of transactions into complete transactions. In accordance with this invention, at midnight a clock circuit advises the journal recorder that the journal record of the previous day's transactions should be terminated. The recorder then tests the sources having access to it, and if none is in process of handling a call, the recorder causes the record to be advanced for a number of entry positions to result in a visible blank space. If one or more of the sources is handling a call, the recorder will maintain the sources under test and, as soon as they all test normal, will cause the record to be advanced to leave a blank space to indicate where it may be cut off. The chronological time, during this waiting period, will be carried on in accordance with the previous day's sequence, which, on the basis of a 24-hour clock, results in time designations of 24th hour, 25th hour, and so on, until the journal can be terminated without loss of an entry. Such an arrangement is particularly desirable where the telephone office does not have manual attendance, or such attendance around midnight. The extension of time on the previous day's sequence also somewhat simplifies the mechanical calculating arrangements whereby the elapsed time is determined, since the time of termination of a call always will be a larger numerical representation than that of the time at which it started.

An additional feature of this invention, as set out herein by an embodiment thereof, is the preparation of frequency records of data entries. A record medium of suitable type to record a frequency range of a few thousand cycles per second is employed. This may be a magnetic wire, a magnetic tape, a birefringent or the like filament as set out in my application Serial No. 423,450, filed December 18, 1941, now Patent No. 2,497,142, February 14, 1950, or other suitable medium. Each digit is recorded on the journal medium as a short impulse of a simultaneous combination of different predetermined frequencies in accordance with a four-place code. The transaction identification associated with a digit entry may be combinations of other predetermined frequencies. Control indications may be provided by still other frequencies.

In the preferred form of the embodiment of the invention mentioned in the preceding paragraph, with journal-ledger arrangements, each digit of an entry is recorded separately in sequence in its proper order. The transaction identification frequencies and the control frequencies, where present in an entry, are recorded after the first digit has been entered and repeatedly thereafter during the recording of the remaining digits of that transaction and for a short interval thereafter. The latter is for the purpose of providing selection signals in advance of data signals to facilitate, when the record is analyzed in the reverse direction, the selection of the ledger recorder for that transaction. The recording of the digits of the data entry one at a time obviates the necessity of the analyzer separating the digits of the entry to furnish them in reverse order of their original entry to the ledger recorder. An alternative is to record all of the digits of an entry simultaneously on the journal record, but this would require many more different frequencies or a plurality of simultaneous record traces, and either storage arrangements associated with the analyzer to store all of the digits simultaneously sensed or the transmission of all of them simultaneously to the ledger recorder for simultaneous entry at consequent complication of the latter.

The analyzer, with this embodiment, includes means to translate the journal record of frequency entries into frequency signals, filtering these signals into their components, and effecting selective operations in response thereto. The record is adapted to be driven at uniform speed for each digit or control operation. When a digit of an entry or control indication is reproduced and transmitted, the journal record is stopped. When the ledger recorder advises the analyzer of its entry on the ledger record, the journal is started and the next digit is reproduced and the record is again stopped. This is continued until all digits of an entry have been recorded. The discontinuance of the identification signal on the journal record indicates the conclusion of the entry, whereupon the ledger record is released and the journal recorder is driven to sense the next entry.

Frequency recording of data has certain advantages over other arrangements. One of the principal ones is that the data, control and identification signals may be transmitted over a one-wire, or two-wire, circuit, or other voice frequency channel between the sources and the journal recorder. In automatic ticketing with some types of dial offices, the source may be the out trunk circuit which is so employed primarily for timing control, the called telephone number secured from a sender and the calling subscriber's telephone number from a line and station identification circuit. With previous arrangements, a relatively large number of conductors require interconnection to transmit the data from the points where they originate to the journal recorder. The use of frequency recording arrangements permits such information to be transmitted over a wire or pair of wires which may, in some cases, be the pair, or part thereof, subsequently used for talking purposes in the established connection. The ledger records with frequency recorded journals may be punched cards, printed slips or forms, or the like, or they may be frequency records which may eliminate requirement for the analyzer to decode the detected data frequencies.

It is contemplated that one or more journal recorders will be provided in each telephone office arranged for automatic ticketing and the analyzer with associated ledger recorders will be located at a central point, such as an accounting office, as was mentioned above. This requires the physical transportation of the record from the telephone office to the accounting office. By using frequency recording, the journal recorders may be located in the accounting office and the primary controls therefor in the corresponding telephone offices. Each such recorder may be connected with its associated office by telephone cable conductors over which the entries and control signals are transmitted.

Another means of transmitting the journal record over wires from the telephone office to the accounting office is to rewind the record, assuming it is in wire or the like form, and then continuously reproducing it and transmitting the reproduced signals to the accounting office where the record is re-recorded. The record may, of course, be transmitted in reverse and the accounting office record rewound before being sensed for ledger recording.

A still further advantage of frequency recording of journal entries is that it is less subject to incorrect entries being made due to equipment or apparatus troubles, since there is a smaller number of electrical contacts involved in the transfer of data from the point of their development to the journal recorder.

Use of frequency journal records has the further advantage that the number of digits comprising an entry is, for practical purposes, unlimited. Where marked journal records are employed having predetermined digit entry positions, as with a tape in which all digits of an entry are recorded as a transverse row of marks such as holes, the record medium must be of sufficient size to care for the maximum entry which may be present, or the entry must be broken up into sub-entries.

Reference herein to marked records and frequency records is to generally distinguish between the different means of recording data. Marked records in the sense herein considered may comprise those on which information is recorded by sensible marks designating by their location on the record, their arrangement, their shape, their intensity, their orientation, or some other discernible characteristic or combination thereof, the value or intent of the information to be conveyed thereby. Frequency records, as considered herein, comprise a recording of information signals made up of one or more distinguishable frequencies comprising a single, but not necessarily so, record trace. These distinctions are general and not limiting since it is recognized that the art shows no such fundamental dividing line. Patent No. 2,325,941, Aug. 3, 1943, to A. H. Dickinson, shows, for example, records having both marked and frequency characteristics. It is further recognized that marked records in the form of narrow tape carrying a limited number of transverse marking positions, of which conventional teletypewriter perforated tape is illustrative, has certain characteristics making it applicable of the invention within a substantial portion of the fundamental conception disclosed herein of frequency records.

A clearer conception of the scope and purpose of the invention, and still further features thereof, may be obtained from the following description, appended claims and eleven sheets of drawings comprising twenty-one figures, in which:

Figure 1 is a one-line diagram showing general arrangements for preparing a journal record of data from a plurality of sources.

Figure 2 is a one-line diagram of general arrangements for preparing a journal record of a plurality of transactions from a single data source, such as a keyboard.

Figure 3 indicates arrangements whereby one or more sources may selectively make entries on any one of a plurality of journal records.

Figure 4 shows schematically the general organization of recorder arrangements whereby ledger records may be prepared from a journal record.

Figure 5 shows a ledger record in the form of a punched card.

Figure 10:
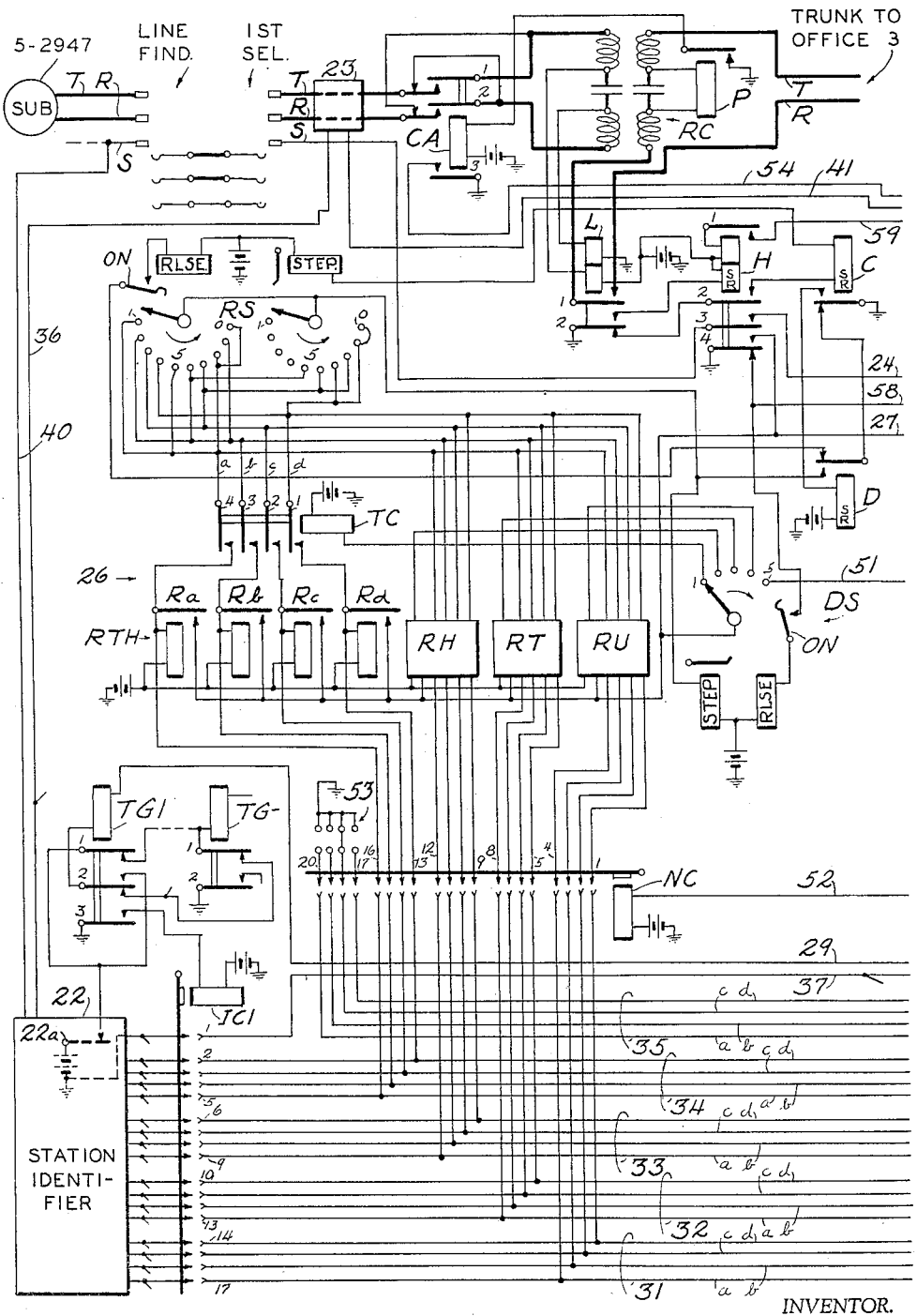
Figure 11:
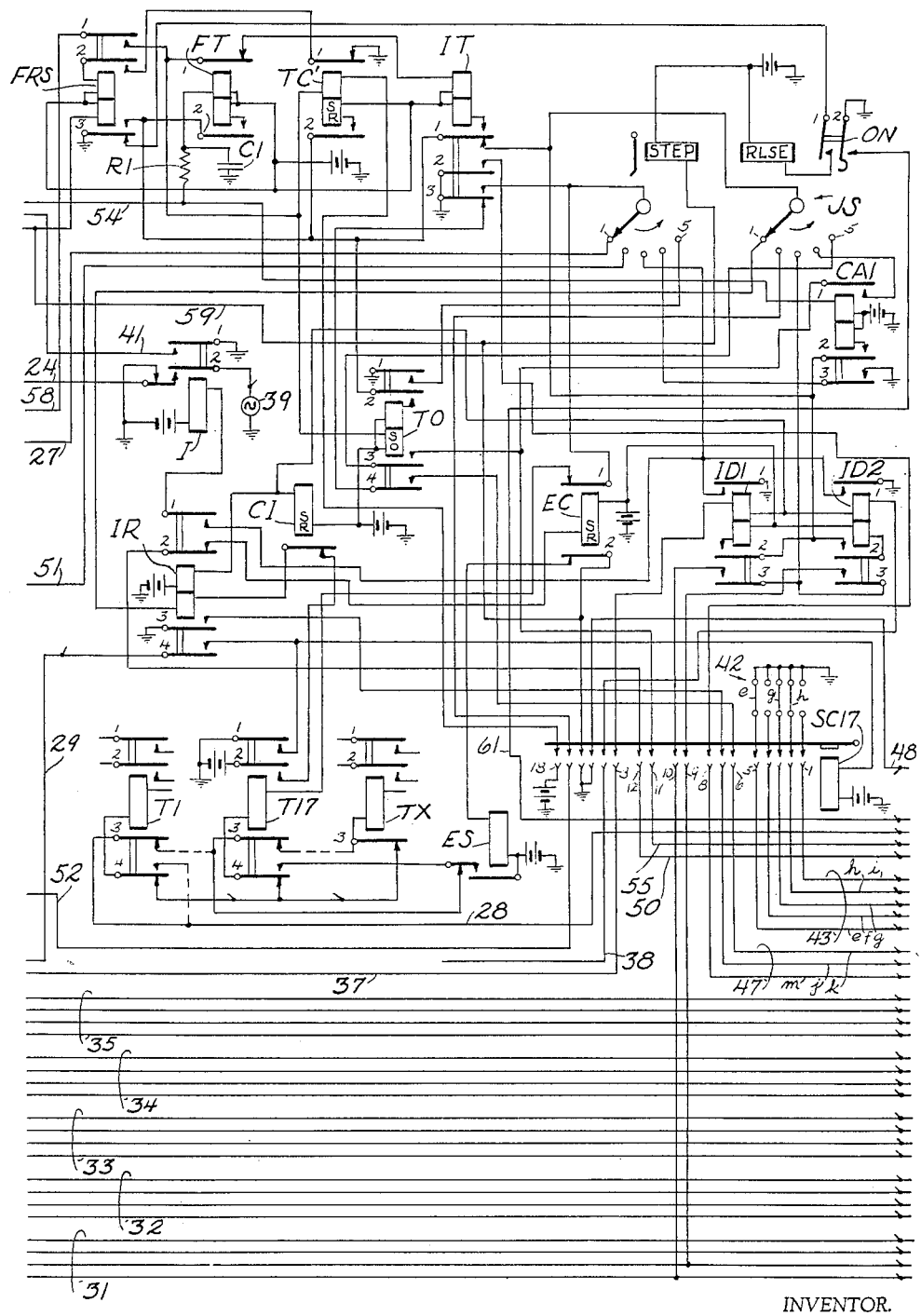
Figure 12:
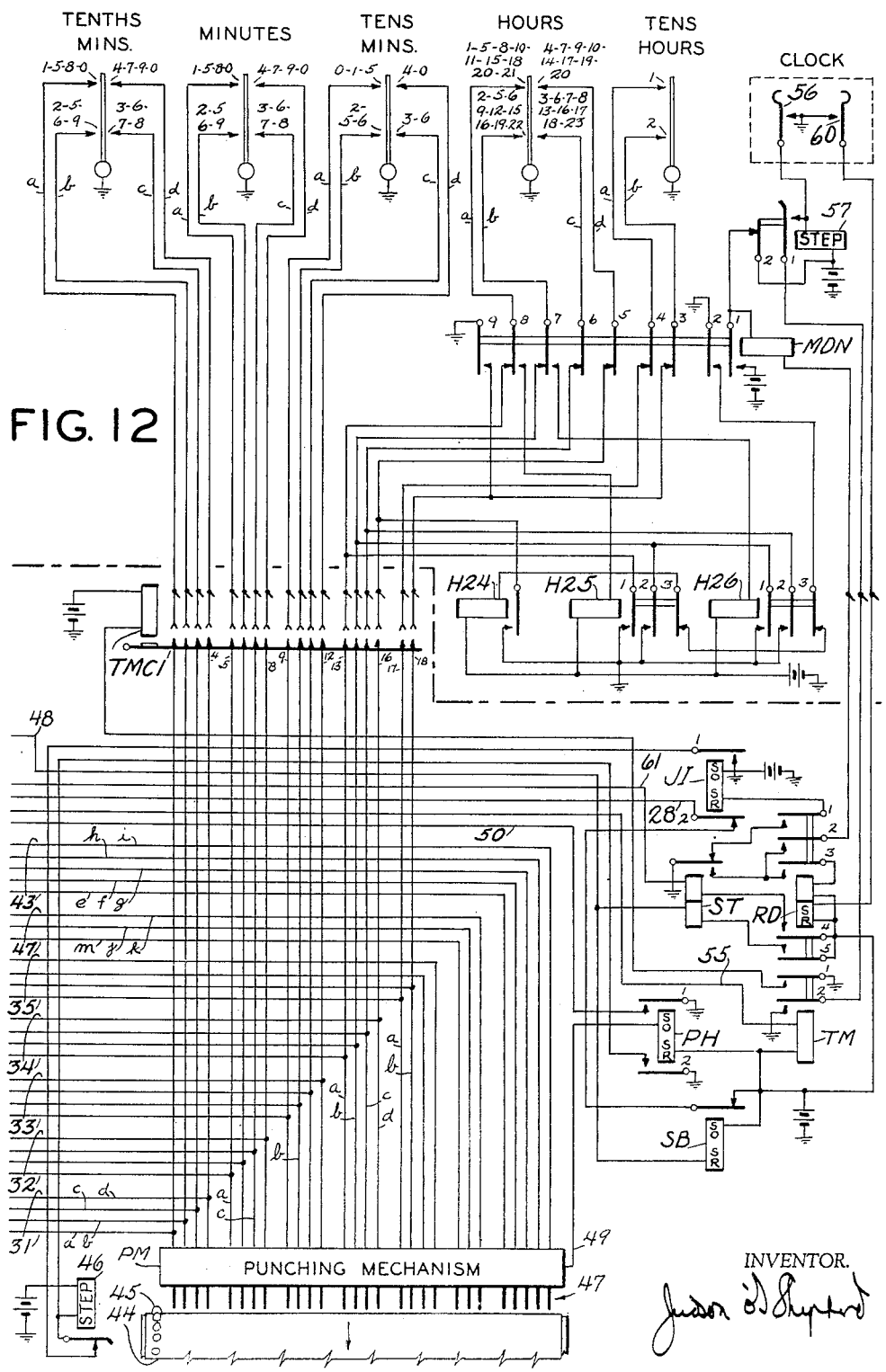

Figure 6 indicates how Figures 10, 11 and 12 of the drawings may be arranged to set out means for preparing a journal record in the form of a marked or punched tape.

Figure 18:
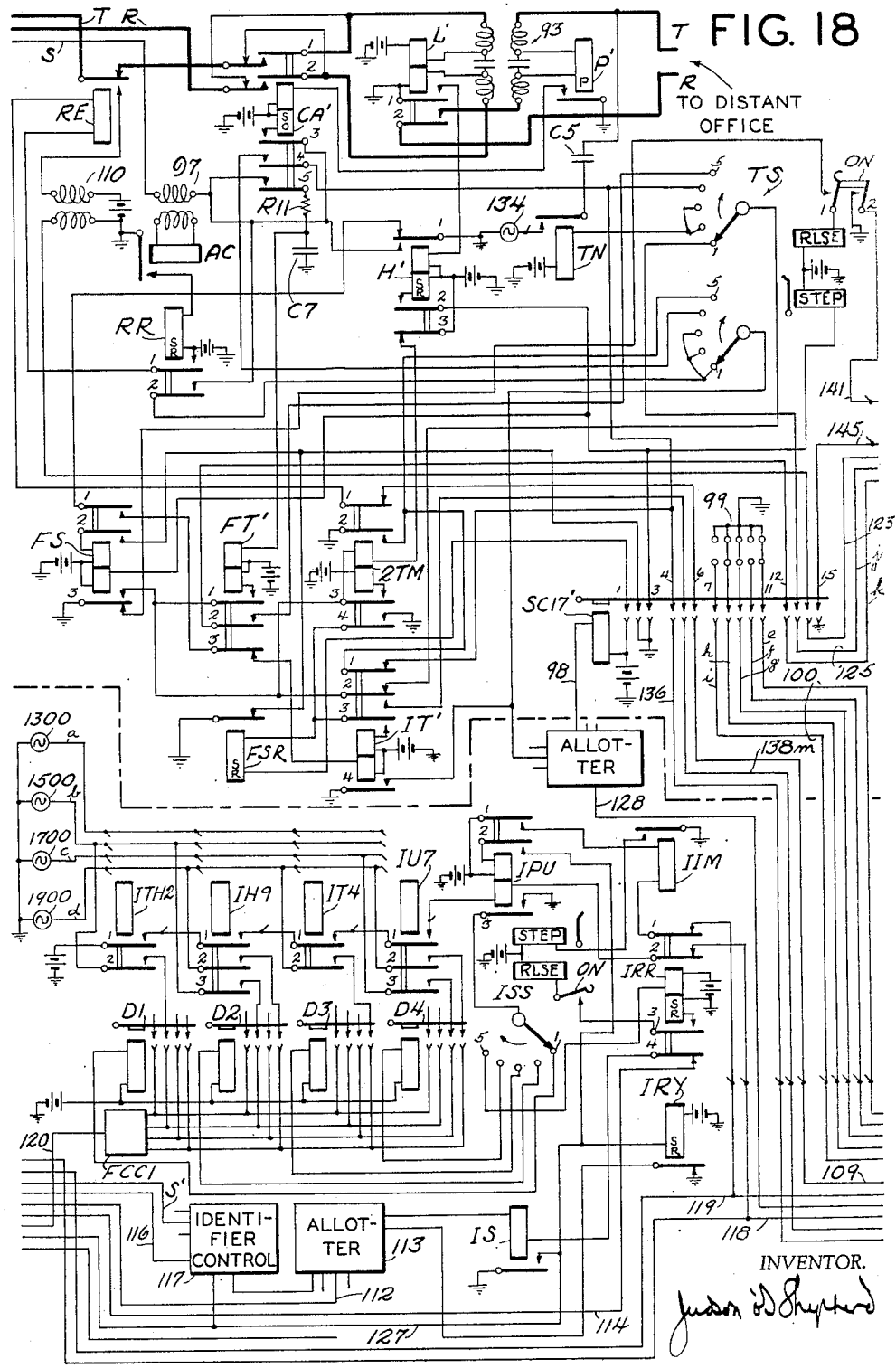
Figure 19:
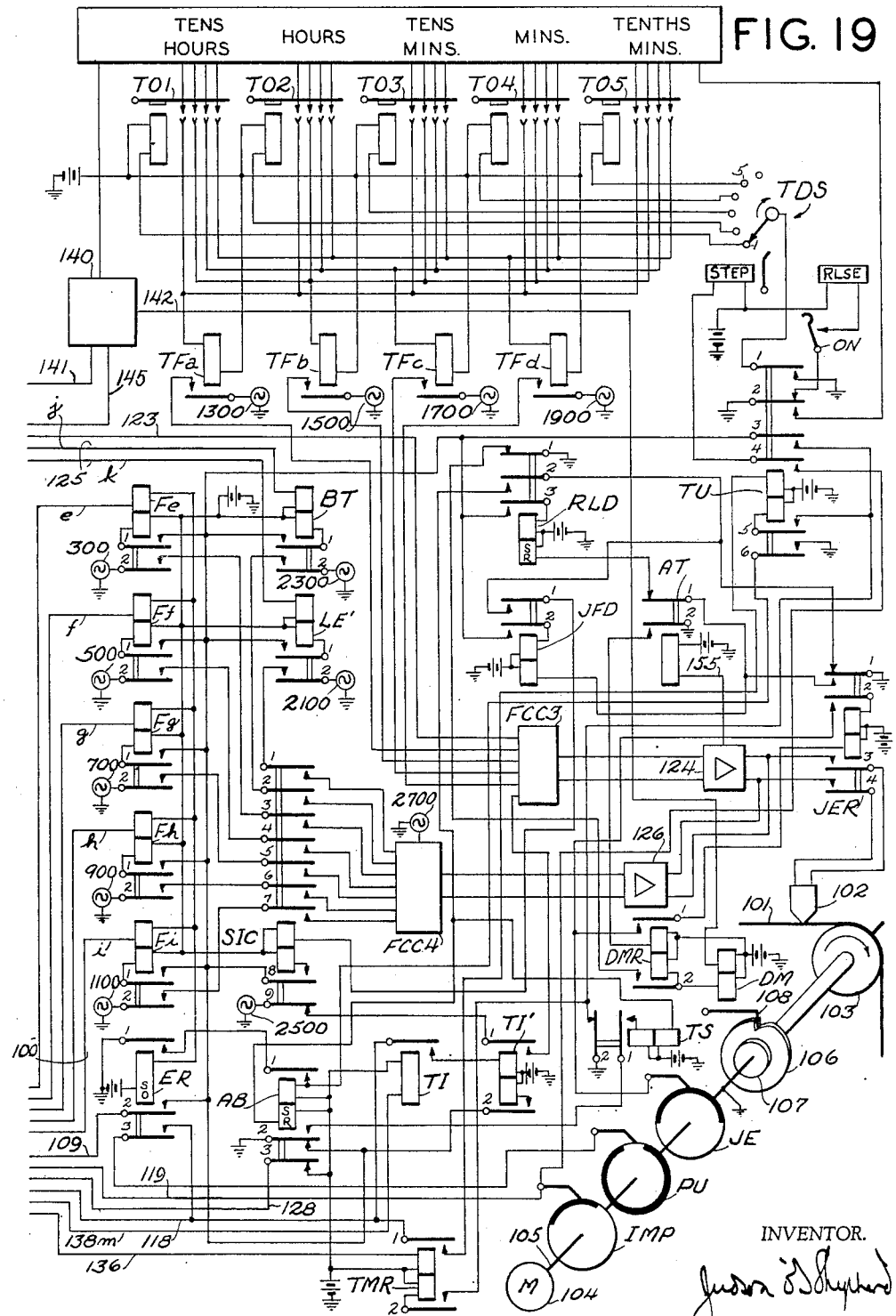

Figure 7 shows how Figures 17, 18 and 19 of the drawings may be arranged to set out the preparation of a journal comprising a frequency record.

Figure 13:
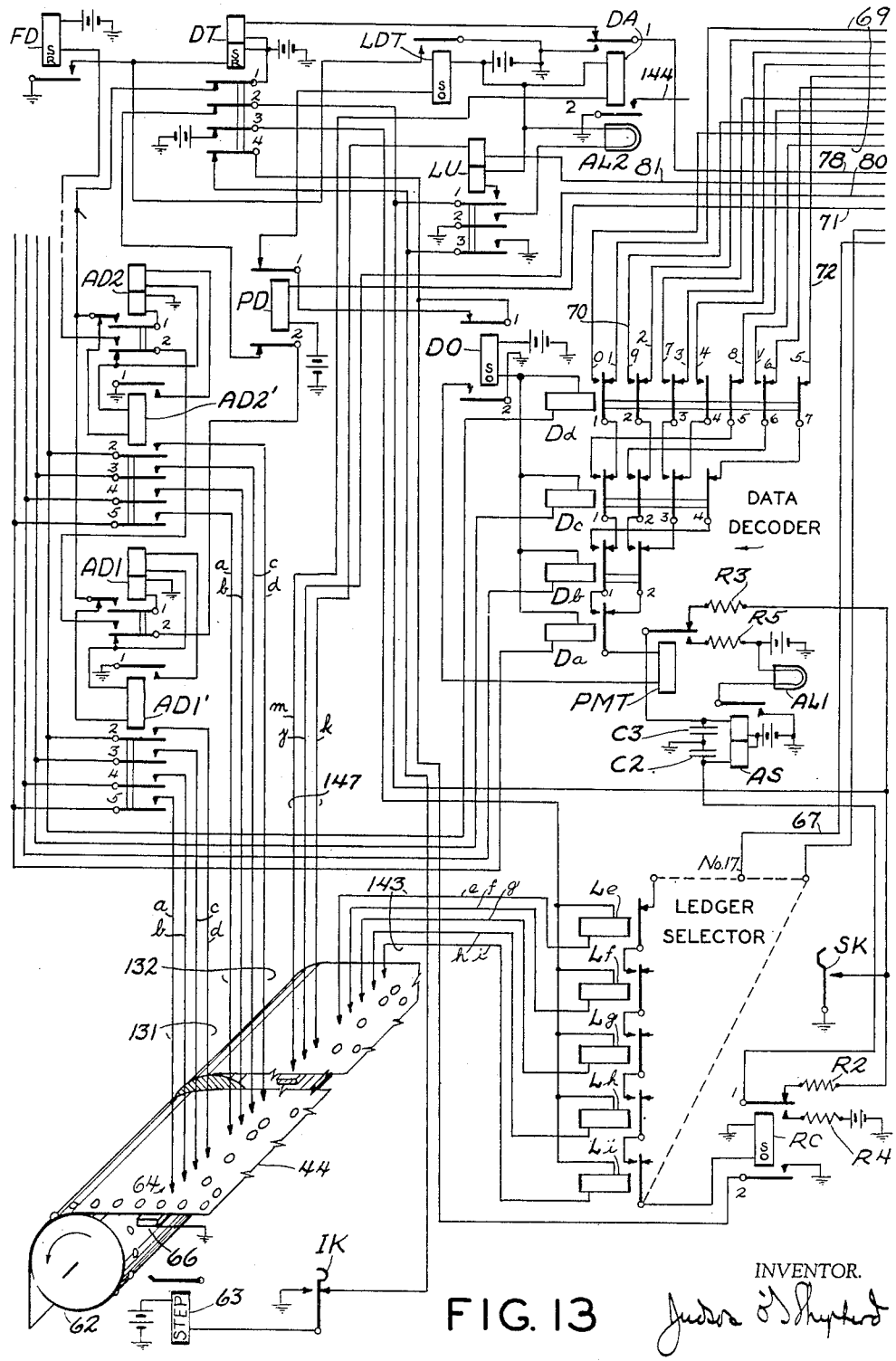
Figure 14:
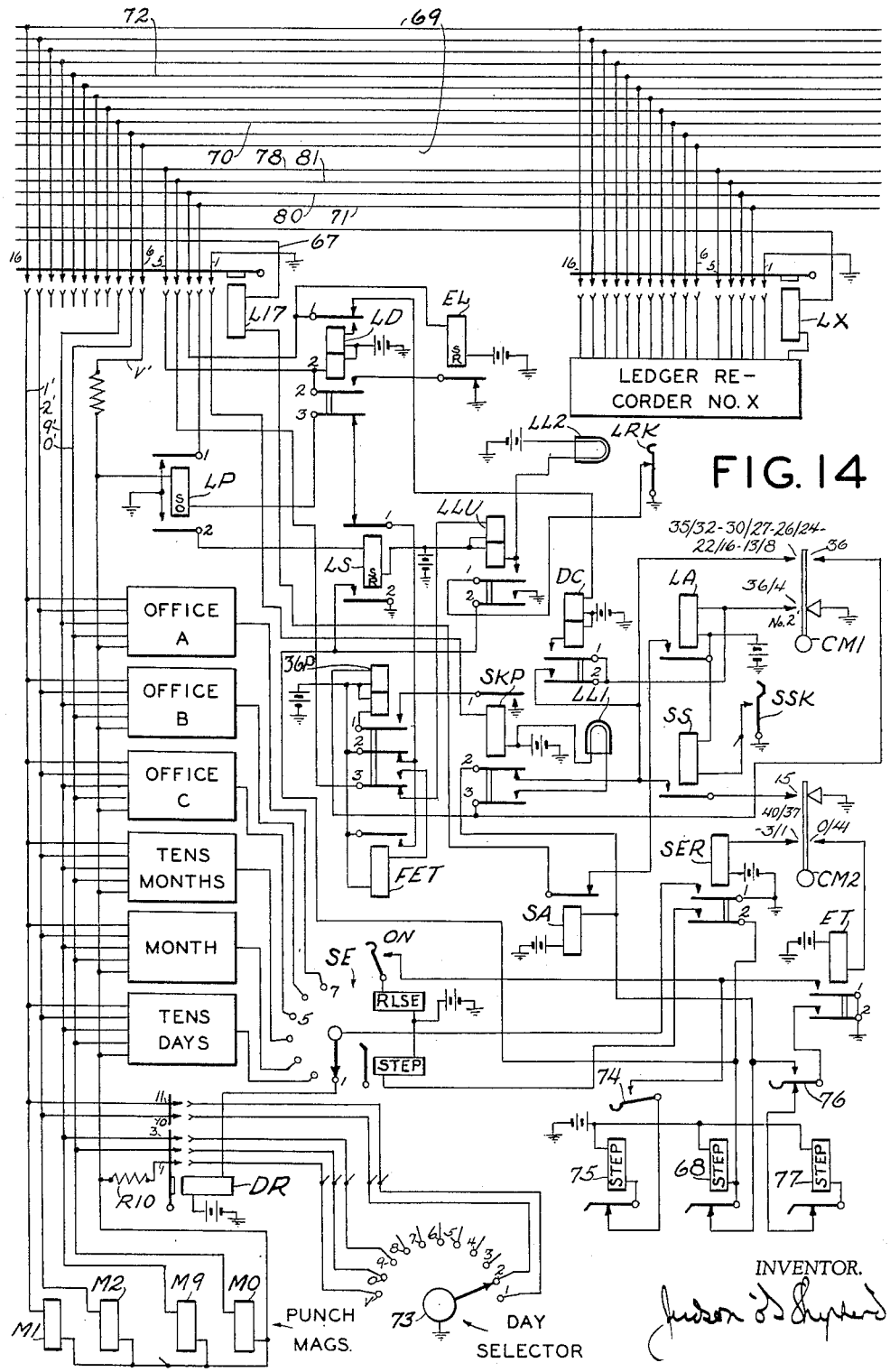
Figure 21:
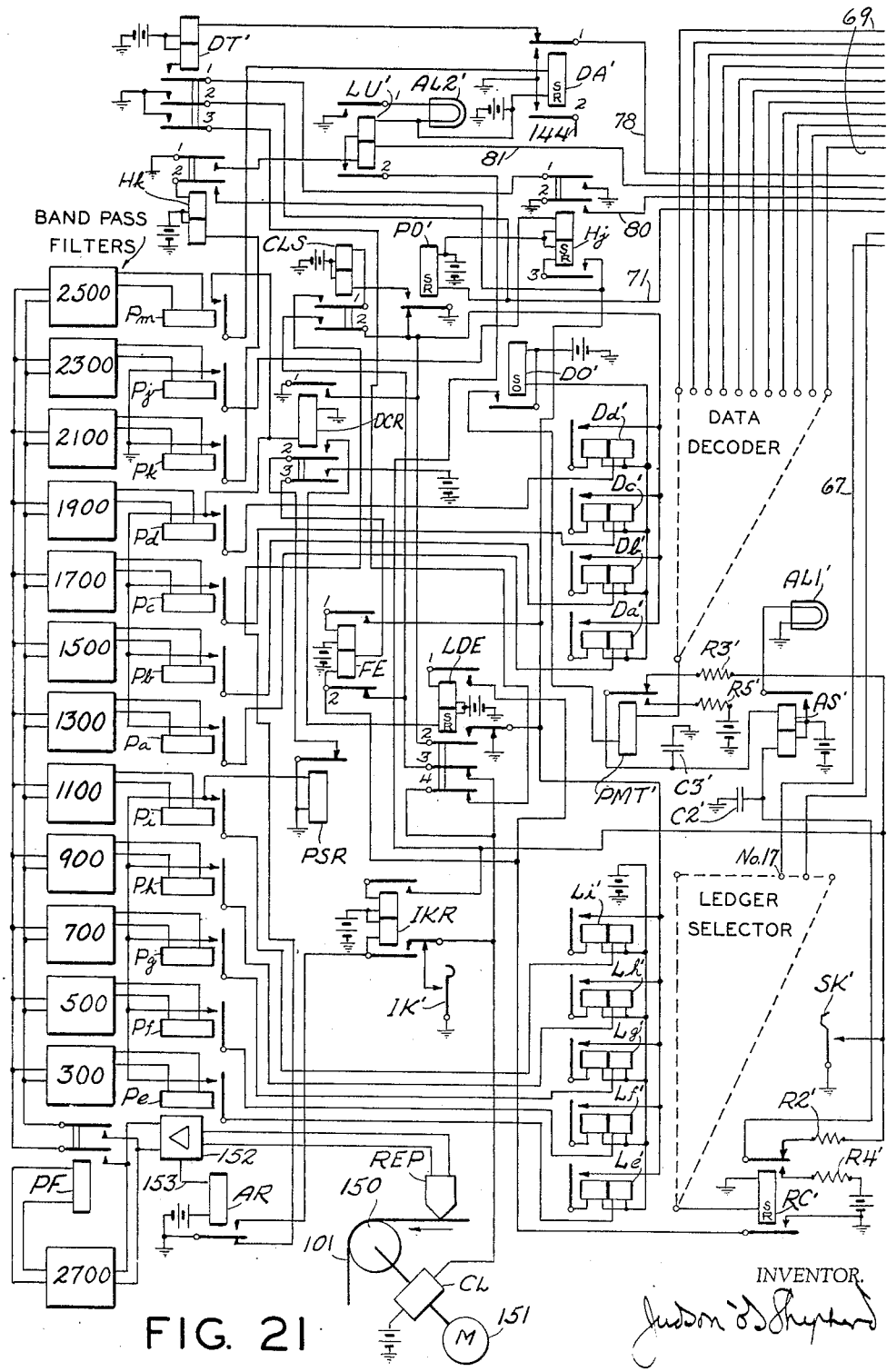

Figure 8 shows arrangement of Figs. 13 or 21 and 14 of the drawings to set out journal analysis and ledger preparation arrangements.

Figure 9:
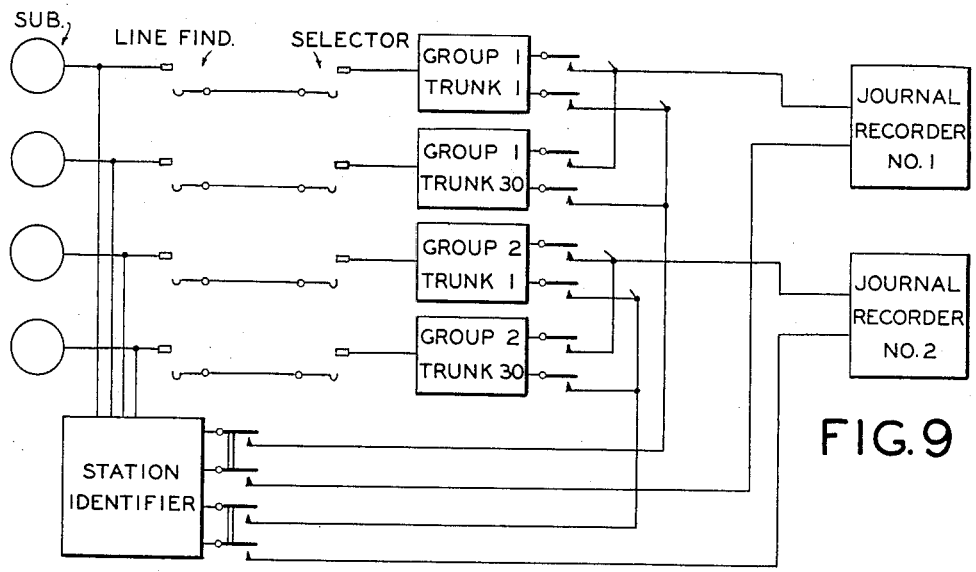

Figure 9 is a one-line diagram of the general organization of marked or punched tape journal preparation arrangements.

Figures 10, 11, and 12, when arranged in accordance with Fig. 6, disclose, by means of circuit conventions, an embodiment of the invention for preparing a marked or punched tape journal record in connection with dial telephone equipment. Figs. 10 and 11 are directed primarily to a dial telephone trunk and recorder control circuit, and Fig. 12 to journal recording arrangements.

Figures 13 and 14, when arranged in accordance with Fig. 8, show an analyzer for a journal prepared in accordance with Figs. 10, 11 and 12. Fig. 13 is directed to the analyzer, and Fig. 14 to an associated ledger recorder.

Figure 15:
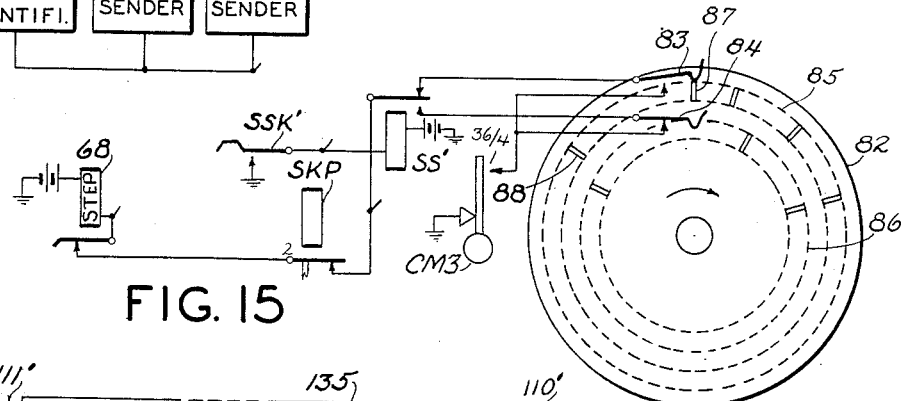

Figure 15 shows alternative arrangements to those disclosed by Fig. 14 for selecting the number and location of ledger record entries.

Figure 16:
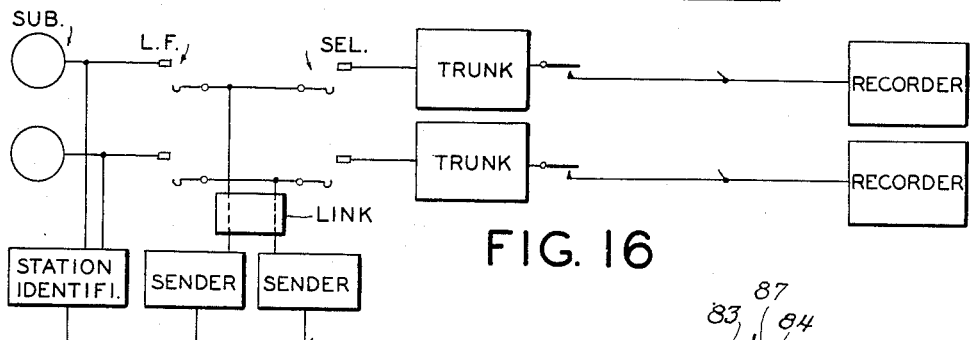

Figure 16 is a one-line diagram of the general organization of frequency journal record preparation arrangements.

Figures 17, 18 and 19, when arranged in accordance with Fig. 7, disclose, by means of circuit conventions, an embodiment of the invention for preparing a journal record comprising frequency signals in connection with dial telephone equipment. Fig. 17 relates to a dial telephone sender, Fig. 18 is directed to a trunk circuit and calling station identifier, and Fig. 19 shows a journal recorder.

Figure 20:
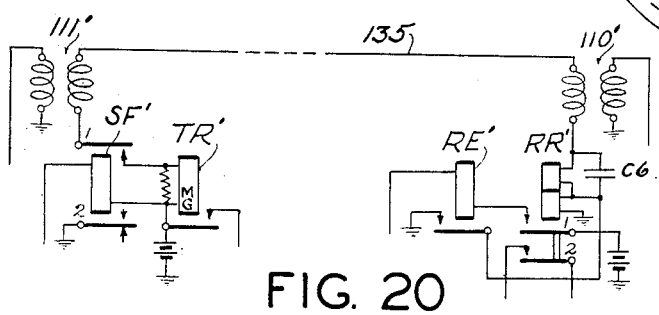

Figure 20 shows alternative arrangements for transfer of information between the sender and the trunk of Figs. 17 and 18.

Figure 21 sets out an analyzer of a frequency journal record such as may be prepared in accordance with Figs. 17, 18 and 19. Fig. 21 may best be understood by arranging it with Fig. 14 as indicated by Fig. 8.

1. GENERAL ARRANGEMENTS

With reference to Fig. 1, a plurality of sources are indicated as A, B, C and D. Each source may comprise a manually operable keyboard, a dial telephone circuit element which produces data or through which data entries are transmitted, or any other appropriate means for producing a plurality of data entries to form transactions. When a source has an entry to be made, a circuit condition is set up to cause a finder, shown schematically as a rotary switch, but which may be relay or other appropriate arrangements, to interconnect that source with a suitable data recorder. The source then transmits the data entry and identification of the transaction, which, in this illustrative case, may be the identification of the source. This entry of data and its associated identification are recorded on the journal record. With a journal record tape or other recording arrangements whereby the data and identification are simultaneously entered, preferably in accordance with a code, the journal is advanced one entry position after each entry is completed. With journal records in which data are recorded by short impulses of a combination of frequencies, the record is driven at uniform speed for each digit of the entry.

After a journal entry has been made from a source, that source is disconnected from the recorder. Another source with an entry is subsequently connected to the recorder and that entry is made. This is repeated. The journal, therefore, will carry interspersed entries from the several sources involving a plurality of transactions, with each entry accompanied by its identification.

Entries for various transactions may be made by a single source, which may be represented by a manually operable keyboard as indicated by Fig. 2. This keyboard preferably has two sections, each provided with rows of numerical keys decimally arranged. Keys of section 11 are provided for the data entry and those of section 12 for the transaction identification. Keys in both sections are operated to form a complete entry which is recorded on the journal. The journal is then advanced for a new entry which may be a part of a different transaction. Inasmuch as the journal recorder may function much faster than the keyboard operator, a plurality of keyboards may be served by a single journal recorder in accordance with the general arrangements shown by Fig. 1. A 10-key keyboard may be used with means to differentiate data entries from transaction identifications.

Keyboard arrangements such as have been mentioned may be provided with auxiliary keys to effect entry on the journal of other information, such as designations of the first entry and the last entry of each transaction, and indication of an incomplete transaction.

In some applications of this invention, it will be desirable for entries on either of a plurality of journal records selectively to be made from a single source or plurality of sources, and arrangements for accomplishing this are indicated by Fig. 3. One such application is to accounting procedures in a business house in which more ledger accounts are required than can economically be carried by, and reproduced from, a single journal record.

Sources 13, 14 and 15 may be keyboards generally similar to that of Fig. 2. If it be assumed that a single journal record may carry entries for one hundred transactions or ledgers, and there are one thousand ledger accounts, the ledger accounts may be identified by three digits, the first of which represents one of ten journal recorders, and the latter two digits the ledger identification entered on the journal. Two such journal records are indicated as 16 and 17.

The first digit of a ledger identification calling for entry on journal 16 from source 13 causes finder 18 to function to connect recorder 19 with source 13, and the data and at least the last two digits of the ledger identification are entered on journal 16. An entry from source 13 for journal 17 causes finder 20 to connect recorder 21 to this source for this purpose. In a similar manner any other source such as 14 or 15 can make entries selectively on either of the journals.

Where there is only one source and a plurality of journal recorders, a selector may be employed to select the required journal recorder as indicated by the first digit of the ledger identification.

Arrangements for the preparation of ledger records from journal entries made in accordance with Figs. 1, 2 or 3 are generally shown by Fig. 4. The journal record is scanned, analyzed or sensed by an analyzer which is of appropriate type for any of the various forms of journal records which may be prepared within the scope of this invention. There is a plurality of ledger records designated A', B', C' and D', corresponding, respectively, to source A, B, C and D, or to similarly designated transactions. The analyzer senses each entry and selects the ledger recorder for that entry in response to the sensed identification thereof. The selected ledger recorder is actuated in response to sensed data of that entry to make a ledger entry thereof. The journal is then advanced and the operation of selecting a recorder and making an entry is repeated. At the completion of each ledger entry, the ledger record is advanced. As a result of these repeated operations, the various entries of each transaction are recorded on their respective ledger records to form a group of correlated entries or complete transactions.

The ledger recorder and associated record medium may be of any suitable type for making a sensible record. Printing of the entries for each ledger or transaction on a tape, card or ledger page is contemplated, in which case the recorder will be of suitable known type for printing characters in response to data signals sensed by the analyzer. In the preferred form of this invention, however, the ledger record comprises a conventional accounting machine card and the recorder may be of known type to punch data representing holes at proper locations thereon in response to sensed data, to advance the card after each data entry or digit thereof has been recorded, to discharge a card when the transaction entries have been completed and to introduce a fresh card. It is further contemplated that the analyzer-recorder arrangements may cause data other than that sensed from the journal to be entered, such as the date, the identification of the analyzer and identification of the transaction.

A plurality of different journal records may be analyzed and ledger records prepared therefrom by a single analyzer and associated ledger recorders such as shown by Fig. 4. This may be illustrated with respect to the journals prepared by arrangements outlined by Fig. 3. When a journal is to be analyzed, the analyzer may be set by means of a dial or the like for the first digit of the ledger identification, said digit corresponding to the journal since only ledger entries having a common first digit in the identification may be carried by any one journal. Whenever an entry is sensed and entered on its corresponding ledger, the analyzer may cause, in response to the dial setting, the recorder also to record the first digit of the ledger identification and, if desired, the ledger identification. The full three digits of the ledger identification may, as an alternative, be entered on the journal record to effect selection of the ledger recorders and the entry of the identification thereof.

Where ledger sheets are employed, the ledger recorders may be adapted to print entries thereon. Before analysis of a journal, the ledger sheets upon which entries may be made from that journal may be placed at the proper line positions in the corresponding ledger recorders. The data entries and date may then be entered on the ledger sheets, and each advanced a line after each such entry.

It is contemplated that preferably there will be a ledger recorder for each identifiable transaction, source or different ledger, data for which are carried by a single journal. This is not necessarily so. If there are entries for 100 different ledgers which may be carried on a single journal, a smaller number of ledger recorders may be used to prepare the ledger records. If twenty ledger recorders are provided, the journal analyzer may be set in accordance with suitable selecting arrangements to disregard all entries except for identifications of ledgers designated one to twenty, inclusive. The journal may then be analyzed to result in entries on the twenty ledgers being made. The journal may then be rewound, the analyzer reset for ledgers designated twenty-one to forty, inclusive, and the journal again analyzed. This may be repeated to result in complete entries on one hundred separate ledgers by five successive analyses of the journal.

It is to be particularly noted that in the preferred embodiments of this invention the direction of movement of the journal record through the analyzer, as indicated by the associated arrow on Fig. 4, is opposite to that in which the record was prepared, as indicated by the arrows of Figs. 1, 2 and 3. This results in the journal entries being sensed in the reverse order of their entry. The purpose and advantages of this reversed analysis were set out above and will be considered further below.

An illustrative ledger record as an accounting machine punched card is shown by Fig. 5. This card, for purposes of describing applications of the invention to preparing records of data of telephone calls, or automatic ticketing as it is known to the art, has forty digit entry positions designated 1 to 40, inclusive. Positions other than those for entries are numbered better to explain the steps of introducing a fresh card into the ledger recorder and discharging one on which entries have been made. Sprocket holes are preferably provided as indicated along the lower edge of the card to assure accurate registration of entry positions with respect to a suitable punching mechanism.

Designations of groups of entry positions may be printed, as shown at the top of the card, for assistance in visual interpretation of the data carried thereby. The first seven digit positions are provided for entry of the number or identification of the telephone from which a call is placed. Positions 8 to 15, inclusive, are for entry of the called telephone number. Positions 16 through 23 are for entry of certain equipment elements employed in establishing the connection and/or preparing the data record. Positions 24, 25 and 26 are reserved for special purposes, such as the entry of message units where measured telephone service is provided, particularly with multiple registration whereby charges are based on the number of message units incurred for a call, as will be explained, or to designate the classification of the calling telephone.

The chronological time of the beginning of conversation for which a toll is to be computed is entered in positions 27 through 31, designated "Start." Likewise, the time of conclusion of the conversation is entered in positions 32 to 36, inclusive, designated "End." The month and day the call is placed are entered under "Date" in positions 37 through 40, inclusive.

With this particular type of card, a digit entry comprises a hole punched in the appropriate column at a vertical position corresponding to its value in accordance with the scale at each end of the card. The sample entry shown indicates that a call was placed from telephone 5-2947 to telephone number 3-8765. Equipment unit No. 1 was used as indicated by column No. 23. Conversation started at 3:28.7 P. M., or 15:28.7 as indicated on the basis of a twenty-four hour clock, and ended at 15:35.9, the first two digits indicating the hour, the next two the minutes, and the last one the tenths of minutes. The call was placed on October 12 (1012). The year may be printed on the card as 1947, for example.

It will be understood that this type of card is merely illustrative of any suitable form of medium which may carry data entries of any type which are sensible by appropriate means, including ledger sheets, tapes, paper slips, or the like, upon which either code indications or printed characters may be recorded. For applications of the invention where data entries may be made in code, a relatively narrow card or tape may be used with code positions for a four-place code, digits of which may be indicated by suitably marking combinations of these code positions in accordance with the data code employed, said marking comprising a punched hole, a light affecting scoring, a localized change of electrical resistance or such other type as is desirable, and the record medium employed therewith will, of course, be chosen appropriate thereto. Where the ledger records are to be employed with a billing machine adapted to print or type letter characters either with or without numerals, a five- or six-place code may be used appropriate for actuating said machine.

Still another form of ledger record may be a card, or the like, which is relatively wide so that all digits of an entry may be made in a single row in accordance with a four-, five- or six-place code for each digit or character. Where a five-place code is used, separate control entries may be provided to effect shifting from letters to figures for that row, or portion thereof. Eight digit or character positions will generally suffice for applications to automatic ticketing, since that number will care for the largest telephone number now in general use and indicate intelligible abbreviations of any city and state. The journal record shown by Fig. 13 indicates an entry of a plurality of coded digits in a row.

The ledger recorder may be arranged to open perforations along the edge of a record card or the like to facilitate sorting. Patent No. 1,739,087, Dec. 10, 1929, to Perkins is illustrative of such cards. For application to automatic ticketing, the number of the telephone from which a call is placed and designation of the called office may be indicated by punched out perforations along the edge of the card rather than, or as a supplement to, such designations in the normal entry positions therefor. This will aid in sorting of the cards by called offices first for rating the call and entering the toll and tax thereon by an accounting machine, and then by calling telephone numbers for filing in accordance therewith until the end of the billing period.

The invention will be described in connection with the preparation of a card of the type shown by Fig. 5, but it is believed that the preparation of other types of ledger records, such as described above, will be understood by the competent in this art from what is set out below.

It is contemplated for the purpose of describing the invention, and shown by the drawings, that data will be transmitted, recorded, sensed and employed to select and actuate ledger recorders in accordance with a four-place code. It is well known that four elements taken one, two, three and four at a time may be made to define fifteen different conditions. The four code elements may be represented by $a$, $b$, $c$ and $d$. The code selected from the large number available for representation of numerical and other data herein is as follows:

| Digit | Code | Digit | Code |
|-------|------|-------|------|
| 1 | $a$ | 7 | $cd$ |
| 2 | $b$ | 8 | $ac$ |
| 3 | $c$ | 9 | $bd$ |
| 4 | $d$ | 0 | $ad$ |
| 5 | $ab$ | V | $bcd$ |
| 6 | $bc$ | | |

The character "V" represents a vacant digit position, and the code combination is effective to cause the ledger recorder to skip a digit entry position. The above code employs only eleven of the fifteen code possibilities of four places, and the other four codes may be employed to indicate other desired information, as will be understood from what follows. Conductors, relays, frequency sources and the like throughout the drawings related to each of the code elements will be commonly designated $a$, $b$, $c$ or $d$, as appropriate.

The transaction or source identification selected for this disclosure is on a five-place code basis. This will yield thirty-one different identifications. In some embodiments of this invention, many more than thirty-one sources or concurrent transactions may be served by a single journal recorder. If the capacity of the journal recorder is limited to sixty-three sources, a six-place code may be employed. It will be apparent from what follows that the source or transaction identification may be on a decimal basis, in which case two digits may be employed to define one hundred identifications. The decimal basis will be preferable where it is desirable to enter the identification of the transaction or source on the ledger record. Should a two digit representation employing all possible combinations of a four-place code be employed, 225 different identifications may be so defined. It is believed to be sufficient for clear understanding of this invention, however, to describe it on the basis of thirty different sources or transactions served by each journal recorder, with identification on a five-place code basis. The elements of this code throughout the drawings will be commonly designated as $e$, $f$, $g$, $h$ and $i$.

It is desirable, for reasons set out below, to enter additional information on the journal record for control of the journal analyzer and ledger recorders. One of these is to indicate the beginning, or first entry, of each transaction. The circuit elements related thereto will be commonly designated by the letter $j$. Another indication is for the end, or last entry, of a transaction, which will be commonly designated by the letter $k$. The third such indication is for an incomplete transaction, and this will be commonly designated by the letter $m$.

With three sensible elements such as $j$, $k$ and $m$, it is feasible to effect seven selective operations in accordance with a three-place code. These additional indications thus derived may be employed to indicate various information on the journal for corresponding functional control of the analyzer and/or recorders. They may, for example, be employed for selecting entry positions for data on the ledger media as will be described. Recording of supplemental information on the ledger may also be effected thereby, such as, with financial transactions or stock records, the indication of debit and credit entries.

2. MARKED JOURNAL RECORDS

The invention as shown by the drawings and described herein is primarily in connection with automatic ticketing, as mentioned, since its application thereto is well suited to illustrate its operation and features. The general organization of the telephone apparatus and the recorders for preparing journal records of the marked type incident to automatic ticketing is shown by Fig. 9. This figure is an outline for orientation of arrangements shown in detail by Figs. 10, 11 and 12.

It is assumed that step-by-step switches of conventional type are employed in the telephone office for establishing connections under control of dials on telephones designated SUB. Other types of dial equipment may be used. When the receiver is removed, or an equivalent operation is performed incident to placing a call, an idle line finder finds the line of the calling party in the usual manner. The subscriber then dials a desired number. This may be to a telephone in the same office or to one in another office which may be reached without incurring a toll charge. The present description is limited, however, to calls to other offices requiring that data be recorded for purpose of determining the charges and preparing a bill therefor.

Outgoing trunks to offices requiring billing for calls thereto are indicated as being reached by the subscriber dialing a single digit identifying that office. The wiper of the selector is raised, in response to this digit, to the level of its bank corresponding to the desired office and the selector then hunts over terminals of this level for an idle trunk thereto. Out trunk switches, not shown, may be provided to increase the efficiency of a large group of trunks.

The trunk circuits are arranged in groups and each group is served by a journal recorder. Trunks served by any recorder preferably are connected to various offices, calls to which require preparation of call records. This will provide efficient use of the recorders since the traffic to the various offices may have maximum periods at different times of the day.

When one of these trunks is selected, it indicates need for preparation of call data, so the trunk connects itself to the journal recorder of its group as soon as the latter is available, if it is then making an entry from another trunk. With the recorder connected to it, the trunk then connects itself to a station identifier of suitable known type and causes that identifier to extend to the recorder of that trunk group the identification of the calling telephone station over a group of conductors, and this identification is recorded. The trunk causes the recorder also to enter the designation of the trunk (source or transaction) as it does with each subsequent entry made by it. This is the first entry of a transaction and is so designated to the recorder. The station identifier and recorder are then released.

The dialed digits, other than the office code, of the called number are recorded by the trunk circuit concurrently with actuation of the dial switches, or the like, in the called office. When the complete number has been dialed, the trunk again connects itself with the recorder and makes an entry of this number together with designation of the office in which the called telephone line is terminated. The latter is provided by virtue of the outgoing end of the trunk circuit being connected only to that office.

The trunk circuit then releases the recorder and subsequently reconnects itself thereto to enter information with respect to certain of the equipment elements used in connection with the call.

When the called party answers, a supervision signal returned over the trunk conductors from the distant office causes the trunk to connect itself to the recorder and indicate thereto the beginning of the conversation interval. The recorder has arrangements operatively responsive to this indication to cause it to enter the chronological time.

At the conclusion of conversation, restoration of the receiver, or the like, at the calling telephone causes the trunk circuit again to connect itself to the recorder for another chronological time entry, accompanied by the designation that this entry completes the transaction.

The trunk circuit is arranged so that it may be immediately reused for another connection at the conclusion of conversation without interfering with the recording of the time of completion.

The called line may be busy or the called telephone may not be answered. The calling party may abandon the call for other reasons, such as being interrupted, finding that he is calling the wrong number or fumbling the dial. If the first entry has been made on the journal when the calling party hangs up, the trunk circuit connects itself again to the recorder and causes it to enter its identification and the designation of an incomplete transaction.

Any transaction which is opened on the journal is closed thereon, either by a complete set of entries for the transaction or by the designation of an incomplete transaction.

With reference to Figs. 10, 11 and 12, arranged in accordance with Fig. 6, it will be assumed for illustration that the subscriber at telephone station numbered 5-2947 (Fig. 10) places a call for telephone number 3-8765. In the numbering plan of the telepone area assumed for illustration, the first digit designates the telephone office and the following four digits identify the main stations or private branch exchange trunks in that office. It is further assumed that each call from Office No. 5 to Office No. 3 necessitates a toll charge be made.

An outgoing trunk to Office No. 3 is indicated at the top of Fig. 10. Arrangements for registering the four digits of the called number and connecting, by means of number connecting relay NC, the registers to the journal recorder are also indicated. A calling station identifier, represented by box 22, is located in the lower left of this figure.

Fig. 11 shows arrangements individual to the trunk of Fig. 10 primarily for controlling the transmission of information to the journal recorder. Source connector relay SC17, upon operating, connects a plurality of conductors to the journal recorder.

Fig. 12 shows a journal recorder which is common to a plurality of trunk circuits such as shown by Figs. 10 and 11. Allotting arrangements provide for the connection of only one source or trunk to the recorder at a time by operation of its relay SC— and, for the recording of the called number, relay NC. A journal tape with suitable marking means, shown here as conventional punching means, is indicated at the bottom of this figure. Control relays for the recorder are at the right of the punching means. Chronological timing means are shown at the top of Fig. 12. This preferably comprises a group of five cams of the familiar sequence switch type with carryover means mechanically interconnecting them. The lowest cam of the order for tenths of minutes has ten positions and is advanced a step at a time by suitable clockwork, or the like, contacts which close momentarily every six seconds. The minute cam, which also has ten positions, is advanced one step by said carryover means at the end of each revolution of the tenths of minutes cams. The tens of minutes cam has six positions per revolution and is advanced a position upon each revolution of the minutes cam. The hours cam has 24 positions based on a 24-hour clock, and it is advanced a position upon each revolution of the tens of minutes cam. The tens of hours cam has three positions and is advanced a position at the end of the tenth, twentieth and twenty-fourth hour by the hours cam. Certain of the cams, for example that for tens of hours, may be designed for several cycles per revolution.

2.1 *Establishing the connection*

When the receiver of station 5-2947 is removed, or an equivalent operation is performed, the line over which said station is served is found in conventional manner by a line finder. Dial tone is thereupon supplied the calling subscriber, who then dials the called number. The first digit thereof (3) actuates the first selector to pick an idle trunk, either directly or through an out trunk switch, not shown, to Office No. 3. When this trunk is found, a circuit may be traced from battery, the lower winding of relay L, the upper left hand winding of repeating coil RC, normally closed contacts No. 2 of relay CA, conductor R (ring) through the particular station identifier 23, bank contacts and wipers of the first selector and line finder, the station, conductor T (tip), back through the line finder and first selector, again through the particular station identifier 23, normally closed contacts No. 1 of relay CA, the lower left hand winding of repeating coil RC, the upper winding of relay L to ground, thereby causing relay L to operate. At its No. 2 front contact, it operates hold relay H over an obvious circuit. Operation of relay H extends ground from back contacts No. 2 of relay I (Fig. 11), conductor 24, contacts No. 3 of relay H to the sleeve circuit to hold the line finder and first selector, and to maintain a busy or guard condition against other selectors seeking this trunk. Operation of relay L also closes the trunk circuit to distant Office No. 3, the circuit being traceable in part from the T conductor of that trunk, upper right hand winding of repeating coil RC, relay P, the lower right hand winding of this coil, No. 1 contacts of relay L to the R conductor of the outgoing trunk. Relay P is polarized and does not now operate due to the direction of current flowing through it.

The seizure of the outgoing trunk to Office No. 3 indicates the start of a transaction, and the circuit and equipment promptly proceeds toward making the initial entry thereof. The subscriber may proceed with dialing the complete desired number while the journal entry is being made. The operations resulting from this dialing will be described first and the journal entries later.

The first opening of the pulse springs of the station dial incident to transmitting the digit "8" causes relay L to release. This opens the outgoing trunk circuit at contacts No. 1 to transmit the pulse to Office No. 3 and opens the circuit for relay H. The latter relay, being slow to release, remains operated during pulsing.

It is necessary to register the called number, exclusive of the called office designation, in the trunk circuit so that it may later be entered on the journal. A rotary switch RS of the type shown, for example, in Patent No. 1,520,821, and comprising two sets of bank terminals with wipers, a stepping magnet, a release magnet and off-normal contacts ON, is provided to count the pulses of each digit dialed and transmitted to the distant office. This rotary switch is shown for illustration of a suitable pulse counting means, which may also be a counting relay chain, a chain of electronic tubes, or any other appropriate arrangement.

When relay L releases incident to the first dial pulse, a circuit may be traced from ground, its No. 2 back contacts, No. 2 contacts of relay H, winding of relay C, winding of the stepping magnet of switch RS to battery, causing this magnet to operate and position its pawl. When this circuit is interrupted at the end of the first pulse, the two wipers of the switch will be advanced to bank terminal No. 1. Relay C operates in series with the stepping magnet and operates relay D. Relay C is slow to release and remains operated during digital pulsing.

At the end of the first pulse, relay L operates to reclose the outgoing trunk loop and reestablish the operating circuit for relay H. The next and succeeding pulses of the digit result in the wipers of switch RS being advanced until, at the end of the eighth pulse, they are resting on bank terminal No. 8.

There are four digit registers generally designated 26, one for the thousand and designated RTH, RH for the hundred, RT for the ten and RU for the unit of the called number. A station designation, as may be required if the distant office is of the manual type or has party line stations requiring a station designating digit, may be registered by a fifth, or station, register. Each register comprises four code relays with a connector relay. The five relays for the thousand register are shown in detail, and those for the lower registers in the order may be similar and are indicated by boxes RH, RT and RU. The register relays of these groups are set under control of switch RS in accordance with corresponding digits dialed.

At the end of the first digit "8," the inter-digital interval results in relay C releasing. A circuit may then be traced from ground, its back contacts, the front contacts of relay D, which is slow to release and maintains its front contacts closed momentarily after its operating circuit is opened by release of relay C, to the two wipers of switch RS. The bank terminals of these switches are connected in such manner as to establish the data code, depending on the position at which the wipers are stopped, on four conductors extending through the front contacts of relay TC, which has been operated by a circuit which may be traced from ground at front contact No. 4 of relay H, wiper of the digit steering switch DS, bank terminal No. 1 thereof, winding of relay TC to battery, which was completed upon seizure of the trunk. It is the purpose of switch DS, which is of the same type as switch RS and is provided with a stepping and a release magnet, and off-normal contact ON, to direct the digit registrations to their proper registers.

Ground on the left hand wiper of switch RS may be traced through bank terminal No. 8, contact No. 4 of relay TC, winding of relay Ra to battery, and the ground on the right hand wiper may be traced through bank terminal No. 8, contacts No. 2 of relay TC, winding of relay Rc to battery. Relays Ra and Rc operate and lock up to ground at the front contact No. 4 of relay H. Operation of relays Ra and Rc designates the digit "8" in accordance with the data code set out above.

The stepping magnet of switch DS was operated to position its pawl by a circuit which may be traced from ground at the back contacts of relay C, the front contacts of relay D, winding of this magnet to battery. After a short interval following release of relay C, relay D releases to result in the stepping magnet for switch DS releasing to advance the wiper thereof to position No. 2. This results in relay TC being released and the corresponding relay of register RH being operated. The latter relay may be slow to operate to assure release of relay TC before the register relays of register RH are connected to the bank terminals of switch RS.

Release of relay D also opens the previously traced ground circuit to the wipers of switch RS and closes the release circuit for this switch, the latter being traceable from ground at the back contacts of relay C, back contacts of relay D, the off-normal contacts ON of switch RS, winding of the associated release magnet to battery, causing the wipers of this switch to be released and spring back to normal. Contacts ON are closed when the wipers are advanced to the first bank terminal and opened when they reach normal.

In a manner similar to that described, each of the succeeding digits which are dialed is repeated over the out trunk circuit to Office No. 3 to effect selections therein, and each is registered in its appropriate register by an operated relay or relays thereof.

The first entry of the transaction is made on the journal while the above dialing operations are taking place. A complete transaction comprises five entries under control of the trunk circuit and as indicated by the card of Fig. 5, as follows:

1. Calling station number.
2. Called office and station number.
3. Circuit elements used for the connection.
4. Time of the start of the conversation.
5. Time of conclusion of conversation.

A journal sequence switch JS (Fig. 11) of the same type as switch RS and comprising two banks of five terminals each, a stepping magnet, off-normal contacts and a release magnet, is provided to control the sequence of journal entries. The wipers of this switch are advanced one terminal after each journal entry. The circuits for entry of the calling station number will now be traced.

2.2 Entry of calling station number

Operation of relay H extended ground from its front No. 4 contacts, conductor 27, terminal No. 1 of the left hand bank of switch JS, back contacts No. 1 of entry completion relay EC, to the winding of relay T17. This relay is one of a group of relays connected in a circuit so arranged that one, and only one, of such relays may be operated at one time to control connection of the trunk to the journal recorder. Three such relays are shown, of which relay T1 is for the first trunk in the group, relay T17 is for trunk No. 17, the one presently being considered, and relay TX is the last one in the group having access to the journal recorder. The above mentioned ground circuit may be traced through the winding of relay T17, its own back contacts No. 4, back contacts No. 3 of relay TX, serially through back contacts No. 3 of other relays T– which are higher in the order, serially through corresponding contacts lower in the order, conductor 28, No. 2 contacts of journal interrupter relay J1, back contacts of source battery relay SB to battery. Relay T17 operates in this circuit, closing front contacts No. 4 before it opens either of its back contacts. The opening of contacts No. 3 of relay T17 interrupts the chain circuit from battery at contacts of relay SB, thereby preventing any other trunk connecting itself to the recorder. Had any other relay T– been operated, the aforesaid chain circuit would have been opened thereby, to prevent relay T17 operating until said other relay had released. In the event of simultaneous attempt by two or more trunks to seize the recorder, the lower such trunk in the order will secure it to the exclusion of the others.

Operation of relay T17 extends ground from its No. 1 contacts through the winding of source connector relay SC17 to battery, causing the latter relay to operate. Ground at contacts No. 16 thereof is extended via conductor 59 through the lower winding of first recorder seizure relay FRS to battery, causing it to operate and lock up over its upper winding and No. 2 contacts to ground at contacts No. 1 of transaction completion relay TC'. Ground at front No. 3 contacts of relay FRS is extended through back contacts No. 1 of incomplete transaction relay IT, wiper of right hand bank of switch JS, bank terminal No. 1, upon which the wiper normally rests, lower winding of identifier required relay IR, back contacts of relay CI to battery at contacts No. 2 of relay T17, causing relay IR to operate. Operation of the latter relay extends ground from front contacts No. 1 of relay T17, No. 4 contacts of relay IR to the identifier start conductor 29. This conductor is common to all of the trunks having access to the journal recorder of Fig. 12. There may be a plurality of such recorders in an office, and each will have a start conductor corresponding to conductor 29. Ground on conductor 29 is extended to the winding of relay TG1. There is a corresponding relay for each group of trunks, i. e., each journal recorder. Relays TG– are connected in a manner similar to that of relays T– described above, which permits one, and only one, group of trunks and their associated recorder to be connected to the station identifier circuit represented by box 22.

When the trunk has access to the station identifier, relay TG1 operates over the above traced circuit, extended serially through contacts of other relays TG– to battery 22a in the station identifier. Operation of relay TG1 operates identifier connector relay IC1 over an obvious circuit to connect a plurality of conductors from the identifier to the journal recorder for trunk group No. 1. There is a relay IC– for each journal recorder.

The station identifier may be of any suitable type known to the telephone art for identifying a particular line and station, and as a result of such identification it connects to ground, in accordance with the data code used herein, conductors of four groups of four conductors each to designate the unit, ten, hundred and thousand of the calling station number. These groups of conductors are designated 31, 32, 33 and 34, respectively. The type of identifier assumed has connection to each of the sleeve (S) conductors of the telephone lines in the office. An alternating current is impressed on the sleeve of the trunk when a calling station is to be identified, as will be described, which is extended back through the first selector and line finder to the sleeve of the line connected to that trunk. The identifier detects this alternating current and effects circuit closures in response thereto to the data conductors to transmit the calling station number to the journal recorder. Where there may be more than one station per line, it is necessary for the identifier to be advised of the particular station which is calling. There are well known means for accomplishing this and such means are indicated by box 23. If it is assumed that there is a maximum of two parties per line, conductor 36 may be connected to ground by particular station identifier 23 if the call is originated at one of the two stations, and left open if it is originated at the other or at an individual line station. Where there are more than two parties, conductors in addition to that designated 36 may be used to inform the station identifier as to which particular station is calling. The identifier employs information received over conductor 36 in the designation of the calling station to the journal recorder.

It is assumed that there are two station identifiers such as 22 in the office, only one of which may be in serve at a time. The one indicated is designated No. 1. When relay IC1 operates, ground is connected at its No. 1 contacts to conductor 37, thereby designating identifier No. 1.

This ground is extended through contacts No. 13 of relay SC17 to the upper winding of identifier designation relay ID1, to windings of relays CI and IR in parallel to battery, causing relays ID1, CI and IR to operate. Relays ID1 locks up by a circuit which may be traced from battery, lower winding of relay ID1, No. 2 contacts thereof, back contacts No. 1 of relay IT, to ground at front contacts No. 3 of relay FRS. Relay CI operates and opens the operating circuit for relay IR, but the latter relay remains operated by virtue of the operating circuit which was traced through its upper winding. Had station identifier No. 2 been used, relay ID2 would have been similarly operated by ground on conductor 38 and locked up. Operation of either relay ID1 or ID2 indicates that an identifier is connected to the journal recorder, and ground on the No. 1 front contacts of either relay is extended through contacts No. 1 of relay IR to operate relay I. Operation of the latter relay substitutes grounded alternating current generator 39 for direct ground at its front No. 2 contacts. This alternating current, which may be in the order of 270 cycles per second, is extended by a previously traced circuit to the sleeve conductor S and thence through the switches to the sleeve conductor of the line of the calling station and thence by conductor 40 to the station identifier. The hold and ground conditions on the sleeve conductor are maintained by virtue of generator 39 being grounded. Operation of relay I grounds conductor 41 at its No. 1 front contacts to cause the particular station identifier 23 to advise the station identifier 22 as to which station on a party line is originating the call. The station identifier then grounds, on the assumption that the station number of the calling subscriber is 2947, conductor b of group 34, conductors b and d of group 33, conductor d of group 32, and conductors c and d of group 31, to designate, in accordance with the data code, the number 2947 to the journal recorder.

When relay SC17 operated, it connected terminals of a cross-connecting field 42 to conductors e, f, g, h and i of group 43. This field enables the identification of the source (transaction or trunk) to be set up by cross-connections which ground corresponding conductors in group 43. For the source identification code assumed, but not set out in detail since it is immaterial, trunk No. 17 may be designated by grounding conductors e, g and h.

With reference to Fig. 12, the journal record is indicated as a paper tape 44 having sprocket holes along its left hand edge which cooperate with a sprocket wheel 45. This wheel is driven an entry position each time stepping magnet 46 releases. A punch mechanism is indicated as PM. This may be of conventional type adapted to actuate individually punches designated 47 in response to the corresponding conductors connected at its top being grounded. Indicated grouping of the punches is merely to clarify the circuit diagram, and in practicing this invention the punches may be uniformly spaced transversely to the tape.

While the use of a punched journal record will be assumed in describing this invention, it will be understood that, instead of punching holes in a paper tape for the journal record, any suitable means for recording data for subsequent sensing may be employed.

As a result of grounding conductors in group 43 upon operation of relay SC17, corresponding holes are punched in the journal to identify the source and, as a result of the station identifier grounding conductors in groups 31, 32, 33 and 34, holes corresponding thereto will be punched to designate the calling telephone number. The recording of both identifications constitutes the first entry of the transaction, and this fact also is entered. Relay IR, which is operated, extends ground from its No. 3 front contacts, contacts No. 7 of relay SC17, conductor j of group 47 to actuate the corresponding punch.

Operation of relay SC17 also closed a circuit from ground at its No. 16 contacts, No. 2 back contacts of entry completion relay EC, winding of entry started relay ES to battery, causing the latter relay to operate. This relay substitutes direct battery to relay T17 for battery over conductor 28 from the back contact of relay SB. Relay SC17 also grounds conductor 48 at its contacts No. 15, which is extended through the winding of relay SB to battery, causing the latter relay to operate to disconnect battery from conductor 28.

After the station identifier has transmitted the calling station number for sufficient time for it to be recorded, it opens contacts No. 22a to release relay TG1 and therefore relay IC1. It also restores itself to normal and when this is completed, contacts 22a are again closed to indicate that it is available for another identification.

When any punch of puncher PM is operated, conductor 49 is grounded to operate punched relay PH by an obvious circuit. The latter relay extends ground from its No. 2 contacts through the winding of stepping magnet 46 to battery, causing it to operate and position its pawl. At its No. 1 contacts relay PH extends ground over conductor 50, contacts No. 12 of relay SC17 to contacts No. 2 of relay IR. These contacts are open as long as relay IR is operated. When the station identifier releases relay IC1, ground is removed from conductor 37 and relay IR releases, due to the circuit through its upper winding thereby being opened and the circuit through its lower winding being open at operated relay CI. The latter relay is slow to release, but relay IR immediately releases to extend the above traced ground at its No. 2 contacts through the winding of relay EC to battery, causing the latter relay to operate to indicate completion of the entry. Relay EC releases relay ES and opens at its No. 1 contacts the operating circuit for relay T17, which releases to release relay SC17 and thereby disconnect the trunk from the journal recorder. The operating circuits for all of the punches are thereby opened and ground is removed from conductor 49 to cause relay PH to release to, in turn, release stepping magnet 46 to advance the journal one entry position. Release of relay SC17 also disconnects ground from conductor 48, thereby permitting relay SB to release after an interval to reconnect battery to conductor 28 to indicate that the recorder is ready for another entry. Relay SC17 furthermore opens at its No. 16 contacts a previously completed operating circuit for the stepping magnet of switch JS, permitting it to release to advance the wipers to bank terminals No. 2. This completes the entry on the journal record of the calling line number.

2.3  *Entry of called office and station number*

When the four digits of the called number have been registered, switch DS is stepped to bank terminal No. 5, thereby connecting ground from front contacts No. 4 of relay H, wiper of switch DS to conductor 51. This indicates that dialing has been completed. If provisions are made for recording the party designation of a called station, as mentioned above, conductor 51 will be connected to a sixth terminal of bank DS. With such an arrangement, switch DS will be advanced to the sixth point after dialing of the party designation or, when an individual line is called, by time delay means, not shown, effective after the calling subscriber has had time to dial a party designation but does not do so.

Conductor 51 is connected to left hand bank terminal No. 2 of switch JS, and ground thereon may be traced through the wiper, back contacts No. 1 of relay EC, which releases shortly after relay SC17 released, to the winding of relay T17, to operate the latter relay as previously described. This relay operates relay SC17, which in turn operates relay ES, by previously traced circuits. Previously traced ground on the right hand wiper of switch JS is extended through bank terminal No. 2, contacts No. 17 of relay SC17, conductor 52, winding of the number called relay NC to battery, causing the latter relay to operate. This relay connects the four digit registers to data conductor groups 31, 32, 33 and 34. Inasmuch as the called number in this illustrative case is 8765, conductors a and c of group 34 are grounded by circuits which may be traced from front contacts No. 4 of relay H, contacts of relays Ra and Rc, contacts Nos. 16 and 14 of relay NC to conductors a and c of group 34 to designate the digit "8." Similarly, conductors c and d of group 33 are grounded to designate digit "7," conductors b and c of group 32 to designate digit "6," and conductors a and b of group 31 to designate the units digit "5." Cross-connecting arrangements 53 ground conductor c of group 35 to designate called Office No. 3. This trunk may be permanently connected to Office No. 3 and upper contact of relay NC may be permanently grounded rather than employing cross-connecting arrangements readily to permit any trunk being reassigned to another office, calls to which require bills to be prepared.

The data on conductor groups 31 through 35, inclusive, together with the source identification on group 43 provided by operation of relay SC17, are entered by the journal recorder and conductor 50 is then grounded. This results in the operation of relay EC to release relays T17, SC17 and ES as described. The stepping magnet for switch JS which was operated by relay SC17, is released to advance the wipers of switch JS to terminal No. 3. The journal record is also advanced for the next entry, it being understood that at the beginning of each entry relay SB is operated to remove battery from conductor 28 and is released at the end of an entry to restore this battery connection.

2.4 Entry of equipment used

Ground at front contacts No. 1 of relay ID1 is extended through left hand bank terminal No. 3 of switch JS, its wiper, back contacts No. 1 of relay EC, when it releases, to cause the recorder again to be connected to the trunk. Relay EC is slow to release, so that this start circuit is held open momentarily after each entry primarily to prevent a trunk low in the order immediately reseizing the recorder for the third entry without presenting opportunity for another trunk higher in the order to secure it for what may be a more urgent entry.

Operation of relay SC17 causes the source identification to be recorded. Grounding of conductor a of group 31 is provided to indicate that identifier No. 1 was used, the circuit therefor being traceable from ground at front contacts No. 3 of relay FRS, back contacts No. 1 of relay IT, wiper and terminal No. 3 of the right hand bank of switch JS, contacts No. 3 of relay ID1, contacts No. 10 of relay SC17 to conductor a of group 31. This entry is made, relay SC17 released, the journal advanced an entry position, and the wipers of switch JS are advanced to bank terminal No. 4.

It will be recognized that the source identification entered on the journal identifies the outgoing trunk used for the connection.

2.5 Entry of time of beginning of conversation

When the called telephone is answered, the direction of current flowing through the conductors from Office No. 3 is reversed to cause polarized relay P to operate. The latter relay operates called party answered relay CA over an obvious circuit to reverse the direction of current supplied the calling station. Relay CA connects ground at its No. 3 contacts to conductor 54, which is extended through the upper winding of relay CA1 to battery, causing the latter relay to operate. It locks up at its No. 2 contacts to ground previously traced to front contacts No. 3 of relay FRS. Relay CA1 extends ground from its No. 3 contacts to left hand bank terminal No. 4 and the wiper thereof to cause the trunk to be connected to the recorder, as has been described. Previously traced ground on the right hand bank wiper is extended through terminal No. 4, contacts No. 1 of relay CA1, contacts No. 11 of relay SC17, conductor 55, winding of time relay TM to battery, causing the latter relay to operate. Ground is extended from contacts No. 1 of relay TM, winding of timer connector relay TMC1 to battery, causing the latter relay to operate.

Relay TMC1 is individual to the recorder of Fig. 12. Each other recorder in the office may have a corresponding relay TMC– to connect its journal recorder with chronological cams shown at the top of this figure. If it is assumed that when relay TM is operated the time is 15:28.7, a circuit may be traced from ground, the upper left hand brush of the tens of hours cam, contacts No. 4 of midnight relay MDN, contacts No. 17 of relay TMC1, to conductor a of group 35 to the puncher, to designate that the tens of hours is 1. The numerals beside each cam brush indicate the positions of the cam in which ground is connected to that brush.

Ground may be similarly traced from the upper and lower left hand brushes of the hours cam, to conductors a and b of group 34 to designate the hour 5, from the tens of minutes cam to ground conductor b of group 33 to designate 2 tens of minutes, from the minutes cam to conductors a and c of group 32 to designate 8 minutes, and from the tenths of minutes cam to conductors c and d of group 32 to designate 7 tenths of a minute. This time, together with the source identification, is recorded and relay SC17 is released to result in relay TM and then TMC1 being released, and wipers of switch JS advanced to position 5.

The tenths of a minute cam is stepped every six seconds by clock, or the like, actuated contacts 56. They are closed momentarily at the beginning of each 6 second interval to cause stepping magnet 57 to operate and immediately release to advance the tenths of minutes cam one position. As previously set out, conventional carryover arrangements advance the successive cams in the order at the proper time. The time required for a journal entry to be made may be less than a second, but during even this short interval contacts 56 may close and open to advance at least the lowest order cam. This might result in an erroneous entry. This is prevented by disabling the stepping magnet. With relay TM operated, a circuit may be traced from ground, its No. 2 contacts, to contacts No. 1 of magnet 57. Should this magnet be operated with relay TM operated, the above traced ground will be extended through these contacts of the magnet to prevent its release. Since the lowest order cam is advanced upon release of this magnet, such advance is delayed until relay TM is released. This does not result in a general slowing of the chronological time, but merely the slight delay for one entry. Other recorders may be making time entries substantially simultaneously, however, which might delay advance of the cams for a second or two. Guard arrangements may be provided to prevent operation of relay TM of any other recorder while magnet 57 is being held operated. It is further contemplated that arrangements may be provided to bring in an alarm and disconnect a recorder from the timer if it does not release itself within, say, two seconds. Chronological time cams may be provided individual to each recorder, in which case the use of common clock contacts would make desirable electrical separation of the magnet operating circuits.

2.6 Entry of time of conclusion of conversation

Conclusion of the conversation is indicated by the release of relay L and then relay H, to result in the hold ground being removed from the sleeve conductor and the release of the line finder and first selector. Release of relay H results in ground at its back contacts No. 4 being extended through the off-normal contacts ON of switch DS, to cause its release magnet to be operated to permit its wiper to spring back to normal and thereby open its contacts ON. Locking ground for the digit register relay is opened at front contact No. 4 of relay H.

When relay CA operated, ground thereby placed on conductor 54 was extended through resistance R1 to operate free time relay FT after an interval for reasons to be described. It locks up to ground over its lower winding and No. 2 contacts at front contacts No. 3 of relay FRS. When relay H releases, it extends ground from its No. 4 back contacts over conductor 58, No. 1 contacts of relay FRS, lower winding of time out relay TO to battery, causing the latter relay to operate and then lock up over its upper winding and No. 2 contacts to ground at front contacts No. 3 of relay FRS. Relay TO extends ground from its No. 1 contacts, to left hand bank terminal No. 5 of switch JS to cause the trunk to be connected to the recorder. Ground on the right hand bank wiper is extended through terminal No. 5, contacts No. 3 of relay TO, contacts No. 11 of relay SC17, conductor 55, to operate relay TM to cause the chronological time to be entered by the recorder. It will be assumed, in connection with description of the analyzer, that this time is 15:35.9. The source identification is also entered. Relay TO extends ground from back contacts No. 3 of relay IT, its No. 4 contacts, contacts No. 6 of relay SC17, conductor k of group 47 to cause the designation of the last entry of the transaction.

The ground circuit traced through contacts No. 1 of relay FRS is also extended through the upper winding of relay TC' to battery at contacts No. 18 of relay SC17, causing relay TC' to operate. It locks up over its lower winding and No. 2 contacts to ground on the front contacts No. 3 of relay FRS and opens the locking circuit for relay FRS, but the latter does not now release due to its original operating circuit from ground at the No. 16 contacts of relay SC17 being completed. When relay SC17 is released at the conclusion of the entry, relay FRS releases and releases the several relays locked to ground at its No. 3 front contacts. Ground at the No. 3 back contacts of relay FRS is extended through contacts No. 1 of off-normal contacts ON of switch JS and the release magnet thereof, causing its wipers to be released and to spring back to normal, whereupon the off-normal contacts are opened. The trunk circuit is now normal and ready to handle another transaction.

2.7 Entry to indicate an incomplete transaction

It may be that the called line is busy, the called station is not answered, or the call is abandoned for other reasons. If relay H is released as a result of this without relay CA having been operated for several seconds, an entry indicating an incomplete transaction is made in the journal. An incomplete transaction is indicated by release of relay H without relay FT having been operated. Ground from back contacts No. 4 of relay H connected to conductor 58 is further extended, in this event, over contacts No. 1 of relay FRS, Contact No. 1 of relay FT, upper winding of incomplete transaction relay IT, to battery, causing the latter relay to operate and lock up by its lower winding to front contact No. 3 of relay FRS. Relay IT, at its No. 3 contacts, causes the trunk to be connected to the recorder. At its No. 2 contacts it extends ground via contacts No. 8 of relay SC17 to ground conductor m of group 47 to cause a corresponding journal entry to be made to indicate an incomplete transaction, together with the source identification.

It may be that a wrong number is dialed, which can be determined within a few seconds after the called party answers. Arrangements are provided whereby this results in an incomplete transaction. When relay CA operated, it completed a circuit for relay FT which was previously described. This circuit extends through resistance R1, to which is connected condenser C1. This condenser must be charged to a predetermined potential before relay FT will operate. By choice of the capacity of condenser C1 and the value of resistance R1, the operation of this relay may be delayed for a predetermined number of seconds. Should relay H release before relay FT operates, relay IT will be operated to cause the entry on the journal of an incomplete transaction as described.

It will be noted that the time to be billed for a complete transaction does not have the operating time of relay FT deducted from it, since the time of the start of conversation is entered as soon as relay CA is operated. It will be understood, that, if desired, some other entry may be made rather than that for an incomplete transaction when the calling subscriber hangs up before relay FT operates. Relay TC' is operated as previously described and upon release of relay SC17, relay FRS is released to restore the circuit of Fig. 11 to normal.

It may be that relay H will be released while the trunk is connected to the recorder to cause an incorrect entry to be made. This is prevented by providing a locking circuit for relay H from battery, its upper winding, its contacts No. 1, conductor 59 to ground at contacts No. 16 of relay SC17, so relay H is held up until relay SC17 is released, indicating that the trunk is disconnected from the recorder.

It will be recalled that relay FRS is operated incident to the operation of relay SC17 for making the initial entry of a transaction. Relay FRS provides at its No. 3 contacts, holding ground for various circuit elements of Fig. 11. Should a call be abandoned immediately after the trunk is seized and before the first entry is made, nothing will be entered on the journal concerning that call, if abandonment comes at any time subsequent to the first entry having been made, operated relay FRS assures that either complete entries of a transaction or indication of an incomplete transaction are recorded. Every transaction opened on the journal is closed on it, as pointed out before.

The trunk circuit of Figs. 10 and 11 is so designed, as a further feature of this invention, that after release of the trunk incident to the calling subscriber restoring his receiver, or the like, it is almost immediately available after release of relay H for use with another call from Office No. 5 to Office No. 3, even though the concluding entry of the complete or incomplete transaction has not been entered on the journal.

2.8. Daily separation of journal record

It is desirable, as pointed out above, to provide for daily separation of the journal at or about midnight in such manner that all transactions of the old day will be completed thereon before those for the new day are started.

Each midnight, contacts 60 are momentarily closed by clock arrangements to operate record dividing relay RD of Fig. 12 by a circuit from ground at said contacts, lower winding of said relay to battery, causing it to operate. A circuit may then be traced from battery, contacts No. 4 of relay RD, the upper winding of source test relay ST to conductor 61. This conductor is common to all sources served by this recorder or, as will be pointed out, groups of sources. Any trunk which has made at least one transaction entry, but the transaction has not yet been completed, will have the off-normal contacts of its switch JS operated. Conductor 61 is connected to the No. 2 off-normal contacts ON of all of the trunks served by this recorder, so if any of them is in process of handling a transaction, conductor 61 will be grounded thereby to operate relay ST. Operation of relay ST provides an obvious locking circuit for relay RD, causing it to be held operated when contacts 60 are opened. A circuit may also be traced from ground at the front contacts of relay ST, through contacts No. 2 of relay RD, winding of midnight relay MDN, back contact No. 2 of stepping magnet 57, if it is released, to battery. Contacts 56 and 60 concurrently close at midnight so relay MDN will not be operated until the magnet releases, since this might cause an erroneous entry if a source is making a time entry at this instant. It will be recalled that magnet 57 is held operated under this condition. When relay MDN operates, it connects battery at its No. 1 contacts directly to the upper terminal of its winding so that it will not release upon subsequent operations of magnet 57.

It is the purpose of relay MDN to continue the chronological time beyond 24 hours should any source (trunk) be off normal at midnight. Should any trunk be off normal, or several trunks maintain an overlapping off normal condition for an hour, relay MDN and associated relays to be described, will then result in the chronological time being indicated as the 25th hour, indicating one o'clock of the next day. Should this condition prevail for two hours, the indicated time will be 26 o'clock, and so on. This is accomplished by relay MDN disconnecting brushes of the hours and tens of hours cams from the conductors connected to groups 34 and 35, respectively, by the operation of connector relay TMC1, and effecting certain circuit operations as will now be described.

Assuming relay TMC1 is operated, ground may be traced from No. 9 front contacts of relay MDN, contacts No. 18 of relay TMC1 to conductor b of group 35 to indicate tens of hours digit "2" as long as relay MDN is operated. Three relays H24, H25 and H26 representing, respectively, the 24th, 25th and 26th hours are arranged to extend ground to conductors in group 34 for the codes for digits 4, 5 and 6, respectively, when operated.

When relay MDN operates at midnight as a result of a source being off normal, ground is extended from its No. 2 contacts, No. 3 contacts of relay H26, No. 3 contacts of relay H25, winding of relay H24 to battery, causing the latter relay to operate to place ground on conductor d (digit 4) of group 34 when relay TMC1 is operated. It is contemplated that the first hour after midnight is normally indicated by absence of digits in the tens of hours and hours position.

At 1 o'clock, ground is connected to the upper left hand brush of the hours cam and this ground is extended through the No. 8 front contacts of relay MDN to operate relay H25, which opens at its No. 3 contacts the operating circuit for relay H24, which releases. The Nos. 1 and 2 contacts of relay H25 place ground on conductors a and b of group 34 for the digit "5." Similarly, relay H26 operates at 2 o'clock to provide the code for digit "6," and to maintain open the operating circuit for relay H24.

Should all of the sources be restored to normal simultaneously even momentarily during the three hours after midnight, ground will be disconnected from conductor 61 and relay ST will release. It opens the locking circuit for relay RD, which releases after a short interval during which a circuit may be traced from the back contact of relay ST, front contacts No. 1 of relay RD, winding of journal interrupter relay JI to battery, causing the latter relay to operate. At its No. 1 contacts the latter relay extends ground through the back contacts of stepping magnet 46, winding of this magnet to battery, causing this magnet to operate and release repeatedly to provide a blank space in the journal record. The latter circuit is maintained for substantially the combined releasing times of slow to release relays RD and JI, which may be designed to provide as much blank space in the journal as desired.

Relay JI opens at its No. 2 contacts the battery circuit over conductor 28 to prevent any source connecting itself to the recorder while the journal is being spaced.

Release of relay ST also releases relay MDN to reconnect the brushes of the hours and tens of hours cams to contacts of relay TMC1, so the next chronological entry will be in accordance with the time of the new day. Whichever of relays H24, H25 and H26 is operated will also be released.

It will be noted that the lower winding of relay ST is connected on one side to battery at contacts No. 5 of relay RD and on the other to conductor 48, which is grounded by any operated relay SC- of the group of sources served by the recorder. It is the purpose of this connection of relay ST to prevent its release in the event a source is connected to the recorder incident to initial entry of a transaction at the instant the last other source which was off normal is restored. At this instant all contacts ON of switches JS will be normal, so this connection to relay ST prevents an otherwise unguarded interval.

While it is contemplated that relay MDN and associated relays H- will be individual to each recorder, where there is very light early hours traffic, two or more recorders may be served by one such group of relays by minor circuit changes. It also will be understood that arrangements of H- relays may be provided to extend the carryover period as long as desired. If relay MDN has not released before, say 3 o'clock, the operation of a relay H27 may be made to provide an alarm so that an attendant can find directly, or by remotely controlled facilities, the trunk or trunks off normal and arrange for their release.

3. MARKED JOURNAL ANALYZER AND LEDGER RECORDERS

Figs. 13 and 14, when arranged in accordance with Fig. 8, set out means for analyzing a record prepared in accordance with the apparatus shown in Figs. 10, 11 and 12 and preparing ledger records therefrom of the transactions recorded thereon. It will be assumed that the ledger records so prepared comprise punched cards of the type shown by Fig. 5, but other types of ledger records can be prepared, as will be understood by those practiced in the art.

With respect to Fig. 13, the journal record bearing entries is shown at the bottom. A ledger selector is indicated at the right of this journal and comprises a group of relays with their contacts arranged in the familiar pyramid manner whereby one, and only one, circuit may be traced serially through their contacts for any operated combination of relays, said relays being operated by the sensed source identifications recorded on the journal. Above this is another group of relays to decode the sensed digits, and their contacts are also arranged in pyramid fashion. If ledger data are entered in code, decoder arrangements may be omitted from the analyzer. Along the left of this figure is a group of relays connected to form a counting chain. It is their purpose to selectively make connections between groups of sensing brushes, or elements of similar purpose, of the analyzer and the data decoder, a digit at a time. Relays at the top of Fig. 13 are for the purpose of controlling the analyzer.

At the bottom left of Fig. 14 are shown four of the ten punch magnets designated M- for making entries in the ledger card. Where printed ledger records are desired, magnets M- may be adapted to actuate type keys, or the like, for this purpose. One of a plurality of manually operable selecting dials common to the analyzer for supplying data for entries on the ledger card other than those which are carried by the journal and comprising, in this illustrative arrangement, the date and the designation of the office in which the journal was prepared, is designated "Day Selector." The other six selectors and associated connector relays are indicated by function designated boxes along the left. At the top of the figure is a ledger connector relay designated L17, which corresponds to trunk or source No. 17 of Figs. 10 and 11. Two cams, preferably of the sequence switch type, are positioned in accordance with the position of the ledger card in the recorder to provide proper longitudinal orientation of it for the successive entries. The elements of Fig. 14 are restricted, with exceptions to be noted, to ledger recorder No. 17.

Appropriate means, as will be subsequently outlined, supply fresh cards to the puncher. The two cams designated CM1 and CM2 are driven by the same means employed to drive the cards through their successive entry positions. These cams are cut for 45 positions corresponding to the positions of the card, and the cams and the card in the punching mechanism are adapted to occupy the same position, i. e.. if the card is in entry position No. 36, the two cams likewise will be in position No. 36. The ledger cards are driven in the direction from left to right in Fig. 5, so entries are made in the descending order of entry designations thereon. The cams likewise are revolved in reverse direction with respect to numerical indication of their cuttings. These cuttings are designated by numerals associated with each brush to indicate the positions in which each brush is connected to the conducting element of the cam. Designations such as 36/4 indicate brush closure for positions No. 36 to No. 4, inclusive. The open face brush of each cam provides a ground supply circuit for all positions of its cam. The ledger card and associated cams are driven an entry position at a time upon release of stepping magnet 68.

It will be assumed, for initiating description of the analyzer and ledger recording arrangements, that a card is in the puncher in entry position No. 36 and has had the date entered on it, as will be described. Relay LA is now operated by an obvious circuit through brush No. 2 of cam CM1.

The journal record 44 passes over sprocket drum 62 and is driven thereby, an entry position at a time, in the direction indicated by the associated arrow. It will be noted that this direction is opposite to that in which this record was prepared, as indicated by the arrow associated with this record in Fig. 12. This provides analysis or sensing in the reverse order to that in which the entries were made, for reasons previously set out. Drum 62 is stepped an entry position each time stepping magnet 63 is released after being operated.

The data and other entries are sensed by any suitable sensing means, herein conventionally indicated as brushes or contact springs 64 cooperating with fixed grounded plate 66 in such manner that for each punched hole a corresponding brush is grounded. The journal is stopped for each entry position with the corresponding row of entry holes centered under the sensing brushes. After a sensed entry is made by the ledger recorder, the journal is stepped to the next entry position.

Two of five groups of data conductors are designated 131 and 132, which correspond, respectively, to groups 31 and 32 of Fig. 12, which are for the two lowest digits in the order. It will be understood that for a maximum of five data digits in an entry, as assumed in connection with the journal recorder, there will be three other groups of data conductors corresponding to groups 33, 34 and 35 of Fig. 12. The record shown by Fig. 12 is longitudinally broken, in Fig. 13, with the latter three entries, associated brushes and data conductors omitted, since operations effected thereby are substantially repetitive of those to be described with respect to the two groups shown. It will be recognized from what has been set out and what follows that the employment of a total of five data digits is merely for convenience in setting out this embodiment of the invention, and there is no inherent limitation to so small a number either with respect to the journal or ledger arrangements.

Conductor group 143 corresponds to group 43 of Fig. 12 and is for the purpose of transmitting sensed source designations to the ledger selector. Group 147 corresponds to group 47 and has conductors for designating the beginning and the end of transactions, and incomplete transactions.

3.1 Journal analysis and ledger recordings

Let it be assumed that the journal has been placed in the analyzer at the start of analysis with a blank entry position under the sensing contacts, and the first entry to be sensed is the last one of the complete transaction previously described in connection with preparation of the journal. It will be recalled that this is the chronological time of the end of the conversation, which was assumed to be 15:35.9. In practice, the first entry to be sensed normally will be a time entry around midnight. This entry carries with it the identification of source or trunk No. 17, and indication of the end of a completed transaction.

Start key SK, which is of the locking type, is closed to energize the analyzer. Impulse key IK is then manually operated and released to correspondingly operate and release magnet 63 to advance the journal to where its first entry holes are under the sensing contacts. Brushes connected to conductors e, g and h of group 143 are grounded on block 66 to result in the operation of relays Le, Lg and Lh, battery supply for which is commonly furnished at contacts No. 3 of disable test relay DT. This is the reproduction of the identification of source No. 17. A circuit may now be traced from ground, winding of recorder connected relay RC, the apex of the pyramid of contacts of the ledger selector, serially through the contacts thereof, not shown, to terminal No. 17, conductor 67, winding of ledger connector relay L17, contacts of self advance relay SA to battery at contacts of ledger available relay LA, which is now operated. This results in the operation of relays L17 and RC in series. The former relay connects the ledger recorder to a group of numerical conductors designated 69 and other conductors common to the group of ledger recorders for interchange of information between the analyzer and a connected recorder. Relay RC, upon operating, indicates that a recorder is connected to the analyzer and is available to receive a sensed entry.

A circuit may be traced from ground at the No. 2 contacts of relay RC, contacts No. 4 of relay DT, normally closed contacts of key IK, winding of magnet 63 to battery, causing the latter magnet to operate to position its pawl.

Ground at key SK is extended through the No. 2 contacts of relay DT, No. 2 contacts of punched relay PD, back contacts No. 2 of analyzer digit one relay AD1, winding of relay AD1', normally closed contacts No. 1 of relay AD1 to battery at contacts No. 1 of relay DT. Relay AD1' operates and connects conductor group 131 to windings of the four data decoder relays D–. It also, at its No. 1 contacts, extends ground to the upper winding of relay AD1, but the latter does not now operate since the ground circuit for the operation of relay AD1' is connected to the other side of its (relay AD1) winding at its No. 2 back contacts.

The digits of the associated data entry were sensed concurrently with the sensing of the source identification. The lowest digit of this data entry, on the basis of the time of completion of the transaction being 15:35.9, is a "9," which results, in accordance with the code, in conductors b and d of group 131 being grounded. These grounded circuits may be traced through contacts Nos. 4 and 2, respectively, of relay AD1', windings of relays Db and Dd, respectively, winding of decoder operated relay DO to battery to result in relays Db and Dd jointly operating in series with relay DO, which also operates. The latter relay may be slightly slow to operate to assure complete operation of decoder relays before it closes its No. 2 contacts. When the latter occurs, ground may be traced from these contacts, winding of punch magnet test relay PMT, back contacts of relay Da, front contacts No. 2 of relay Db, back contacts No. 2 of relay Dc, front contacts No. 2 of relay Dd, conductor 70 of group 69 (for digit "9"), contacts No. 8 of relay L17, winding of punch magnet M9, winding of ledger punched relay LP, contacts No. 3 of ledger disabled relay LD, No. 1 contacts of relay LS to battery at contacts of relay FET, which is now operated, as will be described later. Punch magnet M9 operates in this circuit and, by suitable mechanical arrangements, effects the punching of a hole at the ninth level of entry position No. 36 of the card of Fig. 5. Relays PMT and LP also operate in this circuit, the latter relay after a slight delay to assure that the punch operation is completed. When relay LP operates, it extends ground at its No. 1 contacts, contacts No. 2 of relay L17, conductor 71, winding of punched relay PD to battery, causing it to operate. Operation of the latter relay opens the previously grounded circuit traced through its lower contacts to back contacts No. 2 of relay AD1. This opens the ground shunt of the upper winding of the latter relay, permitting it to operate in series with relay AD1' by a circuit which may be traced from ground at the No. 1 contacts of relay AD1', upper winding of relay AD1, winding of relay AD1', normally closed contacts No. 1 of relay AD1 to battery at contacts No. 1 of relay DT. Relay AD1 locks up to the latter battery at its No. 1 contacts and opens battery supply for relay AD1', which releases to disconnect the data decoder relays from sensing brushes of conductor group 131, and operated relays Db and Dd, together with relays DO and PMT, release. Operation of relay AD1 also extends, at its front contacts No. 2, the circuit from contacts No. 2 of relay PD to the armature spring No. 2 of relay AD2 for the second digit.

Operation of relay LS of the recorder, by a circuit through contacts No. 2 of relay LP, extends ground at its No. 2 contacts, winding of the card stepping magnet 68 to battery, causing the latter magnet to operate and position its pawl. Relay LS also opens, at its No. 1 contacts, the operating circuit for relay LP, permitting it to release, which, in turn, opens the operating circuit for relay LS which, after a short interval, releases to open the operating circuit for magnet 68, which releases to cause the ledger card and cams CM1 and CM2 to be advanced to position No. 35.

Release of relay LP opens, at its No. 1 contacts, the previously traced circuit which operated relay PD over conductor 71, causing the latter relay to release. Relay PD closes, at its No. 2 contacts, a ground circuit which now extends to the No. 2 armature spring of relay AD2. Relays AD2 and AD2′ are connected in a manner identical to that of relays AD1 and AD1′, respectively, so this ground results in the operation of relay AD2′ to connect the sensing brushes of conductor group 132 to the data decoder relays D– in a manner similar to that previously described. This results, since the minutes digit of the assumed time is "5," in the operation of relays Da and Db. Relay DO reoperates in series with the latter relays and extends ground through the winding of relay PMT, serially through contacts of the decoder relays, conductor 72 for digit "5," contacts No. 12 of relay L17 to operate punch magnet M5, not shown. This results in the reoperation and subsequent release of relays LP, LS and PD to effect advance of the ledger card and associated cams to position No. 34, operation of relay AD2 and, therefore, the release of relay AD2′, release of relays Da, Db, DO and PMT, substantially as previously described. Relay PD is also released to operate relay AD3′, not shown, to cause the sensing and recording of the tens of minutes digit "3" in a manner such as that just described for the two lower order digits.

The succeeding digits are similarly sensed, decoded and recorded on the ledger card. After the fifth, or last, digit of the entry has been recorded, the ground extended serially through the No. 2 front contacts of operated relays AD– upon release of relay PD, is extended through the winding of final digit relay FD to battery, causing the latter relay to operate. It operates relay DT by an obvious circuit. The latter relay opens its No. 4 contacts to release stepping magnet 68 to advance the journal to the next entry position, opens its No. 3 contacts to disconnect battery from ledger selector relays L–, permitting them to release and to thereby release relay RC, open the operating circuit for relay L17 to result in ledger recorder No. 17 being disconnected from the analyzer. At its No. 2 contacts relay DT interrupts the ground circuit through No. 2 contacts of relay PD to relays AD–, and, at its No. 1 contacts, opens holding battery for relays AD–, permitting them to release. Release of the latter relays opens the operating circuit for relay FD, which releases to release relay DT, whereupon the analyzer is in the same condition as it was at the beginning of sensing of the lowest order digit of the previous entry. The ledger card and the cams of recorder No. 17 are now in position No. 31, awaiting the next entry.

The second journal entry is sensed, the ledger recorder corresponding to the sensed source identification thereof is connected to the analyzer, the digits of this entry are decoded and recorded on the ledger record card, a digit at a time, the ledger recorder is released and the journal advanced to the next entry position.

In a similar manner, successive journal entries in the reverse order of their entry, are entered on the appropriate ledger cards. These entries may be various ones of many transactions before the next entry, the chronological time of the beginning of conversation, for ledger No. 17 is encountered.

The next entry for ledger recorder No. 17 is the time of start of conversation, which was 15:28.7. The source identification selects ledger recorder No. 17, and the sensed data digits are entered on the card thereof in the order 7-8-2-5-1 in card positions Nos. 31 to 27, and the recorder is then released with the card sequence cams having been advanced to position No. 26. The analyzer there advances the journal to its next entry position.

Entry positions Nos. 26, 25 and 24 of the card are not used for this type of transaction and the ledger recorder is adapted to skip these positions. The upper left hand brush of cam CM1 is grounded in positions Nos. 26, 25 and 24. This ground is extended through contacts No. 2 of relay SKP, back contacts and winding of stepping magnet 68 to battery, thereby providing a self-interrupting circuit to cause it to operate and release repeatedly, advancing the card and cams one position each time it releases, until this circuit is opened in position No. 23. Self-advance relay SA is also connected to the latter described circuit so it is operated while magnet 68 is operating and releasing as described. This relay opens the previously traced circuit for the operation of relay L17, thereby preventing connection of the recorder to the analyzer while vacant card positions are being skipped.

The following entry on the journal from trunk No. 17 is the designation of the station identifier used in connection with the call record. In this illustrative example, this designation is the digit "1" in the lowest order position for this entry. Recorder No. 17 is selected as has been described, and this entry made in card position No. 23. The card and cams are then advanced to position No. 22. Relay AD1′ was operated incident to this entry, then released and relay AD2′ operated. There is no entry on the journal in this position, since the only apparatus identified in data positions of this entry is that for the station identifier. The release of relay PD incident to completion of punching of the designation of the station identifier completes a circuit from battery, winding of last digit test relay LDT, contacts No. 1 of relay PD, No. 1 contacts of relay DO to ground at the front contacts of relay RC. It will be seen that each time relay PD releases with relay RC operated, this operating circuit for relay LDT is completed. Relay LDT is slow to operate, and when there is a digit sensed on the journal, the resulting operation of a decoder relay D–, and consequent operation of relay DO, will occur before relay LDT operates, so the operating circuit for relay LDT will be opened at contacts of relay DO. When relay AD2′ connects conductor group 132 to the data decoder relays for the second digit to be decoded, the absence of an entry in this position will prevent any relay D– operating, so the circuit to relay LDT will remain completed and it will operate. It extends ground at its contacts to operate relay DT by its lower winding. This results in the release of operated relays of the analyzer, release of relay L17 and advance of the journal to the next entry position as has been described.

Each time relay L17 operates it completes a circuit from ground at its No. 1 contacts, winding of skip position relay SKP to battery, causing the latter relay to operate. It consequently is operated each time the recorder is connected to the analyzer. When relay SKP is released after entry of the designation of the station identifier, a circuit may be traced from ground at the upper left hand brush of cam CM1, contacts No. 2 of relay SKP, and the previously traced circuit through the back contacts of magnet 63 to cause it to advance the card and cams to position No. 15, whereupon this circuit is opened at the brush in accordance with the cam cutting to stop the card and cams in this position.

Comparison of the positions in which the upper left hand brush of cam CM1 is grounded and the ledger card of Fig. 5 will indicate that it is open for the lowest digit positions of the time of end of conversation, time of start of conversation, equipment used, and called number, and closed in the remaining positions for these entries, with the exception of entry position No. 15. If skip station key SSK and, therefore, skip station relay SS, are operated for reasons to be described, the upper left hand brush of cam CM2 supplements the corresponding brush of cam CM1 to make position No. 14 the lowest order position. After the lowest order digit of any entry is entered on the ledger and the ledger recorder is released, these arrangements result in the ledger card being advanced automatically to the lowest order position for the next entry.

This arrangement sets out one of the features of the invention which was mentioned, in that it provides a simple means for proper location of the digits of successive entries on the ledger. Should the digits of an entry be sensed sequentially from the highest to the lowest order, it would be necessary to provide arrangements to orient the first digit to be entered, since it may come in any of the digit positions. This would require special orienting arrangements or the entry on the journal of designations indicating the absence of digits in the digit positions, at consequent increase in holding time of various of the elements. This requirement for special orienting means is obviated in accordance with this invention in which the digits are sensed in the ascending order.

This feature is particularly desirable for application of this invention to financial accounting where many entries of widely variable magnitude are involved since, after each entry has been completed, the ledger is advanced to the cents position for the next entry.

The next entry for ledger No. 17 is the called number 3-8765. It was indicated above, and will be here assumed, that call data entered on the journal now being considered will be to offices without additional station designation, such as a party letter for stations in manual offices. Key SSK is associated with the analyzer and, when operated prior to analysis of a journal, operates relay SS in each of the ledger recorders to advance the ledger card, after entry of the station identifier designation, to entry position No. 14. The digits of the called number are then sensed and entered, with the office designation "3" in position No. 10. Release of the recorder will cause positions Nos. 9 and 8 to be skipped.

3.2 *Entry position selection*

Arrangements for changing the lower order position in the ledger card for an entry selectively by operation of key SSK discloses a principle which may be widely and advantageously employed in the practice of the invention to position entries in any of a plurality of locations on the ledger. Other cams may be provided and brushes thereof corresponding to the upper left hand ones of cams CM1 and CM2 may be connected selectively to the back contacts of relay SKP by relays, keys or other appropriate means, such as a multi-contact switch, so that the number of entries to be made, their positions on the ledger, and the number of digits which can be made for each entry, may be defined within wide limits.

Such selective arrangements for all of the ledger recorders served by an analyzer may be jointly operated by a single control or the recorders separately set in advance of a journal analysis in accordance with the entries which may be directed to them. Where individual ledger recorder adjustment to this end is appropriate, the selective skipping of entry positions may well be effected by a dial on each recorder driven in synchronism with the ledger and in which contact actuating keys may be selectively placed in accordance with widely used street traffic controller arrangements. Reid Patent No. 2,339,111, January 11, 1944, discloses such a dial arrangement and furthermore indicates that two rows of contact actuating keys may be provided to actuate separately two sets of contacts at any of a large number of positions.

Application of a dial such as that of Reid, supra, to the present invention is indicated schematically by Fig. 15. The dial 82 is driven one revolution for a complete ledger card service in synchronism with the card and associated cams. Two sets of contacts 83 and 84 are adapted to be opened separately by keys in the outer row of slots 85 or the inner row 86, respectively. These contacts perform functions previously described as controlled principally by the upper left hand brush of cam CM1, which may be omitted with this modification. Relay SS' may be individual to each recorder and key SSK' may be associated with the analyzer to operate relays SS' of the several recorders to transfer control from the outer row of keys to those of the inner row.

The slots in the dial may be numbered in accordance with the data entry positions on the card. A key inserted in the slot designates the position of the lowest order digit of an entry. The number of keys in a row of slots determines the number of entries for a complete transaction controlled by keys in that row. Key 87 is indicated as opening contacts 83, defining the position of a lowest order digit. There are five keys in this row, so a transaction controlled thereby comprises five entries from the analyzer. The keys in the inner row indicate only three entries for a complete transaction. Additional dial arrangements may be provided with selective relays and keys therefor to provide for other transaction entry controls.

The armature spring of relay SS' is connected through contacts of relay SKP to the back contact of stepping magnet 68. Ground is supplied contacts 83 and 84 by cam CM3 with a brush which is grounded for positions Nos. 36 through 4, inclusive, which are the positions for entry of data by the analyzer.

When the lowest order digit is entered in the position controlled by key 87, contacts 83 will be closed but relay SKP is operated during each complete entry, so magnet 68 will not now be affected. When the entry is completed and relay SKP is released, ground is extended to close the self-interrupting circuit for magnet 68, causing the card, cams and dial to be advanced until key 88 opens contacts 83 for the lowest digit position of the next entry.

The arrangements shown by Fig. 14 indicate that the ledger card, or the like, used therewith will have a predetermined total number of digit positions. The number of digit positions of the ledger may be varied by substitution in the control circuits of differently cut control cams or providing selectively operable arrangements such as a dial with keys generally similar to that described.

This selective positioning of entry locations is of particular advantage where the ledger entries are printed by type keys, or other suitable means, on ledger forms. It may be desirable to employ various ledger forms with different entry column spacings or entry locations with the ledger recorders for various types of data entries. The data entry positions may be readily set up to conform to the ledger form in accordance with these arrangements. This is, of course, also true of punched hole or other types of ledger records.

This feature may be further illustrated by reference to the card of Fig. 5. Arrangements have been described for making numerous entries of varying numbers of digits on it. Let it be assumed that, for some particular purpose, only two entries are required, the lowest order digit of one of these to be entered in position No. 31 and of the other in position No. 17. The dial may be set with keys in these two positions, or other suitable selecting means conditioned for the equivalent result. When a fresh card is entered in the recorder, as will be presently described, the recorder will immediately advance it to position No. 31. After this entry is made, whether it comprises one digit or fourteen, the card will be advanced to position No. 17 for the next entry. After the latter is made, the card will be advanced to position No. 0, irrespective of whether one or seventeen digits comprise the entry, and the card will be discharged, as also will be described. It will be recognized that the ledger card may, by these means, be divided up selectively for as many entries, in any card positions, as desired within the capacity of the card in light of the number of digits which may comprise the several entries. This provides the very desirable feature of substantially complete flexibility in the practice of the invention to widely varying data and ledger requirements.

It is to be understood that the selection of ledger entry positions may be effected by control indications carried by the journal which may be adapted to operate one or more relays such as SS' to select the appropriate positions for transaction entries as a whole or the individual entries thereof. In the practice of the invention for preparation of financial, stock and similar records, for example, designation of debit and credit entries may be effective to select corresponding ledger positions or columns for entry of data thereon, as illustrative of the principle disclosed.

Arrangements shown herein contemplate that the ledger record is moved past fixed recording means disclosed as punches. It is to be understood that the significant requirement is relative movement between the record medium and means to make entries thereon. Where the recording means is movable, such as a moving carriage typing unit, and the card is stationary while an entry is being made, entry positions for the lowest order digit may be selected by control of the movement of the recording means.

3.3 Concluding entries and card replacement

The next, and last, entry of this transaction for recorder No. 17 is the number of the telephone from which the call was placed, or 2947 in this case. This entry is sensed and the entry made in entry positions Nos. 7 to 4, inclusive, the card and its cams advanced to position No. 3 for entry of the calling office designation, and relay L17 released.

The calling office is designated in this case by the single digit "5." This digit is set up by means of a dial included in the box designated Office C. An identical dial is indicated for the day selector and it, with associated arrangements, will be described. The day selector dial and those included in the boxes may be common to the analyzer and the connector relays therefor, such as relay DR, are individual to the recorders.

The day selector may be positioned manually by a knob 73. It positions a grounded wiper on any one of eleven bank terminals. Should relay DR be operated, the ten numerical terminals of the bank are connected to the ten punch magnets, or the equivalent, M—. With the setting of the wiper shown, magnet M2 will be operated by an obvious circuit to cause the entry of digit "2."

A selecting switch for separate entries SE, comprising a bank of terminals, a wiper therefor, a stepping magnet, and a release magnet with off-normal contacts ON, is provided to control the operation of the connector relays similar to relay DR for connecting the several selectors to the punch magnets. When the four digits of the calling station number have been entered, the wiper of switch SE will be on bank terminal No. 5, as will be subsequently described.

Upon advance of the card and cams to position No. 3 and release of relay L17, special entry relay SER is operated from ground on the lower left hand brush of cam CM2. At its No. 2 contacts, relay SER connects the stepping magnet of switch SE in parallel with magnet 68, and at its No. 1 contacts it extends ground to the wiper of this switch which is effective to operate the connector relay, not shown, for entry of office digit "C" by connecting the bank terminals of the selector thereof to the punch magnets. This selector will have been previously set on terminal No. 5 as noted below to cause the entry of digit "5" on the card in position No. 3. Relays LP and LS are also operated as was described to close the circuit for magnet 68 and also to the stepping magnet of switch SE. Both operate the position their pawls, and upon subsequent release to relay LS and the operated stepping magnets, the card and cams are advanced to position No. 2 and switch SE to position No. 6 to operate the associated connector relay. There is no entry to be made for this position, so the selector wiper therefor will be on the terminal for a vacant entry position designated V. As shown in connection with the day selector, this terminal, upon operation of the connector relay, extends ground through a resistor similar to R10, which is of substantially the same resistance, and similarly connected, as a punch magnet to operate relay LP as though a punched entry had been made. As a result of this, the card and cams are advanced to position No. 1 and another simulation of an entry is made. They are then advanced to position No. 0.

It will be recognized that, in line with what has been set out, indication of vacant digit positions for office codes "B" and "A" as determined by their respective selector settings can be made to cause the recorder to function to skip the card positions for these digits rather than to simulate entries therein. Where only one-digit office codes are involved, means described may be provided to skip these positions for all transactions. Selectors for office codes "A" and "B" are included in Fig. 14 to indicate that the recorder may handle call data for offices in the largest telephone exchange areas.

With the cams in position No. 0, relay SER releases and end of transaction relay ET is operated by ground on the lower right hand brush of cam CM2. It connects ground through its contacts No. 1 and off-normal contacts ON of switch SE to cause this switch to be restored to normal. This ground is also extended through contacts of card detecting switch 74, which are now closed due to the presence of a card in this position of the recorder, to back contacts of magnet 75, winding of the magnet to battery, causing it to operate and release repeatedly. This magnet advances the card out of the recorder and into a suitable container, and as it leaves the recorder it allows contacts 74 to open and stop the operation of this magnet.

Relay ET closes, at its No. 2 contacts, ground through the lower contacts of card detecting switch 76 to cause magnet 77 to repeatedly operate and release to advance a fresh card into the recorder. The presence of this card causes switch 76 to open its bottom contacts and close its top ones to provide a self-interrupting circuit for magnet 68 to cause it to advance the card and cams to position No. 40, where they are stopped for the first entry, which will be the units of the day of the date. The latter described arrangement, including magnets 68, 75 and 77 and the card detecting switches, is representative of any suitable means for discharging a complete card, introducing a fresh one and advancing it and the cams to the lowest digit position of the first entry to be recorded.

Relay SER is again operated in position No. 40 to provide special entries which, in this case, comprise the date. Ground extended to the wiper of switch SE operates relay DR to cause the entry of the digit "2". Subsequent operations of relays LP and LS, followed by their releases, advance the wiper of switch SE successively to terminals Nos. 2, 3 and 4 to enter the other digits of the date in positions Nos. 39, 38 and 37. This date may be assumed to be October 12, or 1012 as indicated by the ledger card of Fig. 5. The ledger and cams are then advanced to position No. 36 and the wiper of switch SE to position No. 5, which are the positions they were assumed to occupy at the outset of description of this part of the invention.

It will be recalled that the ledger available relay LA provided, at its front contacts, the battery supply for operation of relay L17 and the recorder connected relay RC of the analyzer. Designation of the lower left hand brush of cam CM1 indicates that relay LA is operated in positions Nos. 36 through 4, inclusive, and released for the other positions, including those in which the calling office number is entered, the positions in which an old card is being discharged and a new one inserted, and those in which the date is being entered on the new one. Position No. 36 is the first one available for entry of sensed data. Consequently, effort by the analyzer to connect a recorder to it in which the cams thereof are in positions Nos. 3 through 37 will be unavailing, and it will await operation of relay LA to indicate the ledger is available for the entry. In practice, this delay of the analyzer will be rare, since the latter generally will be engaged with entries for other ledgers while any particular one is completing its entries, securing a new card and entering the date thereon.

It will be understood that in a day's time there may be many calls placed over trunk No. 17 and consequently many transactions therefrom entered on the journal. Entries of each such transaction will be made as it is sensed by the journal analyzer to prepare corresponding ledger cards.

3.4 Incomplete transactions

One of the features of the invention, as previously stated, is the prevention of preparation of partially completed ledger records due to incomplete transactions. It will be recalled that the last entry of an incomplete transaction comprised the source identification with designation of such a transaction. This will be the first journal entry of this transaction which is sensed. The source identification will cause the corresponding ledger recorder to be selected and connected to the analyzer.

The designation of an incomplete transaction will be effective to ground the sensing brush and conductor m of group 147. This ground circuit may be traced through the winding of disable relay DA to battery, causing this relay to operate and ground conductor 78 at its upper front contact. With relay L17 operated, for example, this ground is extended through its No. 5 contacts, lower winding of ledger disable relay LD to battery, causing the latter relay to operate and lock up to ground at the back contact of end lock up relay EL. Relay LD opens the battery supply circuit for relay LP. The No. 2 contacts of relay DA connect ground to conductor 144 to actuate a suitable counter, or the like, to make a record of the number of incomplete transactions.

There will be no data decoder relay operated for this entry, so after a moment relay LDT will operate as has been described in connection with sensing the last digit of an entry. This results in restoring the analyzer to normal, advancing the journal to the next entry position and release of relay L17. Relay LD remains operated.

When another entry for recorder No. 17 is encountered with relay LD operated, the selection and subsequent operation of relay L17 will result in a circuit being traceable from ground on the contacts of relay EL, No. 2 contacts of relay LD, contacts No. 5 of relay L17, conductor 78, back contacts No. 1 of relay DA, upper winding of relay DT to battery, causing the latter relay to operate. Operation of this relay, as has been set out, results in the release of the ledger selector relays and relay L17, and effects advance of the journal to the next entry position. Subsequent journal entries for this incomplete transaction will similarly be skipped without entry. The lowest order digit sensed concurrently with the transaction identification will extend ground over one of the conductors in group 69 which is normally effective to operate a punch magnet, but the battery supply for these magnets is open at the No. 3 contacts or relay LD to prevent this for ledger recorders which have been disabled, so no entry will be made thereby and the cards therein will remain in position No. 36.

The first entry of a transaction made on the journal is accompanied, as was set out, by designation thereof. This is, of course, the last entry of a transaction which is sensed by the analyzer and this designation is employed to restore to operation a disabled ledger recorder. This journal designation results in conductor $j$ of group 147 being grounded, and this ground is extended over conductor 80, contacts No. 3 of relay L17, which is now operated, winding of relay EL to battery, causing the latter relay to operate and therefore open the locking circuit for relay LD. The latter relay does not release at this time, however, due to the aforesaid ground for operating relay EL being connected through contacts No. 1 of relay LD to its upper winding. When the recorder is subsequently released by the analyzer, the circuit by which these relays are held will be opened, to release both of them. Relay EL is slow to release, so relay LD will restore before relay EL closes to back contacts. This recorder is now available again to record entries directed to it on the card which has been held in it while it was disabled.

The ground on conductor $j$ designating the first journal entry of a transaction may be used for other purposes in some applications of this invention. The recorder has been described as providing for recording a predetermined number of entries for a complete transaction, whereupon the card is discharged and a new one inserted. There are uses of the invention, particularly in connection with financial transactions, stock records and the like, in which the transactions which are to be recorded on the ledgers may have a variable number of entries. Such a ledger record may comprise, as an example, entries typed on a tape and after the entries of a transaction are completed, the tape is advanced to leave a blank space to separate transactions, or the tape is cut off by a suitable shear mechanism. This feature is also applicable to punched cards, as heretofore considered, to effect discharge of said card and will be described in connection therewith.

Ground extended through contacts No. 3 of relay L17 to indicate the first entry of a transaction is extended through back contacts No. 1 of relay LD, which is normally unoperated, to the upper winding of discharge card relay DC, to battery, causing this relay to operate. Cam CM1 will be in some position between Nos. 36 and 4, and relay DC will lock up over its lower winding and No. 1 contacts to ground at the lower left hand brush thereof. At its No. 2 contacts it connects this grounded brush to the back contacts No. 2 of relay SKP. The latter relay is now operated, but when it is released upon relase of relay L17, this ground is extended to the contacts of magnet 68 to cause the card and cams to be advanced through all intervening entry positions to No. 3, whereupon they are stopped and relay DC released.

For applications where there are no separate entries, positions Nos. 3, 2 and 1 may also be skipped by appropriate cutting of cam CM1, and the card forthwith discharged.

It is believed that application of these arrangements to spacing or cutting off of a tape record, or other appropriate operation for the conclusion of a transaction, will be understood by those versed in this art and specific showings to this end are deemed unnecessary.

3.5 *Analyzer and ledger recorder supervision*

The feature of arrangements for providing automatic supervision of certain operations of the analyzer and associated ledger recorders was mentioned. These will now be described.

One of these is to indicate a stuck analyzer. After an analyzer has started analyzing a journal, its operation should be substantially continuous until all entries have been recorded on the respective ledgers. Analyzer supervisory relay AS is provided to light analyzer alarm lamp AL1 when it operates due to the analyzer being unable to proceed for certain reasons. There are two circuits which may operate this relay. One may be traced from battery, its lower winding, back contacts No. 1 of relay RC, resistance R2 to ground at key SK. A similar circuit may be traced through the upper winding or relay AS, back contacts of relay PMT, resistance R3 to ground at key SK. The lower and upper windings of relay AS are also connected to condensers C2 and C3, respectively.

When a relay such as L17 is operated, relay RC operates in series with it, as will be recalled. Under this condition condenser C2 will be charged to battery potential through resistance R4. If relay RC should be released for a substantial interval, condenser C2 will be discharged through resistance R2 to operate relay AS. Relay PMT operated for each digit transmitted to the ledger recorder. Condenser C3 is then charged through resistance R5 and should relay PMT remain unoperated for sufficient time, this condenser will be discharged to cause the operation of relay AS. The characteristics of relay AS, the two condensers and the resistances may be chosen to provide such time delay in the operation of relay AS as is necessary. During normal operation neither relays PMT nor RC will remain unoperated long enough to cause the operation of relay AS.

Should a circuit not be completed through a selected connector relay L-, relay RC will remain unoperated to result in lamp AL1 being lighted. Likewise, failure of a connection to be completed through a punch magnet, or the like, to battery will cause relay PMT to remain unoperated to light said lamp. Either of these conditions represents the existence of a trouble requiring attention of an operator, as indicated by the lamp being lighted. An audible alarm may also be provided to supplement the lamp indication.

When analysis of the record has been completed, both relay PMT and RC will remain unoperated to notify the attendant. It will be recognized that separate relays similar to relay AS may be provided so that separate lamps may be lighted to indicate whether relay PMT or RC failed to operate in case of a trouble.

It will be recalled that the last entry of a transaction recorded on the journal, and the first of that transaction subsequently sensed, is accompanied by an indication of this fact. This indication results in grounding of conductor $k$ of group 147. This ground is extended through the upper winding of relay LU, conductor 81, contacts No. 4 of relay LI7, which is concurrently operated, front contacts No. 3 of the thirty-sixth point relay 36P, which is now operated, winding of false entry test relay FET to battery, causing relay FET to operate but, due to its resistance, there is not sufficient current to operate relay LU. Relay 36P is operated over a circuit from the upper right hand brush of cam CMI with the cams in position No. 36, which is the proper position for receiving the lowest order digit of the last journal entry. Operation of relay FET completes the previously traced battery circuit through relay LP for the punch magnets.

If the recorder is in position No. 36 and an entry is received without ground being received over conductor 81, trouble is indicated. Failure of relay FET to operate prevents battery supply being extended to the punch magnets, thence through one of them to result in the operation of relay PMT of the analyzer. This will result in the analyzer being held and lamp ALI being lighted to summon an attendant.

When relay SKP operates with the cams in position No. 36, lamp LLI lights over an obvious circuit including the No. 3 contacts of relay SKP. Normally, this is a brief flash for the time of entry of the lowest order digit of the last journal entry. Failure of relay FET to operate prevents an entry being made and consequent movement of the card and cams out of position No. 36, so lamp LLI remaining lighted indicates which recorder is connected to the analyzer stuck due to an improper first entry.

It will be noted that relay 36P locks up to ground at contacts No. I of relay SKP, so it will not release after the cams have been advanced out of position No. 36 until relay SKP releases to indicate completion of the first ledger entry; that is, the last entry on the journal. It provides battery for the punch magnets at its No. 2 contacts when it releases.

Release of relay 36P also transfers the above traced operating circuit for relay FET to the upper winding of relay LLU and thence to battery. Should a final journal entry of a transaction, and therefore the first one thereof sensed, be directed to a ledger recorder which is not in position No. 36, where it should be for such an entry, relays LU and LLU operate in series with the latter locking up through its lower winding and No. I contacts to ground at contacts of ledger release key LRK, lighting lamp LL2 and grounding the operating conductor for magnet 68 to hold the recorder. Relay LU locks up through its lower winding and No. I contacts to ground at key SK, lights lamp AL2 at its No. 2 contacts and locks stepping magnet 63 operated at its No. 3 contacts. The attendant may determine the couse of the trouble, make such adjustments as may be appropriate and release relays LLU and LU by operation of the keys to which they are locked.

4. FREQUENCY JOURNAL RECORDS

The use of frequency code signals has advantages for data recording, as was pointed out. Figs. 17, 18 and 19 arranged in accordance with Fig. 7 show a journal recorder using frequency data, identification and control signals which are recorder as such to form journal transaction entries. Application to automatic ticketing is again assumed for describing this embodiment of the invention, but a different telephone equipment organization is purposely employed better to disclose certain of the features of the arrangement.

Attention is directed to Fig. 16, which is a one-line diagram of the fundamental equipment elements involved with frequency recording. When a subscriber removes his telephone receiver his line is found by line finder LF. A sender link extends this connection to an idle sender which transmits dial tone. The subscriber then dials the desired number, which, it is assumed, is to an office requiring that call data be prepared. The sender decodes the called office designation, which may comprise one, two or three digits, depending on the dialing plan of the telephone network in which the invention is practiced. Decoding of the called number indicates to the sender various information, including the route to the called office and the fact that this is a call requiring ticketing. Should the call not require ticketing, the sender would function in conventional manner to establish the connection without the ticketing operations to be described.

It will again be assumed that the step-by-step type of dial equipment is employed, although other types may be used. The sender transmits one or more trains of impulses to select an outgoing trunk. This trunk may go either directly to the distant office or through intermediate switching equipment at a distant point. When the connection reaches the outgoing trunk, the sender causes that trunk to seize its associated journal recorder, each of which serves a plurality of trunks. The trunk advises the sender when it has secured the recorder, whereupon the sender connects itself to the station identifier which identifies the calling station. It transmits the four digits of the station number as four impulses of frequency combinations which the sender extends over one of the conductors of the talking circuit through the switches to the trunk and thence to the recorder, which records it, together with the frequency code identifying the trunk. A separate conductor may be used for this purpose rather than one of the conductors of the talking circuit, as will be described.

When the subscriber completes dialing of the called number, the sender signals the trunk, which again connects itself to the recorder and so notifies the sender, which then transmits to the recorder, via the trunk, the called office code and the four or five digits of the called number in a series of frequency impulses which are recorded, together with the source identification. The sender then connects itself through the trunk to record its own designation and that of the station identifier it previously used.

The sender may be transmitting impulses for control of the distant equipment while these recording steps are taking place, and when it has finished this and its recording operations, it releases itself.

When the called party answers, the chronological time of beginning of conversation is recorded in frequency combinations and subsequently the time of completion of conversation is entered.

The trunk controls designation on the journal of the first entry of all transactions and the last entry for completed transactions. It also designates, as a last entry, incomplete transactions. The trunks may serve calls which are not to be recorded as well as those which are, under control of the sender.

The codes used for data transmission, source identification and control indications are the same as previously described in connection with marked journal records. A particular frequency in cycles per second designates each of the code elements in accordance with the following table, which sets out frequencies which have been arbitrarily chosen for illustration:

| Purpose | Code Element | Frequency |
|---|---|---|
| Data code | a | 1,300 |
|  | b | 1,500 |
|  | c | 1,700 |
|  | d | 1,900 |
| Source identification | e | 300 |
|  | f | 500 |
|  | g | 700 |
|  | h | 900 |
| Beginning of transaction | i | 1,100 |
| End of transaction | j | 2,300 |
| Incomplete transaction | k | 2,100 |
| Pilot frequency | m | 2,500 |
|  |  | 2,700 |

With reference to Figs. 17, 18 and 19 of the drawings, the switching equipment is indicated at the top of Fig. 17. The remainder of this figure shows certain elements of a sender. An outgoing trunk with control elements is indicated in the upper portion of Fig. 18, and certain elements of the station identifier are shown at the bottom thereof. Fig. 19 sets out the journal recorder with chronological time arrangements at the top.

4.1 *Establishing connection*

When the calling line illustratively designated CR4 2947, or 274 2947 on a numerical basis, is found and connected to the sender, it operates a line and hold relay in the incoming portion of the sender represented by box 90. The subscriber dials the desired number, which may be MA3 7890. Each digit dialed is registered by suitable means, here shown as four relays OA– for the first digit of the office code, which are operated and locked up in accordance with the data code. A connector relay OAC is associated with relays OA–. A register and a connector relay are provided for each digit of the called number, and these are indicated by boxes along the right designated in accordance with the digit which is registered therein. Other register means well known to the telephone art may be employed, rather than relay groups as indicated. These registers may be those normally required in senders, with minor modifications which will be understood.

When the called office code has been dialed, it is decoded and the outgoing portion of the sender, represented by box 91, transmits digital impulses over conductor 92, which is connected to the ring conductor R of the first selector. As a result of these impulses, the first, second and third selectors are operated to result in the typical trunk shown by Fig. 18 being selected. A similar trunk may be reached on a level of the first selectors or on one of the second selectors, depending on the switching arrangement employed. Wherever the outgoing trunk which is selected is located, the sender knows from the decoded office designating information when it reaches it. As an alternative of the latter arrangement, the trunk may be arranged to signal the sender when the connection has reached it.

Ground supplied conductor 92 by the sender is extended through the switches over the ring conductor R, back contacts No. 2 of relay CA', the upper left hand winding of repeating coil 93, the upper winding of relay L' to battery, causing this relay to operate. This relay, together with the hold relay H', polarized relay P' and called party answered relay CA' correspond, respectively, to similarly designated relays without a prime mark shown by Fig. 10, and reference may be made to the latter figure as to their detail operations, other than those specific to this embodiment.

The outgoing trunk loop to the distant office is closed through relay P' by relay L', and subsequent pulses, represented by momentary openings of the circuit over conductor R, will be transmitted to the distant office. Such transmission may be concurrent with the recording of journal entries to be described.

4.2 *Entry of calling station number*

When the sender recognizes that it has reached the outgoing trunk, the outgoing portion 91 of the sender thereof grounds conductor 94, which is extended through back contacts No. 1 of entry one relay E1, back contacts No. 2 of advance relay ADV, back contacts No. 3 of relay E1, winding of relay E1', No. 2 normally closed contacts of relay E1 to off-normal battery supplied by the incoming portion 90 on conductor ONB, causing relay E1' to operate. It connects ground at its No. 1 contacts to the upper winding of relay E1, but the latter does not operate due to the ground shunt at its No. 3 back contacts.

The sleeve conductor S of the outgoing circuit is normally grounded by the incoming portion 90 of the sender by a circuit over conductor 95 through normally closed contacts No. 1 of sleeve frequency relay SF. Operation of this relay by ground at the No. 2 contacts of relay E1' substitutes grounded alternating current of, say, 270 cycles per second from the secondary of transformer 96 for direct ground on the outgoing sleeve conductor. This frequency is repeated through transformer 97 to operate relay AC of the trunk. The latter operates recorder required relay RR. A cold cathode tube, or the like, may be employed instead of relay AC to effect operation of relay RR.

A trunk sequence switch TS of previously described construction and comprising two banks of terminals with wipers, a stepping magnet, a release magnet and off-normal contacts ON, is provided to control the sequence of operations of the trunk circuit. With relay RR operated, ground may be traced from front contacts No. 1 of relay H', contacts No. 2 of relay RR, terminal No. 1 of the lower bank of switch TS, the wiper thereof, to the allotter. This allotter, in response to such a ground indication from a trunk, grounds conductor 98 of that trunk when the journal recorder is available to it. This ground operates relay SC17', and the cross-connections at terminals 99 result in conductors e, g and h of group 100 being grounded, which provides the same source identification as previously set out for trunk No. 17, which this may also be assumed to be. These grounded conductors result in operation of relays Fe, Fg and Fh of the recorder by circuits through their upper windings to battery supplied through the winding of entry ready relay ER, which also operates. Relays Fe, Fg and Fh lock up over their respective lower windings and No. 1 contacts to ground at back contacts No. 2 of relay AB.

The journal medium 101 may be of any suitable type for recording frequencies of the magnitude of those contemplated herein. It may be a magnetic wire or tape, a medium suitable for transverse or hill and dale type of recordings, or other suitable form. The recorder 102 is appropriate therefor. The record medium is driven by suitable arrangements indicated as pulley 103, A motor 104 drives shaft 105, which may be common to all of the recorders in the telephone office, at a constant speed which may be upwards of ten revolutions per second. Each journal recorder has a detent wheel 106 to which its pulley 103 is affixed by a sleeve. Clutch plate 107, affixed to shaft 105, tends to drive wheel 106 by friction, but the latter is normally held by detent 108 operating against a shoulder provided on the wheel. Operation of magnet DM withdraws the detent, permitting wheel 106 and pulley 103 to revolve one revolution and then be stopped, unless magnet DM is held operated. One revolution of pulley 103 defines the space on the journal of a digit, or the like, entry, although similar arrangements may be provided whereby several such entries may be made per revolution of pulley 103. Three commutators with collector brushes are continuously driven by motor 104 and are common to all of the recorders in the office. Commutator IMP provides a long impulse to the data transmitters each revolution. Journal entry commutator JE effects connection of recorder 102 to supplies of entry frequencies. Pick-up commutator PU provides an impulse for certain starting purposes, as will be described. The shaft and the commutators are grounded to result in their associated brushes being also grounded except for the sections indicated as insulated.

While it is preferable, for simplicity, for the commutators to be common to the office, this is not necessary since, by minor changes in the circuits shown, they may be individual to the recorders. The detent wheel 106 and pulley 103 of each recorder may be driven by a small synchronous motor individual to the recorder, which may also drive the commutators if they are provided individual thereto. If commutators are provided common to several recorders, pulley 103 is preferably driven at the same speed as shaft 105, or the same relative speed where one revolution of the pulley provides a plurality of digit entry positions as effected by detent wheel 106 having several equi-angular positions at which it may be stopped. In the latter case the speed of pulley 103 may be correspondingly lower than that of shaft 105, as will be understood.

When relay ER operates, ground is extended from back contacts No. 2 of allotter battery relay AB, No. 2 contacts of relay ER, conductor 109, contacts No. 6 of relay SCI7', No. 1 contacts of relay 2TM, winding of journal ready relay RE, to battery at contacts No. 1 of relay RR, causing relay RE to operate and connect the tip conductor T from the sender to battery through the upper winding of transformer or repeating coil 110. This battery extends through the winding of tip relay TR of the sender to ground at the left hand winding of transformer or repeating coil 111, causing relay TR to operate. The latter extends battery through its contacts, No. 3 contacts of relay EI', No. 3 contacts of sender-identifier relay SI, winding of relay SI', conductor 112, to ground in the allotter of the station identifier. This conductor is the start circuit from this sender for the station identifier. If the station identifier is available, the current through this conductor is increased to operate marginal relay SI', which operates relay SI. The latter extends the circuit at its No. 3 contacts through its lower winding, its No. 4 contacts, conductor 114, contacts No. 4 of identifier release relay IRR, winding of identifier supervisory relay IS to ground in the allotter, causing relay IS to operate and relay SI to remain operated after relay SI' releases. Relay IS operates identifier ready relay IRY, which opens a ground circuit to the allotter to indicate that a sender is attached. This results in the ground circuit extended to the sender over conductor 112 being opened.

There may be two station identifiers in an office, one of which may function at a time. It is desirable to record which of the two is used for a connection. A circuit may be traced from the contacts of relay IS, conductor 127, contacts No. 6 of relay SI, to operate relay I1 to designate identifier No. 1. This relay locks to off-normal ground on conductor ONG. Had identifier No. 2 been used, relay I2 would have been similarly operated.

Ground at front contacts No. 2 of relay SI may be traced through contacts No. 4 of relay EI' to particular station identifier PSI to cause it to transmit to the station identifier the identity of the particular station on a party line which is calling, said circuit being traceable over conductor 115, contacts No. 1 of relay SI, conductor 116, to the identifier control circuit indicated by box 117. The above traced ground to the particular station identifier also operates identifier frequency relay IF, causing it to place grounded alternating current on the sleeve conductor of the calling line through the line finder, which is further extended by conductor S' to the station identifier. The station identifier searches for this frequency on all of the sleeve circuits in the office and upon finding it on conductor S' effects, in light of the information received over conductor 116, operation of four relays to designate the four digits of the calling station number, which, in this case, comprises relays ITH2, IH9, IT4 and IU7 for calling station number 2947, it being understood that there are ten relays in each of four groups, one in each of which may be operated to designate any one of 10,000 numbers. Each of these relays, when operated, connects a combination of one or more frequencies in accordance with the data code to contacts of a connector relay D— associated with its digit.

When a relay I— is operated in each digit position, a circuit may be traced from battery at contacts No. 1 of relay ITH2, serially through corresponding contacts of the other digit relays, the lower winding of identifier pick-up relay IPU, No. 2 contacts of relay IRR, conductor 118, No. 3 contacts of relay ER to the brush of commutator PU. When ground is extended to this brush, relay IPU operates and locks up over its upper winding and No. 2 contacts to ground at the front contacts of relay IS. Relay IPU extends battery through its No. 1 contacts, winding of identifier impulse relay IIM, contacts No. 1 of relay IRR, conductor 119 to the brush of commutator IMP, to cause relay IIM to be operated and released under control of this commutator. Relay IIM, when operated, operates the stepping magnet of switch ISS upon its initial closure to cause the latter to position its pawl.

The control switch ISS is of previously described construction comprising a bank of terminals, a wiper therefor, a stepping magnet, a release magnet and off-normal contacts ON, and is provided to control transmission of the digits from the identifier. When relay IPU operated from the pick-up impulse, it extended ground at its No. 3 contacts through the wiper, terminal No. 1, winding of relay D1 to battery, causing this relay to operate to connect 1500 cycle tone to frequency combining circuit FCC1. The latter circuit, and others designated FCC-, is of such type that it receives frequencies from a plurality of sources and combines them for transmission over an output circuit which, in this case, is conductor 120. This combining circuit may comprise a group of transformers with their primaries connected to the several incoming frequency circuits and their secondaries to the output circuit, or other suitable arrangements. The frequency or tone on conductor 120 is extended through contacts No. 5 of relay SI, frequency combining circuit FCC2, conductor 121 to the right hand winding of coil 111 to ground. This tone is extended through the winding of relay TR and its shunt resistance, which is provided to improve the transmission path for tones, the tip conductor T through the switches, front contacts of relay RE, the upper winding of coil 110 to battery. This tone is repeated in the lower winding of this coil and is extended through contacts No. 14 of relay SC17', conductor 123, frequency combining circuit FCC3 to amplifier 124. This amplifier may be of appropriate type to raise the energy of the tone to a suitable level for recording and equalize the levels of the frequencies thereof. Each time it receives a tone, it grounds conductor 155 to operate amplified tone relay AT.

Relay AT closes at its No. 2 contacts a ground circuit to operate detent magnet relay DMR. The latter operates magnet DM to cause it to withdraw its detent by a circuit from battery, its lower winding, contacts No. 2 of relay DM to ground at the No. 1 contacts of recorder last digit relay RLD. Relay DMR locks up to this ground circuit. The withdrawal of the detent causes the record medium to be driven as long as relay RLD remains unoperated. Grounding of its brush by commutator JE causes journal entry relay JER to operate over a circuit through contacts No. 1 of relay DMR to connect the output of amplifier 124 to recorder 102 to cause the 1500 cycle tone designating digit "2" to be recorded.

It is to be noted that the start signal to the identifier as indicated by grounding of the brush of commutator PU is in appropriate phase relation with respect to commutator JE to effect a proper time sequence of the described operations.

The 2700 cycle pilot frequency is permanently connected to frequency combining circuit FCC4, and this tone is extended through amplifier 126, so it is recorded with the data tone.

When relay JER operated, it completed at its No. 1 front contacts a circuit which operated journal first digit relay JFD. The latter locks up over its upper winding and No. 2 contacts to ground at back contacts No. 2 of relay AB.

When the first digit has been recorded, ground is disconnected from the brush of commutator IMP, causing relay IIM of the identifier to be released to release the stepping magnet of switch ISS, causing it to advance its wiper to terminal No. 2 to result in release of relay D1 and operation of relay D2 to cause the transmission to the journal recorder of a tone comprising 1500 and 1900 cycles for the digit "9."

Release of relay JER of the recorder at conclusion of entry of the first digit results in ground at its No. 1 back contacts being extended through the No. 1 contacts of relay JFD to operate source identification code relay SIC. This connects contacts No. 2 of relays F- bearing frequencies to frequency combining circuit FCC4, so that entry of the next digit will be accompanied by the source identification, which, in this case, is the combination of frequencies 300, 700 and 900 cycles designating source No. 17. This identification is withheld from entry with the first digit since, with reverse analysis of the journal record, the absence of this identification designates the last digit of an entry. Relay SIC locks up over its lower winding and No. 8 contacts to ground at the No. 2 back contacts of relay AB.

When relay SC17' operated, ground at its No. 3 contacts operated the stepping magnet of switch TS, causing it to position its pawl. This ground also operated first journal seizure relay FS, which locked up over its upper winding and No. 2 contacts to ground at contacts No. 1 of first seizure release relay FSR. Ground at front contacts No. 3 of relay FS is extended through back contacts No. 2 of incomplete transaction relay IT', the wiper and No. 1 terminal of the upper bank of switch TS, contacts No. 13 of relay SC17', conductor j of group 125, beginning of transaction relay BT to battery, causing the latter relay to operate and lock up over its lower winding and No. 1 contacts to ground at back contacts No. 2 of relay AB. It provides 2300 cycle frequency through contacts No. 2 of relay SIC and circuit FCC4 for entry with the source identification to designate the first entry of the transaction.

The second digit is entered, the wiper of switch ISS of the station identifier is advanced to the third terminal, and the third digit is entered. Likewise, the fourth digit is entered. Each of the last three digits is accompanied by the source identification, the designation of an initial entry and the pilot frequency.

When switch ISS is advanced to position No. 5, it operates release relay IRR, which locks up over its lower winding and No. 3 contacts in series with the release magnet, which operates and releases the switch. It opens at its contacts Nos. 1 and 2 the commutator circuits to relays IIM and IPU. The circuit over which relay IS and relay SI of the sender were held is opened at contacts No. 4 of relay IRR, causing the sender to be disconnected from the identifier. Release of relay IS opens the locking circuit for relay IPU, causing it to release to open the circuit through relay IIM and to the wiper. Release of relay IS also opens at its front contacts the ground circuit to the identifier control circuit, causing it to release its operated relays.

Opening of the off-normal contacts ON incident to the wiper reaching normal results in release of the release magnet and relay IRR. Relay IRY, which was operated by relay IS, releases after a short interval to provide the identifier control circuit with time to reach normal, and thereupon extends ground to the allotter circuit to indicate that the identifier may serve another call.

Release of relay SI of the sender causes particular station identifier PSI to cease functioning and opens the operating circuit for relay IF. The latter is slow to release and while it is restoring a circuit may be traced from the No. 2 back contacts of relay SI, No. 2 contacts of relay IF, the upper winding of advance relay ADV to battery, causing the latter relay to operate. Operation of relay ADV opens the shunt for relay E1, causing it to operate in series with relay E1' and lock up to off-normal battery conductor ONB at its No. 2 contacts and thereby release relay E1'. Relay ADV1 was operated by an obvious circuit when relay SF operated. Release of relay E1' opens the operating circuit for relay SF, which releases to open the operating circuit for relay ADV1. The latter is slow to release, so before it restores a circuit may be traced from ground at back contacts No. 2 of relay SF, contacts of relay ADV1 to the lower winding of relay ADV to provide a momentary locking circuit for the latter, which is slow to release. The combined releasing time of relays ADV1 and ADV is to provide a pause between operations, as will subsequently be described.

Release of relay SF again connects ground, rather than grounded alternating current, to sleeve conductor S to the trunk circuit, causing relay AC to release to in turn release relay RR. The latter opens the operating circuit for relay RE, which releases. It also opens the start circuit to the allotter, but the latter maintains relay SC17' operated under control of battery supplied from back contacts No. 3 of allotter battery relay AB of the recorder via conductor 128.

When relay D4 of the station identifier releases after transmission of the fourth digit of the calling station number, there will be no tone transmitted through amplifier 124, so relay AT will be released. Consequently, upon the next closure of commutator JE, the resulting operation of relay JER will complete a circuit from its No. 1 front contacts, No. 1 contacts of relay AT, the lower winding of relay RLD to battery. This relay operates and locks up over its upper winding and No. 3 contacts to ground at No. 2 back contacts of relay AB. Relay RLD opens, at its No. 1 contacts, the locking circuit for relay DMR, which releases to release detent magnet DM to in turn release the detent. Wheel 106 continues to revolve, however, until the shoulder thereof is caught by the detent. During this revolution of pulley 102 there are recorded the source identification, designation of an initial entry and the pilot frequency. Relay JER does not release until the entry has been completed by virtue of the locking circuit through its No. 2 contacts to commutator JE.

When commutator JE releases relay JER, ground at its No. 1 back contacts is extended through the No. 2 contacts of relay RLD, the lower winding of relay AB to battery, causing it to operate. At the No. 2 back contacts of the latter relay is opened the locking circuit for the several relays held thereto, and battery extended to the allotter over conductor 128 is opened at its contacts No. 3, causing the allotter to release relay SC17', which results in the release of relays Fe, Fg, Fh and BT. Relay ER also releases. It will be noted that relay AB locks up through its upper winding and No. 1 contacts to ground at the No. 1 contacts of relay ER to assure that relay AB does not release until after ER has released. After an interval, relay AB releases and the recorder is normal with battery supplied the allotter circuit to indicate that it is available to make another entry.

When relay SC17' operated, it completed a circuit from ground at its No. 3 contacts to operate the stepping magnet of switch TS, and upon release of relay SC17', this magnet releases to advance its wipers to terminals No. 2. The trunk now awaits another operation of relay AC by the sender.

4.3 *Entry of called office and station number*

When the complete called number of eight digits including a party designation, or seven digits without one as in the present example, with sufficient time to have dialed the eighth, has been dialed, the incoming portion 90 of the sender connects ground to conductor 129, which is extended through contacts No. 3 of the ninth point relay 9P, No. 1 back contacts of relay E2, No. 1 front contacts of relay E1, contacts No. 2 of relay ADV, No. 3 front contacts of relay E1, No. 3 back contacts of relay E2, winding of relay E2', normally closed contacts No. 2 of relay E2 to battery on conductor ONB, causing relay E2' to operate. It will be noted that relays E2 and E2' have their windings and certain of their contacts interconnected as with relays E1 and E1', so that subsequent opening of the above traced operating circuit for relay E2' will result in the operation of relay E2 and release of relay E2'.

Ground at the No. 2 contacts of relay E2' reoperates relay SF to transmit alternating current over the sleeve conductor S to the trunk. The resulting operation of relay RR therein will extend ground through the lower wiper of switch TS to the allotter start circuit, which will cause the recorder to be seized and relay SC17' to be operated as previously described. Source identification relays F– of the recorder, and therefore relay ER, will be operated. Subsequent operation of relay RE will cause relay TR of the sender to be operated, as has been traced. Battery is extended from contacts of the latter relay through the No. 3 contacts of relay E2', upper winding of sender pick-up relay SPU, conductor 118, No. 2 contacts of relay ER to commutator PU, so the next closure thereof will cause relay SPU to operate and lock up over its lower winding and No. 2 contacts to ground at contacts No. 4 of relay 9P.

A distributing switch designated SDE of previously described construction to control transmission of successive digits of entries from the sender is provided, said switch comprising a bank of thirteen terminals, a wiper therefor, a stepping magnet and a release magnet with off-normal contacts ON. Ground at contacts No. 1 of relay SPU is extended through the wiper of this switch, bank terminal No. 1, winding of connector relay OAC to battery, resulting in the latter relay operating to connect the No. 2 contacts of relays OA– to frequency combining circuit FCC2. Since the first digit of the office code is 6 (M), relays OAb and OAc will be operated to extend a tone comprising 1500 and 1700 cycles through circuit FCC2 to result in the tone being recorded on the journal as previously described.

Ground placed on conductor 119 by commutator IMP is extended through contacts No. 3 of relay SPU, No. 4 front contacts of relay E2', No. 1 contacts of relay 9P to operate the stepping magnet of switch SDE, causing it to position its pawl. Opening of this circuit upon completion of recording of the first digit of the entry will release the stepping magnet to result in the wiper being advanced to terminal No. 2. This releases relay OAC and effects connection of register relays in box OB to circuit FCC2 to result in the transmission of the second digit of the office code which is recorded.

The above operations are repeated until all registered digits of the called number have been transmitted. After the transmission of the party designation, if one (none in this case), the wiper will be advanced to terminal No. 9 to operate relay 9P, which locks up over its lower winding and No. 2 contacts to off-normal ground on conductor ONG. The latter relay opens the operating circuit for the stepping magnet at its No. 1 contacts and that for relay E2' at its No. 3 contacts, causing the operation of relay E2 and release of relay E2'. This releases relay SF to operate relay ADV through contacts of operated slow to release relay ADVI, which releases after an interval. This interval permits the recorder to complete its functions of entering the source identification without a data code, releasing the trunk and restoring battery to the allotter, all of which functions have been described. Release of relay ADV may, as an alternative, be controlled by the recorder to assure that the latter may have time to complete its final operations. The subsequent release of relay SC17' will advance the wipers of switch TS to terminals No. 3.

4.4 *Entry of equipment used*

When relay ADV releases, ground is extended from its No. 1 contacts, No. 1 contacts of relay 13P, serially through front contacts No. 1 of relays E2 and E1, back contacts No. 2 of relay ADV, serially through front contacts No. 3 of relays E1 and E2, winding of third entry relay TE to battery, causing it to operate. It is slow to operate since it will get a momentary impulse for the interval between the time relay E2 operates and relay ADV opens its contacts No. 1, but this is insufficient for relay TE to operate.

Ground at contacts No. 3 of relay TE reoperates relay SF to cause the trunk again to be connected to the journal recorder and relay TR then to be reoperated. Battery at the front contacts of relay TR is extended through contacts No. 2 of relay TE, the upper winding of relay SPU, causing it to operate on the next closure of commutator PU, and to lock up to ground at the No. 1 contacts of relay TE. Impulses from commutator IMP are received over conductor 119 and extended through contacts No. 3 of relay SPU, No. 4 back contacts of relay E2', back contacts No. 3 of relay 13P to operate and release the stepping magnet of switch SDE. The wiper of this switch is grounded at contacts No. 1 of relay SPU.

Terminal No. 10 of the bank of switch SDE is connected to identifier code connector relay ICC, so when the wiper is advanced to this terminal, relay ICC operates to connect the No. 1 front contacts of the identifier relays I1 and I2 to circuit FCC2. It will be recalled that relay I1 was operated and locked up to indicate that station identifier No. 1 was employed for the call, so a frequency of 1300 cycles is transmitted to, and recorded by, the recorder. This will be the first digit of the entry, the shaft of the recorder motor having revolved once after relay SPU operated without an entry being made to advance the wiper of switch SDE to terminal No. 10. In practicing this invention, the control circuits may be arranged to cause this advance of the wiper to be effected prior to relay SPU being operated for the third entry to save sender and recorder holding time.

After the identifier designation has been recorded, the wiper of switch SDE is advanced to terminal No. 11 to release relay ICC and operate relay S3. It is assumed that the sender presently under consideration is No. 38 and it is desirable to record this designation. With relay S3 operated, a frequency of 1700 cycles is transmitted to, and recorded by, the recorder to designate digit "3." The wiper is then advanced to terminal No. 12, to result in release of relay S3 and operation of relay S8. The latter results in transmission of a tone comprising 1300 and 1700 cycles to be recorded to designate digit "8." The wiper is then advanced to terminal No. 13 to result in release of relays S8 and operation of relay 13P, which locks up over its lower winding and No. 2 contacts to off-normal ground on conductor ONG. The latter relay opens, at its No. 1 contacts, the operating circuit for relay TE, which releases to in turn release relay SF and, therefore, relays AC and RR of the trunk. The impulse circuit for the stepping magnet is opened at contacts No. 3 of relay 13P. The locking circuit for relay SPU is opened at contacts No. 1 of relay TE upon release of the latter.

Off-normal ground at contacts No. 2 of relay 13P is extended over conductor 130 to advise the outgoing portion 91 of the sender that the recording functions have been completed. If the outgoing portion has transmitted all of the digits of the called number to the called office, it will advise the incoming portion 90 that the sender's functions have been completed. The incoming portion then operates relay CT to disconnect conductors T and R to the calling subscriber's station from the sender and connect them through to the trunk. Relay CT locks up to ground on the sleeve conductor supplied by the trunk. Relay L' of the trunk supplies talking battery to the calling subscriber's station. The sender disconnects ground from off-normal ground conductor ONG and battery from conductor ONB to result in all relays held thereto being released. It also connects ground to conductor 133, which is extended through contacts ON to operate the release magnet to cause the wiper of switch SDE to be sprung to normal, whereupon contacts ON are opened. The link is caused to disconnect the sender from conductors T, R and S of the circuit both ways through the switches. The sender is now normal and available for assignment to another call.

The calling subscriber may abandon the call after partial dialing of the called number, which will result in release of the sender, and therefore the trunk. This will result in entry by the trunk of designation of an incomplete transaction, as will be described. If the sender is effecting data transmission to the recorder when the call is abandoned, it is preferable that it complete such transmission before releasing. This may be effected by connecting the circuit completed by operation or relay TR to the incoming portion of the sender to prevent release of the holding relay thereof while relay TR is operated.

Relay SC17' is released after the recording of the source identification and pilot frequency subsequent to the recording of the third digit of the entry. The wipers of switch TS are advanced to terminals No. 4.

The three recording operations described will be rapid and may be completed before the connection reaches the line of the called party, or shortly thereafter and before the called telephone may be answered, so neither party may be conscious of the recording operations which have been taking place. In practicing the invention, it will be desirable to have a single journal recorder serve, in point of economy, as large a number of trunks as feasible. During the busy hour when the recorder is in frequent demand by the trunks, the sender may not have been able to effect the above described three recording operations before the called party answers.

There are various arrangements which may be provided to offset, or prevent, the undesirable situation of the called party answering and finding his telephone seemingly "dead" due to the sender holding the circuit incident to recording operations. One of these is to arrange to have induced by the trunk on the circuit to the distant office a low intensity tone of not unpleasant characteristics, such as the audible ringing tone, to make the telephone sound "alive," the application of such tone being controlled by the upper wiper of switch TS on terminals 2 and 3. This wiper on these terminals extends ground to operate tone relay TN, which extends tone from a suitable source 134 through a low capacity, say .04 mf., condenser C5 to the tip conductor T of the outgoing trunk.

A second method is to arrange the sender to withhold transmission of the last two numerical digits until third entry relay TE is operated. This will add slightly to the holding time of the sender. Stopping of out pulsing at this point rather than before the last numerical digit is transmitted is desirable where level hunting connectors are used in step-by-step dial areas, since such connectors start hunting an idle trunk to a private branch exchange upon receipt of the next to the last, or tens, digit of the called number.

It will be noted that the lower winding of relay L' normally has ground connected to both of its terminals, one of which is obvious and the other is traceable through tip conductor T, winding of relay TR, through the left hand winding of coil 111. This may make relay L' somewhat sluggish in its repetition of pulses. This condition may be obviated by means including extending this conductor T through normally open contacts of a slow to operate relay in the sender which is energized upon actuation of relay SF therein. The T conductor to the right of the back contact of relay RE in the trunk may be connected through a back contact of relay RR. The purpose of said slow-to-operate relay is to afford time for relay RR to operate in response to the operation of relay SF to disconnect the lower winding of relay L' from conductor T before the latter is connected to ground in the sender. A circuit will not, therefore, be completed through this lower winding while the sender is connected to the trunk.

4.5 Alternative data transmission arrangements

The arrangement shown by Fig. 20 enables interchange of information between the sender and the trunk independent of the tip and ring conductors T and R, which will permit conversation to start as soon as the connection is completed to the called telephone. An additional conductor 135 is provided through the switches which, in addition to the T, R and S conductors therethrough, requires the selectors, banks and cabling thereof to be on a 4-point basis rather than a 3-point one as is usual with step-by-step and other dial equipment.

Circuit elements of Fig. 20 correspond generally to elements of Figs. 17 and 18, and these have been correspondingly designated with the addition of prime marks. When the sender is ready to make an entry, it operates, as has been described, relay SF'. This completes a circuit from battery, winding of relay TR' and its shunt resistance, contacts No. 1 of relay SF', right hand winding of repeating coil 111', conductor 135, left hand winding of repeating coil 110', the upper and lower windings of relay RR' in series to ground, causing relay RR' to operate. Relay TR', which is marginal, will not be operated by the current now flowing through it. Battery is connected through the winding of relay RE' at the No. 1 contacts of relay RR', and the start circuit for the allotter is closed through its No. 2 contacts. When the trunk is connected to the recorder, relay RE' is operated. It shunts the lower winding of relay RR' to increase the current flowing through conductor 135 and to thereby operate relay TR'. This current is sufficient to maintain RR' operated by its upper winding. Operation of relay TR' causes the transmission of frequency code data through repeating coil 111', as has been described, and over conductor 135 for repetition through repeating coil 110' to the recorder. Relay SF' is released upon completion of transmission of data for the entry to release relays TR' and RR' and, therefore, relay RE'. Condenser C6 is provided to improve the transmission path for the frequency tones. Other minor modifications of the circuits of Figs. 17 and 18 are apparent.

The sender, with the arrangement, may be adapted to interconnect the incoming and outgoing T and R conductors in it to complete the talking path from the calling subscriber to the trunk as soon as it has extended the connection to the called telephone. Ground returned to it from the trunk over the sleeve conductor will hold the sender, unless the call is abandoned, until it releases after completing transmission of the third entry to the recorder.

Still another way which may be employed to separate the data tones and signals between the sender and the trunk from the talking conductors is to employ the sleeve conductor S for this purpose. When the sender has an entry to make, with this contemplated arrangement, it transmits alternating current of a certain frequency over this conductor to the trunk so to notify it. When the trunk is connected to the recorder, a different frequency is transmitted to the sender to notify it that an entry may be made. It will be understood that filter arrangements and frequency responsive means will be required to effect separation and employment of these frequencies, which may be comparatively low, and the tone frequencies which are purposely selected and shown by the preceding table as being relatively high.

By employment of the sleeve circuit for transmitting data signals, other connection of the station identifier to the recorders and senders in the office may be eliminated. It will be recalled that all of the sleeve conductors in the office are connected to the station identifier for determination of the particular one carrying the frequency transmitted by the sender. The station identifier may, when it determines the identification of the telephone from which the call is being placed, transmit over the sleeve conductor of the line thereof frequency code designating the calling telephone number. The sender may pass these codes on to the trunk via either the sleeve conductor or other circuit for this purpose. The senders need not, with this arrangement, make connection with the station identifier, other than by the sleeve circuit, since the station identifier may be made responsive to the receipt of frequency over any sleeve conductor to identify the calling station therefrom and return thereover the data codes therefor. The sender may transmit, with this arrangement, either of a plurality of different frequencies under control of the particular station identifier over the sleeve conductor to inform the station identifier of the particular station at which the call is being placed. With only one station identifier in service at a time, it will be necessary for the senders to block each other out so that only one will be transmitting a frequency to the station identifier at a time.

The data designating tones are shown in the several figures of the drawings as being transmitted generally over one conductor. Unless low energy levels are employed for these tones, they may be heard in paralleling telephone circuits due to cross-talk. Two-wire paths may, however, be provided. With the arrangement shown by Fig. 20, the tone frequencies may be transmitted through the switches over the sleeve conductor S and conductor 135, which may be paired conductors. With the arrangement shown by Figs. 17 and 18, the tones may be transmitted over the tip conductor T and the sleeves conductor S. In the latter case, a high pass filter may be provided to block out of the recorded tones the low frequency current required to operate relay AC. The circuit modifications to effect transmission of data tones over the conductor pairs are believed to be well within the skill of those versed in this art.

4.6 Entry of time of beginning of conversation

When the called party answers, reversal of direction of the current flowing through the conductors of the trunk to the distant office causes relay P' to operate, in turn to operate relay CA'. Since relay FS is locked to ground on the contacts of relay FSR, a circuit may now be traced from ground at front contacts No. 3 of relay FS, back contacts No. 2 of relay IT', the wiper and terminal No. 4 of the upper bank of switch TS, contacts No. 4 of relay CA', terminal No. 4 and wiper of the lower bank of switch TS to the allotter, which results in seizure of the recorder and the operation of relay SC17' to connect the trunk thereto. The ground traced to terminal No. 4 of upper bank of switch TS is also extended through contacts No. 4 of relay SC17', conductor 136, the upper winding of relay TMR to battery, to operate the latter relay.

Relay ER is operated as a result of the trunk transmitting its identification. The next closure of interrupter PU extends ground through contacts No. 3 of relay ER, No. 1 contacts of relay TMR, upper winding of timer used relay TU to battery, causing this relay to operate. It locks up by its lower winding and No. 5 contacts to ground at the No. 2 contacts of timer supervisory relay TS. Relay TMR also locks up over its lower winding and No. 2 contacts to the latter ground. Relay TU, at its No. 3 contacts, extends this ground to provide a locking circuit for the operated identification relays F-, and relays SIC, JFD and RLD when they subsequently operate. Ground at contacts No. 6 of relay TU operates relay AB to disconnect battery from the allotter to result in relay SC17' being released and the wipers of switch TS being advanced to terminal No. 5. Relay ER releases.

A timer distributing switch TDS of previously described construction and comprising a bank of six terminals, a wiper therefor, a stepping magnet and a release magnet with off-normal contacts ON, is provided to control the order of recording of the digits of the chronological time. The timer may be practically identical to that shown above the dashed line of Fig. 12. The groups of data conductors shown by Fig. 12 as connected to contacts of relay TMC1, are here connected to contacts of five timer order relays TO-. The lower contacts of these relays are connected to four timer frequency relays TFa, TFb, TFc and TFd. Operation of these relays will connect corresponding frequency sources through circuit FCC3 to provide data entries for the chronological time.

Ground at contacts No. 1 of relay TU is extended through the wiper of switch TDS and terminal No. 1 thereof to operate relay TO1. If it is assumed, as previously, that the time of start of conversation is 15:28.7, relay TFa will be operated to cause the recording of the frequency of 1300 cycles for the digit "1" and relay AT will be operated. Upon completion of this recording, relay SIC will be operated, with the latter effective to cause the recording of the source identification with the next digit as previously set out.

The stepping magnet of switch TDS is connected through contacts No. 4 of relay TU to the brush of commutator IMP, so it is operated and released at the conclusion of entry of each digit to advance its wiper to the next bank terminal to successively operate relays TO- until the complete chronological time has been entered. Terminal No. 6 is open. At its No. 2 contacts, relay TU extends ground to prevent the release of magnet 57 (see Fig. 12) and thereby prevents advance of the chronological cams while a time entry is being made.

After the fifth digit entry (tenths of minutes) has been made, the source identification with the pilot frequency is entered and relay JER will be operated incident thereto without relay AT operating, to operate relay RLD to thereby release relay DMR and detent magnet DM to stop the record after this entry has been completed. A circuit may now be traced from ground, No. 1 back contacts of relay JER, contacts No. 2 of relay RLD, the right hand winding of relay TS to battery, causing the latter relay to operate and lock up over its left-hand winding and No. 1 contacts to ground at front contacts No. 2 of relay AB. Operation of relay TS opens, at its back contacts No. 2, the locking circuits for relays TMR, TU, the source identification relays F-, SIC, RLD and JFD, causing all of them to release. The operating circuit previously traced for relay AB is also opened, and the latter releases after a short interval to restore battery to the trunk allotter circuit to indicate that the recorder is available for another entry. Release of relay TU also extends ground through its No. 2 back contacts, off-normal contacts ON to operate the release magnet of switch TDS, causing its wiper to be sprung to normal, whereupon contacts ON are opened.

4.7 Entry of time of conclusion of conversation

When relay CA' of the trunk operated, it completed a circuit from ground at front contacts No. 1 of relay H', contacts No. 5 of relay CA', resistance R11 to the upper winding of free time relay FT', causing it to operate after an interval predetermined by the selected values of resistance R11 and of condenser C7, and to lock up over its lower winding and No. 1 contacts to ground at front contacts No. 3 of relay FS to provide an interval in which the call may be abandoned to result in an incomplete transaction.

When the calling party hangs up his receiver, or the like, at the end of conversation, relay H' is released to result in the release of relay CA'. Second timer relay 2TM is now operated by a circuit from battery, No. 3 contacts of relay H', upper winding of relay 2TM to ground at front No. 3 contacts of relay FS, and it locks up to this ground over its lower winding and No. 3 contacts, thereby preventing its release should the trunk immediately be seized for use on another call. Ground is extended through contacts No. 2 of relay 2TM, terminal No. 5 of the lower bank of switch TS, the wiper thereof, to the allotter to cause the latter to operate relay SC17' when the recorder is available. Ground at contacts No. 2 of relay 2TM is also connected through contacts No. 1 of relay IT' to contacts No. 4 of relay SC17' to operate relay TMR of the recorder, as has been described.

Ground on the upper wiper of switch TS is connected through terminal No. 5, contacts No. 2 of relay FT', contacts No. 12 of relay SC17', conductor k of group 125 to operate last entry relay LE' of the recorder. A circuit may also be traced from battery at contacts No. 1 of relay SC17', winding of relay FSR, to ground at contacts No. 4 of relay 2TM, causing relay FSR to operate. Relay FSR opens locking ground for relay FS, but the latter is held as long as relay SC17' is operated by ground at contacts No. 2 thereof.

The recorder proceeds to make an entry of the time of the end of the conversation as has been described for the previous time entry, with the addition of the frequency of 2100 cycles provided at contacts No. 2 of relay LE' to indicate the last entry of a transaction. It will be noted that relay LE' locks up over its lower winding and No. 1 contacts to ground to which relays F- are held operated.

Release of relay SC17' at the beginning of this last entry opens, at its No. 2 contacts, the locking circuit for relay FS, which releases to release all other relays locked up under its control. Relay FSR is slow to release to permit release of relay FS before it closes its back contacts. Ground at back contacts No. 3 of relay FS is extended through contacts No. 1 of off-normal contacts ON of switch TS to operate the release magnet thereof to permit the wiper to be sprung back to normal, whereupon contacts ON are opened. The trunk is now normal and available to handle another call.

It may be that immediately upon release of the trunk, selectors and line finder used on the originating portion of the call incident to relay H' being released, another selector will connect itself to the trunk before the last time entry can be made. The trunk may be so seized and used for establishing the connection to the distant office without interfering with the final entry. The sender may operate relay AC and, therefore, relay RR in this interval but relay RE will not be operated since the circuit through its winding is opened at contacts No. 1 of relay 2TM until relay SC17' is released after the recorder has been furnished information for the last entry.

It will be noted that the trunk in effecting a time entry is connected to the recorder only momentarily and is not held while the entry is being made. This enables the trunk circuit to be restored promptly to condition to handle entries for another call.

4.8 *Entry to indicate an incomplete transaction*

Arrangements were described in connection with the preparation of a marked journal record for indicating an incomplete transaction. Similar arrangements are provided with frequency journal records. Should relay H' be released at any time after relay FS has operated to indicate that the first journal entry has been made and before relay FT' has operated, a circuit may be traced from ground at back contacts No. 1 of relay H', contacts No. 1 of relay FS, contacts No. 3 of relay FT', lower winding of incomplete transaction relay IT' to battery, causing the latter relay to operate and lock up over its upper winding and No. 3 contacts to ground at front contacts No. 4 of relay 2TM, which was previously operated upon release of relay H', as was described above.

Relay IT' in operating closes its No. 4 contacts to ground the start circuit to the allotter and extends, at its front No. 2 contacts, ground from front contacts No. 3 of relay FS to contacts No. 5 of relay SC17'. It opens, at its No. 1 contacts, the circuit to contacts No. 4 of relay SC17' to prevent time entry by the recorder. It also opens, at its No. 2 contacts, the ground supply for the wiper of the upper bank of switch TS. Upon operation of relay SC17', relay FSR operates as has been described.

The source identification is transmitted to the recorder and the above traced ground at contacts No. 5 of relay SC17' is extended over conductor 138m, through the winding of transaction incomplete relay TI to battery, causing the latter relay to operate and complete a circuit, upon the next closure of commutator PU, from ground at the brush thereof, contacts No. 3 of relay ER, which is now operated, contacts of relay TI, the upper winding of relay TI' to battery, causing the latter relay to operate and lock up over its lower winding and No. 2 contacts to ground at back contacts No. 2 of relay AB. Frequency of 2500 cycles, the designation of an incomplete transaction, at contacts No. 2 of relay SIC is extended through the No. 1 contacts of relay TI', circuit FCC3 to amplifier 124 to cause the recording of this frequency. After this frequency is entered, relay SIC is operated to enter the source identification and open at its No. 9 contacts the 2500 cycle frequency circuit. This condition will be recognized at the last digit of the entry and the recorder will be restored to normal and relay SC17' released. This will result in restoration of the trunk circuit to normal by release of relay FS and the relays held under its control.

It will be noted that with this embodiment of the invention, as well as that set out for preparing marked journal records, any transaction opened on the journal record is closed on it, either by a complete set of entries or by an entry carrying designation of an incomplete transaction.

The several frequency sources indicated in Figs. 17, 18 and 19 may be common to the office to supply the senders, the identifiers and the recorders as required. Separate conventional indications of sources of the same frequency are employed to simplify the drawings. These sources may be oscillating circuits, vibrating forks, inductor alternators, or any other means to provide suitable energy of appropriately controlled frequency.

4.9 *Daily separation of journal record*

Arrangements were described in connection with the marked journal recorder of Fig. 12 for spacing the journal record at the end of the day.

Generally similar arrangements may be provided in connection with frequency journal records. Box 140 of Fig. 19 indicates a test circuit which may be similar to that previously set out whereby the trunks served by a recorder, or group of recorders, may be placed under test at midnight so as to effect record spacing as soon as all under test reach normal. This test is made by conductor 141 which extends to contacts No. 2 of the off-normal contacts of the switches TS of the several trunks. With any of these switches off-normal, conductor 141 is grounded and, when all reach normal, the circuit of box 140 detects this to connect ground to conductor 142 for a predetermined interval to operate detent magnet DM to provide a corresponding blank space in the record. Conductor 145 is grounded by any operated relay SC– to prevent this spacing if a trunk is connected to the recorder with its switch JS normal. Such spacing separates the entries of the two days. The chronological timer arrangements which carry the time forward to the 25th, 26th, and so on hours, will be released at the time of the record separation. Arrangements may also be provided under control of the circuit of box 140 to operate relay AB of the recorder, or recorders, under its control to prevent a trunk connecting itself to the recorder, or recorders, during spacing.

It will be difficult with certain types of frequency records, and impossible with others, to locate the daily separating space without analysis of the record. Means may be provided to facilitate the location of this space. An appropriate counter with a suitable circuit actuated clutch may be employed to this end. After the record has been spaced, the circuit of box 140 may actuate the clutch to connect this counter to wheel 103 so that the amount of record which is subsequently used for entries is measured. When the previous day's record is to be removed, the spacing point may readily be found by measurement in accordance with the indication of the counter, which may then be reset to zero for the next night's operation.

Another method of facilitating location of the separation space is to cause said space to be physically marked on the record, as by crayon or ink, under control of the circuit of box 140.

Still another method of separating the daily records is to have a pair of recording heads with associated record media and drive control elements with arrangements to transfer from one to the other between daily entries under control of the circuit of box 140. It may be desirable to have these recording elements in duplicate anyway, with automatic transfer means normally effective in the event of detectable trouble with the one in service or its exhaustion of medium supply to transfer the operating and recording circuits to the spare one.

It was previously set out that the journal recorder may be located in the accounting office, or some other remote location. A drive motor, wheel 106, detent 108 and its associated magnet DM, pully 103, the record medium and recorder 102 may be located thereat, and the remaining elements of Fig. 19 located in the telephone office. Contacts Nos. 3 and 4 of relay JER may be connected with the recorder by a pair of cable conductors, or the like. A relay with two windings connected as with magnet DM may be provided with contacts to remotely operate magnet DM over another cable pair, or by a simplex circuit over the pair of wires to the recorder.

5. FREQUENCY JOURNAL ANALYZER AND LEDGER RECORDERS

An analyzer for frequency journal records prepared in accordance with Figs. 17, 18 and 19, or other means of appropriate type, is shown by Fig. 21. This analyzer is designed to actuate a ledger recorder as shown by Fig. 14, and which was previously described. These two figures, (that is, Figs. 14 and 21) may be arranged together as shown by Fig. 8.

A frequency journal record 101 may be driven by pulley 150 in the direction indicated which, it will be noted, is opposite to that in which it was driven during the recording operation, as shown by Fig. 19, in order to provide analysis in the reverse order of the entries and the reverse order of the digits of each entry. Constant speed motor 151 is adapted to drive the pulley upon actuation of normally open clutch CL. This clutch may be of any appropriate quick acting type, including those with a magnetically actuatable clutch plate, or of the electrostatic type. The speed of pulley 150 is such as to cause the journal record to be driven at the same speed as that at which it was driven during the recording operation. Appropriate means, such as an idler pulley tensioned against the journal record on the driving pulley, may be provided to prevent slippage. A reproducer REP appropriate to the type of journal medium and record employed, senses the journal entries and converts them into electrical current of the frequencies of the recorded data and other signals. The output circuit of the reproducer is connected to amplifier 152. This amplifier energizes the circuit including conductor 153 in response to each digit, or the like, signal sensed by the reproducer to operate amplifier relay AR for a corresponding time.

A group of thirteen band pass filters are indicated at the left of this figure, each adapted to pass a narrow band of frequencies centered on its frequency designation. These filters correspond to the thirteen frequencies previously set out which are employed in the record preparation. The 2700 cycle filter is for the pilot frequency, which is the highest employed. It is for the purpose of assuring that the journal record has been brought up to full speed before sensed data may be employed. The presence of the 2700 cycle component recorded and reproduced with every digit and other entry operates pilot frequency relay PF to connect the output of the amplifier to the other filters. Arrangements obviously may be provided to cause the analyzer's operations to be stopped as a result of the operation of relay AR without the substantially concurrent operation of relay PF, and an alarm signal to be operated.

The output of each of the latter filters is connected to the winding of a pilot relay P– so that the presence of any of the designated filter frequencies in the sensed signals will cause the operation of the corresponding pilot relay. Designations of these pilot relays include the code element to which each relates.

Two sets of relays with their contacts connected in the pyramid arrangement are provided. One selects a ledger recorder in response to sensing of the source, trunk, transaction or ledger identification, and the other decodes the digit for actuation of the punch or similar magnets of the ledger recorder.

There is substantial correspondence between elements of Fig. 21 and those shown by Fig. 13 and described in connection therewith. Such corresponding elements bear the same designation as in said preceding figure with the addition of a prime mark.

5.1 Journal analysis and ledger recording

When a journal record is to be sensed, it is inserted in the analyzer, key SK' is closed to energize the analyzer circuit and key IK' is operated to extend ground through normally closed contacts No. 2 of relay IKR to energize the clutch magnet, which results in the journal being driven. The first frequency signal sensed results in conductor 153 being grounded to operate relay AR, and therefore relay IKR over its lower winding, to open the circuit from key IK' at its No. 2 contacts and connect the front contact of relay AR to the clutch CL. Relay IKR locks up over its upper winding and No. 1 contacts to ground at contacts of key SK'.

The first element of an entry which is sensed will be the last one made on the journal and will comprise, with automatic ticketing arrangements, the identification of a trunk, which may be assumed to be trunk No. 17, of the group which makes entries on this journal and which was the trunk described in detail above. This will result in pilot relays Pe, Pg and Ph operating to complete circuits from ground, winding of pilot supervisory relay PSR, contacts of these operated pilot relays, windings of relays Le', Lg' and Lh' to battery, causing the latter relays to operate and lock up over their respective left windings to ground at normally closed contacts No. 2 of last digit entered relay LDE. Operation of the ledger selector relays extends ground from the winding of relay RC', serially through the pyramid contacts to terminal No. 17, and thence, via conductor 67, to operate ledger connector relay L17. Relay RC' operates in this circuit.

Relay AR being operated while the above frequencies are being received maintains the clutch operated during frequency detection and releases it immediately upon conclusion of such sensing to stop the journal between digit, or the like, entry positions. When relay RC' operates, as it probably has done before detection of the ledger selection code has been completed, it extends ground through its lower contacts, No. 2 contacts of first entry relay FE (No. 3 contacts of relay LDE to operate the clutch.

The next entry signal sensed will be a data code for the lowest order digit of the chronological time of completion of conversion, which will result in the operation of one or more of pilot relays Pa, Pb, Pc and Pd, depending on the magnitude of the digit. This will result in a circuit being completed from ground, winding of data code received relay DCR, contacts of one or more of the last mentioned pilot relays, windings of corresponding ones of decoder relays Da', Db', Dc' and Dd', winding of relay DO' to battery, causing these decoder relays, relay DO' and relay DCR to operate in series. The operated decoder relays lock up over their respective left windings to ground at the back contacts of relay PD'. Battery at contacts No. 3 of relay DCR is extended through the lower winding of relay FE to ground at the front contacts of relay RC', causing relay FE to operate and lock up over its upper winding and No. 1 contacts to ground at normally closed contacts No. 2 of relay LDE. This enables the journal to be stopped at the end of the sensing of this digit by the amplifier 152 then releasing relay AR.

When relay DO' operates, it extends battery through the winding of relay PMT', the pyramid contacts of the decoder relays to the numerical conductor of group 69 for the digit sensed to cause that digit to be punched in the ledger card, or otherwise recorded. As a result of this entry being made, conductor 71 is grounded by the ledger recorder to operate relay PD'. Operation of the latter relay operates clutch start relay CLS and releases the operated decoder relays. Relay CLS locks up over its upper winding and No. 1 contacts to ground at the back contacts of relay AR. When relay PD' is released by release of relay LP of the recorder, a circuit may be traced from ground at back contacts of relay PD' through the No. 2 contacts of relay CLS, No. 3 contacts of relay LDE to operate the clutch for sensing the next digit. When this digit is sensed, the resulting operation of relay AR will open the locking circuit for relay CLS, which releases.

These operations are repeated for successive digits until the last digit of the entry, which was the first one thereof recorded, is sensed. It will be recalled that the first digit of an entry which is recorded is not accompanied by the source identification code. Relay PSR will not, therefore, be operated, so upon operation of relay DCR incident to sensing of the data code, a circuit may be traced from ground at back contacts of relay PSR, No. 2 contacts of relay DCR, lower winding of relay LDE to battery, causing it to operate and lock up over its upper winding and No. 1 contacts to ground at contacts of relay RC'. It transfers, at its No. 2 contacts, the holding ground for the ledger selector relays and relay FE to the back contacts of relay PD'. At its No. 3 contacts it opens the circuit to the clutch CL.

When the last digit is entered, operation of relay PD' will release relay FE, the decoder relays and the ledger recorder selector relays to release the ledger recorder. Relay RC' will then release to release relay LDE. When relay PD' releases, the clutch will be operated by the previously traced circuit from its back contacts and the No. 2 contacts of relay CLS to cause the journal to be advanced until the source identification of the next entry is sensed.

The above operations will be repeated for subsequent entries to ledger recorder No. 17, and entries to other of the recorders.

5.2 Incomplete transactions

The journal entry for an incomplete transaction comprises, as will be recalled, two signals; the first one being 2500 cycles (code element *m*) and the second the source identification, which are sensed in the reverse order. The source identification selects the corresponding ledger recorder, as has been described. The subsequent sensing of the 2500 cycle signal results in pilot relay Pm being operated, which operates disable relay DA' by a circuit from ground through the winding of relay DCR. Operation of relay DA' results in ground being connected to conductor 78 to operate relay LD of the recorder to disable it. The latter sensing has the characteristics of the last digit of an entry since it is not accompanied by the source identification, resulting in the operation of relay LDE for purposes which have been described.

At the suspension of sensing of signal *m*, relay DA' is released, and ground returned over conductor 78 from the recorder as the result of relay LD therein being operated is extended to operate relay DT'. The latter, at its No. 2 contacts, operates relay PD' to simulate the condition of a punch magnet of the recorder having been operated and thereby releases the operated ledger recorder selector relays. This results in the release of relays L17, DT' and PD', in this order. Other operations which have been set out will result in the analyzer now being restored to normal and the journal advanced for sensing of its next entry.

When the next entry of the incomplete transaction for ledger recorder No. 17 is sensed, the operation of relay L17 thereof will result in relay DT' being operated. This relay connects ground at its No. 3 contacts, contacts No. 4 of relay LDE to operate the clutch continuously until the last digit of the entry is encountered, whereupon relay LDE is operated as previously described to open this circuit through its No. 4 contacts. Since relay PD' is operated by relay DT', the locking circuit for the ledger recorder selector relays will be opened in a moment, as will be explained, to cause them to release to in turn release relays L17 and RC'. Relay DT' is therefore released. Relay RC' is slightly slow to release to assure that relay DT' releases before the holding circuit for relay LDE is opened.

Relay LDE will operate at the beginning of the sensing of the last digit of the entry. Ground at the No. 1 contacts of relay DCR is connected to the circuit through the No. 2 contacts of relay LDE to prevent release of the ledger selector relays, due to relay PD' at this time being operated, until sensing of the last digit has been completed.

Subsequent entries, other than the first recorded entry of the incomplete transaction on the journal, for a disabled recorder are similarly handled. When the first entry is made on the journal, the source identification is accompanied by a frequency of 2300 cycles, representing signal element $j$. This is the first element of the last entry of such a transaction which is sensed. The presence of a 2300 cycle component, in addition to the source identification, operates pilot relay P$j$ to operate hold relay H$j$. The latter relay locks up over its lower winding and No. 3 contacts to the ground employed for locking the ledger recorder selector relays. Relay DT' is operated promptly upon relay L17 being operated. When relay H$j$ operates, it connects, at its No. 2 contacts, ground to conductor 80 which, it will be recalled, operates relay EL to restore the ledger recorder to service upon release of relay L17 thereof. It is the primary purpose of relay H$j$ to maintain ground on conductor 80 continuously while the journal is being driven through the digit positions of this entry. Operation of relay EL of the recorder disconnects ground from conductor 78 to open the operating circuit for relay DT'. This relay is locked up, however, by a circuit from battery, its lower winding, and contacts No. 1 to ground at contacts No. 1 of relay H$j$. The journal is therefore continuously driven while relay DT' is operated until relay LDE operates. After this occurs, relay DCR releases upon completion of sensing of the last journal digit of the entry, the operated ledger selector relays, relays FE and H$j$ are released, but relay H$j$ is slightly slow to release to assure release of the ledger selector relays before it releases relay DT' and, therefore, PD'. When relay RC' subsequently releases, relay LDE will release to cause the journal to be driven to the next entry, as has been described. The recorder will have been restored to operative condition for another transaction.

5.3 *Analyzer and ledger recorder supervision*

It will be recalled that certain safeguards with respect to ledger entries were provided in connection with the analyzer for marked journals. These are also present with the frequency type journal analyzer. Relays RC' and PMT', with their resistances and condensers, control the operation of relay AS' and lamp AL1' in the event the analyzer becomes stuck, as previously described.

The source identification of the last entry of a complete transaction, and therefore the first digit of that entry which is sensed, is accompanied by 2100 cycle frequency signal, which operates pilot relay P$k$. The latter relay operates hold relay H$k$, which locks up over its upper winding and No. 2 contacts to the holding ground for the ledger recorder selector relays. Relay H$k$ extends ground through the lower winding of lock-up relay LU', conductor 81, No. 4 contacts of relay L17, when it operates, No. 3 front contacts of operated relay 36P to operate relay FET to provide battery supply for the punch magnets as has been described, and since relay H$k$ is locked up for all digits of the entry, this battery supply is correspondingly maintained. There is insufficient current over this circuit to operate relay LU'.

Should ground over conductor 81 encounter a recorder which has made its first entry, relay 36P thereof will be released to result in relays LLU and LU' operating and locking up to indicate an improper entry, as also previously described. Lamps AL2' and LL2 are lighted. Relay LU' may be provided with another set of contacts to open the circuit to the clutch CL to assure no further advance of the journal under this locked up condition.

Entries other than the first one of a transaction which is sensed are not accompanied by relay H$k$ being operated. Should such an entry be directed to a recorder with its card and cams in a position other than No. 36, relay FET thereof will not be operated, so the entry will not be made, and lamps AL1' and LL1 will be lighted after an interval to indicate the analyzer and its connected recorder are stuck, as was described in connection with Figs. 13 and 14.

The arrangements shown contemplate the preparation of a ledger record of the printed or decimally marked type such as shown by Fig. 5. If the information entries on the ledger are made in code, as may be desirable in some practices of this invention, decoding arrangements may be omitted and the sensed data codes transmitted to a suitable ledger recorder for direct entry on an appropriate ledger record medium thereby.

The speed of journal record 101 during analysis has been assumed to be the same as during recording, with the band pass filters adapted to separate the same frequencies as recorded. It is not necessary that the same analysis speed be used for recording in practicing this invention. It may be either higher or lower as may be desirable in certain applications of the invention. If the analysis speed is one-half that at which the journal was prepared, the sensed signals will be at one-half of the recorded frequencies and the several band pass filters will be adapted to pass signals of one half the frequencies shown. That is, the band pass filter frequencies will be in the same ratio to those shown as the analysis speed is to the recording speed.

In some applications of the invention it will be desirable to prepare frequency ledger records which may be similar, but not necessarily so, to the frequency journal record. With such arrangements, each ledger may include a record medium and recorder. The journal analyzer may be somewhat simpler than that shown by Fig. 21, in that data frequency filters, decoding arrangements and certain other circuit elements may be omitted. When an entry is to be made, the identification thereof effects selection of the corresponding ledger recorder, whereupon the record medium thereof and the journal are driven, and the sensed data signals transmitted to, and recorded on, the ledger medium. Band pass filters may be provided so that only the data signals may be recorded, or these signals with indication of the beginning and end of each transaction may be entered. Incomplete transactions may be excluded from the journal record by means generally similar to those which have been described for this purpose.

It is believed that the teachings herein are sufficient for the skilled in this art to provide the described alternative arrangements, and specific showings thereof are deemed to be unnecessary.

6. CONCLUSION

Two of many arrangements appropriate for the preparation of telephone call data records have been set out. The inclusion herein of other such arrangements, including those applicable to types of dial equipment other than the step-by-step type used herein for illustration, is deemed unnecessary for clear understanding of the invention. It may be appropriate, however, to mention some of these arrangements which are clearly within the scope of the present invention.

Step-by-step offices on the fringe of metropolitan telephone areas normally do not require senders for establishing connections in the local or free service area, but senders are desirable on calls to telephones served by offices in the metropolitan area due to the complex nature of the switching situation involved. It is the practice in some such offices to have the senders associated with the outgoing trunk circuits to the metropolitan area and, upon a call being routed to such a trunk, a sender is connected thereto and the remaining digits are recorded therein. The sender, by means of circuit arrangements generally similar to the station identifier set out herein, reconstructs the called office code by analysis of the route through the switches by which the trunk was reached, so that the sender may, in response thereto, transmit the proper number of digits of the proper magnitudes to operate the switches at a tandem or other points in the metropolitan area. The reconstruction of the called office code and registration of the digits of the called number result in the sender having full information with respect to the called number. It may secure the number of the telephone from which the call is placed by a station identifier. The sender and trunk are now in position to make journal entries of either the marked or frequency types of arrangements quite similar to these set out herein.

When panel, crossbar or other types of dial equipment are used, the various elements required for automatic ticketing in accordance with this invention may be appropriately located with respect to the dial equipment elements, and the various information signals may be transmitted between these elements and the journal recorder by marked or frequency type codes.

Where the invention is used with multiple registration whereby message units are employed as the basis of computing short-haul toll charges, or billing for local message rate service, the trunk circuit or other suitable dial equipment element may, by well-known means, accumulate the message units of each call. The calling number, called number and equipment elements employed may be entered on the journal. For the next, and last, data entry, the trunk, of the like, may record the accumulated message units with designation that the transaction is of the message unit type. Sensing of the latter by the analyzer causes, by adaptation of described means, the ledger card to be advanced to position No. 26, and the sensed number of message units is entered in that position, and the next two digital positions if necessary, followed by the number of the telephone called and that at which the call was placed.

There are well known means in the practice of dial telephony with panel and crossbar equipment for transmitting numerical information between equipment elements in such manner that each digit transmitted is almost instantaneously checked to see that the code therefor has not been mutilated by an open circuit, ground or other trouble present on the data conductors and relays. Such arrangements and the codes therewith may be employed advantageously in the present invention.

It was pointed out herein that narrow marked tapes, such as perforated Teletype tape, are substantially within the basic conception of frequency records. This arises from the fact that both provide individual digit, or the like, entry positions for analysis, the number of digits comprising an entry is practically unlimited and both are well adapted to reverse analysis. Such a tape record may be provided by punching arrangements of well known type similar to those considered herein. Means are shown for entering digits one at a time in order, of which switch SDE of Fig. 17 is illustrative. The journal recorder may make digit entries of a transaction and follow it with entry of the source identification so it will be sensed first on reverse analysis. Arrangements are disclosed by Fig. 19 for providing such identification as a final entry and these arrangements obviously may be modified to omit entry of this identification until all data, or the like, digits have been recorded. Such a journal tape may comprise four transverse marking positions. There are four data codes available with a four-place code over those previously set out as being used. These codes may be employed to indicate the first entry of a transaction, the last entry thereof, the end of an entry and an incomplete transaction. The first and last entry designations may be entered on the journal just ahead of the source identification, and the one indicating the end of the entry to the analyzer may be ahead of each entry. A decoder of pyramid type similar to those of Figs. 13 and 21 may be fully equipped with the added terminals connected to suitable circuit elements to effect the control operations called for. The holding time of the journal recorder and other elements involved in the supply and recording of the data, and that of the analyzer, may be reduced by employing a journal record in which certain or all of the control indications are provided by additional transverse marking positions on the tape. Two additional positions may provide three such indications since they may be used in combination and decoded by the analyzer. The use of two such additional positions together with the four extra data codes may be variously employed to provide seven informational entries for selectively controlling the analyzer and ledger recorders for desired purposes, such as ledger entry position selection, and special recording operations, such as designating debit and credit entries.

The conventional Teletypewriter or similar five-place code is well adapted to employment with this invention, particularly where letters as well as numerals are to be entered on the ledger record. Such a code will enable substantially standard Teletypewriters to be used for the ledger recorders where printed records are desired or substantially standard reprefrators for a punched record. Such instruments will enable the omission of decoding arrangements from the analyzer. It will be recognized, in this connection, that even with codes such as used with the embodiments described herein, the employment of decoding means may be omitted from the analyzer by employment of code-actuated recorders. One form of such a recorder adapted to print entries is shown in my Patent No. 2,079,721, granted May 11, 1937. With a recorder of this general class, all digits of an entry may be recorded simultaneously without decoding by employment of journal records susceptive of having a plurality of digits sensed simultaneously.

The use of a keyboard for making journal entries is indicated by Fig. 2. The keys may lock down when operated, and those in each keyboard column may selectively control a set of four contacts in accordance with the magnitude of the digit represented by the depressed key. When all keys for an entry and the transaction or ledger identification have been operated, the journal recorder may make the entry. If marked type journal records are employed, the marking of all digits and the identification may be made simultaneously. With frequency type journal records, the frequency sources may be conected to the keyboard contacts and a switch similar to SDE of Fig. 17 may be employed to control entry of the digits one at a time in their proper sequence. Control arrangements similar to those shown by Fig. 19 may be provided to withhold the transaction or ledger identification from the first digit entered and to cause it to be entered with the remaining ones, and separately entered following recording of the lowest order digit. Control indications also may be entered with either type of record by actuation of contact controlling keys for this purpose.

The keyboard may be of the 10-key type, whereby each digit is entered by operation of one of these keys. With marked type journal records, either storage arrangements for the digits may be provided or the entries made from lowest to highest order digits with steering arrangements to correspondingly advance the recording positions upwards in the order. Storage arrangements and advance of registrations are both set out in various figures of the drawings and may be adapted readily to use with a keyboard.

A 10-key keyset is particularly well adapted to frequency recording. With such an arrangement, the ledger identification may first be indicated by a two-digit entry which is stored. The data may be entered in descending order of digit positions by successive operations of selected keys controlling connection of the proper frequency sources with the recorder. The control circuit may withhold the identification from the first digit entry and supply it for a digit position after the last digit has been entered, whereupon the register in which the identification has been stored is released. The use of 10-key keysets is particularly advantageous for preparing data entries at telephone switchboards which frequently are provided with such sets for other purposes, and which may be used for this additional purpose.

The arrangements shown by Fig. 3, whereby a single source or plurality of sources may make selectively entries on a plurality of journals, is broadly shown by Figs. 17, 18 and 19. The senders thereof may be considered the sources. The journal recorders may be individual to trunk groups to particular dial offices. The sender, in selecting a trunk to a particular distant office, selects the corresponding journal recorder. The sender obviously may be adapted to provide its designation as the source identification with each entry.

Journal records may be prepared by any other suitable means in addition to those described. With respect to retail establishments, for example, the customers may be provided with a key, a card, or the like, carrying a sensible record of the identification of that customer's account or of a transaction. This identification may be inserted in a suitable transmitter with a keyboard, and the customer's purchase data entered by key actuations to indicate the amount and kind of purchase, and such other information as may be appropriate. A journal entry is made of these data, together with the identification of the account as secured from the key or the like. Punched accounting machine cards may be prepared from these entries and filed by accounts until the end of the billing period, whereupon an accounting machine may prepare the customer's bill therefrom.

Special analyzing means may be provided for journal records whereby particular transactions thereon may be located and the data entries thereof displayed or recorded. It may be, for example, that one of the ledger recorders is found, due to some trouble therein, to have been making erroneous entries. The journal may be rewound and analyzed by the special analyzer which may be adapted to pass by all transactions other than those for the recorder under consideration. It detects these particular transactions by energization of the corresponding terminal of the ledger recorder selector such as that shown by Figs. 13 and 21 and, as a result thereof, an associated recorder is actuated to make a record of entries for that transaction. Such specially prepared ledger records may be compared with those originally made and new records substituted for the old.

Where the present invention is used for billing customers, as with automatic ticketing, a customer may protest an entry on a bill. The ledger card for the transaction may readily be located and compared with the bill to determine if the billing machine made an error. A subsequent check, if necessary, would be to find the entries on the original journal record. It will be desirable, for this purpose, to have entered on the ledger cards designation of the journal record from which entries are taken. This may readily be effected by means for this purpose, such as dials as shown by Fig. 14 for entry of the dates and the code of the originating office. This entry may be made in positions on the card for designation of equipment used. The ledger cards may, to simplify the finding of a particular transaction, also have recorded thereon the source identification of the transaction, i. e., the ledger recorder identification.

A special analyzer may be preset for the particular source and the four digits of the number of the telephone of the subscriber protesting the entry. The special analyzer then passes by transactions from all sources other than the selected one and, upon sensing the calling telephone number of a transaction from that source, compares it with the preselected one. If it is different, the analyzer continues with its analysis, but if it corresponds, the analyzer makes a record of the transaction data or displays it by means of lighted lamps in a numerical bank.

With marked type journal records, this special analysis preferably is in the same direction as that in which the journal was prepared since the number of the calling telephone is the first entry thereon and may be checked against the desired one coincident with checking the source identification. With frequency journal records, reverse analysis is preferable where the source identification is absent from the first digit of an entry. With reverse analysis, the special analyzer stores in code by relay groups, or the like, as have been described herein, each entry of a transaction bearing the identification of the selected source until the calling telephone number is sensed, whereupon the recording or indication of the stored entries may be made if that number corresponds to the desired one, or the registers may be released if it does not, and the analyzer proceeds.

A special analyzer may also be preset for the number of the called telephone so that the specific call under protest may automatically be located by similar suitable means.

After analysis of a journal record has been completed, check of the ledger cards or other sensible ledger records back against the journal may be made. This requires that analyzers corresponding to the several ledger recorders be provided to analyze the cards of each said recorder coincident with re-analysis of the journal, and corresponding entries may thereby be checked. Any discrepancy may be made to lock up the analyzer and signal this condition.

Arrangements similar to those outlined may be employed to make spot checks of the ledger cards, or the like, to provide general observation of the functioning of the analyzer and ledger recorders.

The journal analyzer and ledger recorders disclosed herein are indicated as being adapted solely to the recording of data. It will be understood, however, that they may be a part of a suitable accounting machine or have appropriate computing means associated with them, as in the analyzer, whereby data provided by the analyzer from the journal may be employed alone or in conjunction with other information for making calculations for entry on the ledger records.

Two examples will illustrate such application. In commercial banking, each customer's account is maintained to indicate dated debit and credit entries and the current balance. In application of the invention to this service, each customer's ledger sheet may comprise a sensible marked record for carrying the above information. The entry information from the tellers and other sources may be first grossly sorted by the hundreds of the customer's account designation numbers. A sensible journal may then be prepared of all entries for each of these hundred accounts with each entry identified by the last two digits of the account number. The ledger account records may then be placed in 100 ledger recorders in accordance with the last two digits of the account designation numbers. The account designations may be of sensible type which the recorder may check to assure that it has the proper ledger record. When an entry is directed to a recorder, that recorder enters it, senses the previous balance and advises computing mechanism, which may be associated with the analyzer, of the amount thereof. The latter mechanism computes the new balance and furnishes it to the recorder, which enters it and advances the ledger record to the next line, or the like. At the end of the month, the customer's ledger cards may be run through automatic billing machines for printing of customer's statements. Overdrafts may automatically be detected and an auxiliary printer actuated to make a record thereof.

The journal recorder in preparing the journal for the hundred customers may separately accumulate totals of the debit and credit entries, and determine therefrom the net change in the balances of these customers. The analyzer may make similar totals of the ledger entries which it has made. These totals may be employed for checking the operation of the journal and ledger recorders, and for banking control purposes and accounting. The checking may be done automatically by the analyzer and associated mechanism as a result of comparing the totals which the journal recorder may sensibly enter on its record with those developed under control of the analyzer.

A second illustrative application is to utility, such as power, customer accounting which may be generally similar to that for banking. The customer's sensible ledger records may be filed in accordance with the meter reader's route book, and carry the previous reading, rate information, other charges and unpaid balances. A journal record may be prepared for, say, each hundred customer accounts indicating the latest reading from the route book and the various debit and credit entries of transactions during the month. Analysis of this record and sensing of the ledger record data may be made to actuate the recorders in which the ledger records have been placed to effect computation of consumption and determination of the customer's net balance, etc., which may be entered on his ledger card for subsequently actuating an automatic billing machine. Summaries of the journal and ledger entries may be accumulated for control purposes.

Known means may be provided with either of the above, and similar, arrangements for automatic distribution of the customer ledger records to their respective recorders and for accumulating them for filing after the entries thereon have been made.

Where the journal records carry more transactions than it will be economical to provide individual ledger recorders for, the journal may be repeatedly analyzed with successive groups of selected ledger records of limited number prepared with each analysis. The analyzers may be provided with adjustable means to connect selected terminals of the ledger selector relays to the recorders available. Entries to the latter may be made and those for other transactions or ledgers may be effective to advance the journal to the next entry.

It is believed that the teachings herein are sufficient for the skilled in the art clearly to understand the arrangements set out in this summary section, so detailed showings thereof are considered unnecessary.

Certain arrangements disclosed herein for effecting a particular result in a portion of one of the embodiments may be employed to effect a similar result either in another portion of that embodiment or in another embodiment.

I may use in the appended claims the term "digit," and derivatives thereof, in defining the invention, particularly in connection with setting out the elements of the entries. It is to be understood that the use of such words is not limited to definition of numerical representations, since it will be recognized that an entry may comprise other information designations, such as letters to form words or code indications.

While I have described my invention and the means for utilizing the same in detail in connection with preparation of telephone call data, and outlined how it may be used in connection with certain other applications, it is to be understood that various other applications and embodiments may be made by those skilled in the art without departing from the spirit of the invention as defined within the scope of the appended claims.

What is claimed is:

1. An information recorder including a sensible record of information representations accompanied by identification representations thereof in a certain order, an analyzer for sensing representations of said record in the reverse order, a plurality of recorders corresponding respectively to said identification representations, means for selecting one of said recorders in response to the sensing of the identification representation corresponding thereto, and means to actuate the selected recorder in said reverse order to record information representations in response to sensing of the information representations accompanying the identification representation corresponding to the selected recorder.

2. The method of transferring data from a record comprising sensible entries, each entry composed of one or more digital representations arranged in a descending order, to a record medium having a predetermined position for the digits of each entry, which consists in analyzing each entry of said record in the ascending order of the digital representations thereof, recording on said medium in response to the analysis of an entry representations of the digits thereof, with the lowest order digit at a predetermined digital position on said medium for that entry and, in response to the conclusion of the sensing of an entry, effecting control operations for recording the next entry with the lowest order digit thereof at the predetermined digital position therefor on said medium for that entry when said last-mentioned entry is analyzed.

3. A data translator including a record of sequential sensible data entries with each entry comprising one or more ordered digital representations, a medium having predetermined positions at which entries may be recorded, means to analyze said record in a predetermined manner, means responsive to sensing in said predetermined manner of the digits of an entry by said analyzing means for recording digital representations thereof on said medium with the lowest order digit representation at a position on said medium predetermined for that entry, and means responsive to the recording of an entry for positioning said medium for the recording of the next entry with the lowest order digit representation thereof in a position predetermined therefor.

4. A data translator including a record of sequential sensible data entries with each entry comprising one or more ordered digital representations, a medium having predetermined positions at which digital representations of entries may be recorded, a recorder for making entries on said medium, means to analyze said record in a predetermined manner, means responsive to sensing by said analyzing means in said predetermined manner of the digital representations of an entry in the ascending order of said representations for actuating said recorder to make a record of digital data represented thereby with the lowest order digit thereof at a predetermined location therefor, and means responsive to completion of recording of the data of an entry for relatively positioning said medium and said recorder for recording the data of the next entry with the lowest order digit thereof at a position on the medium predetermined therefor.

5. A data translator including a record of sequential sensible data entries with each entry comprising one or more ordered digital representations, a medium upon which data may be recorded, a recorder for making data representing entries on said medium, means to analyze said record in the ascending order of said representations, means responsive to said analyzing means analyzing said digital representations in said ascending order for actuating said recorder to make a record of digital data represented thereby with the lowest order digit thereof at a predetermined location therefor, and means responsive to completion of recording of the data of an entry for selecting the lowest order digital position on said medium of the next entry.

6. The method of preparing correlated records of plural entry identifiable transactions from a sequential sensible record of transaction-identified interspersed information representing entries and transaction-identified designations of incomplete transactions, which consists in analyzing said sequential sensible record in reverse sequence to the entries thereon, preparing correlated records of completed transactions in response to sensing of the several identified entries thereof, and effecting omission from recording of all entries of incomplete transactions in response to sensing of the identified designations severally individual thereto.

7. A data translator including in combination with a first record medium having recorded thereon a sensible sequential record of data entries with each entry comprising one or more ordered digital representations, an analyzer for analyzing said first record medium in a predetermined order, a second record medium, a recorder actuated by said analyzer in response to said analyzer analyzing each entry on said first record medium in said predetermined order to make a record of each entry on said second record medium with the lowest ordered digit thereof at a location thereon predetermined for each entry, and means selectively operable to adjust the lowest order digital position on said second record medium for at least one of said entries.

8. A data translator including in combination with a record medium having recorded thereon a sensible sequential record of interspersed data entries of a plurality of transactions originating from a plurality of sources each entry comprising one or more ordered digital representations and an identification of the source of the transaction to which it is related, an analyzer for said record, a plurality of recorders, each recorder corresponding to a source of transactions and each adapted to record data entries at predetermined positions on a record medium, means responsive to the analyzer sensing the identification for a source of transactions and the accompanying data entry for selecting the recorder corresponding to said source of transactions and actuating it to make a record of the entry at a position on its record medium predetermined for that entry, and means common to said recorders selectively operable preceding the sensing of a series of transactions for adjusting the location of at least one of the entry positions.

9. A data translating system including in combination with a record medium having recorded thereon a sequential record comprising sensible interspersed entries of data representations of a plurality of separate transactions, each entry being accompanied by a sensible identification of the transaction of which it is a part including the first entry of each transaction and the last entry of each incomplete transaction, means to analyze said record medium in reverse sequence, recorders corresponding to said transaction identifications, means responsive to said analyzing means sensing the identification of a transaction for selecting the recorder corresponding thereto and, in response to sensing the data entry associated with said identification, for actuating said recorder to make a record of said data entry, means responsive to said analyzing means sensing the designation of an incomplete transaction and the identification thereof for selecting and disabling the recorder corresponding to that transaction identification, thereby preventing said recorder from making a record of entries of that incomplete transaction, and means responsive to said analyzing means sensing the designation of the first entry of said incomplete transaction and the identification thereof for selecting and restoring to operative condition the disabled recorder corresponding to that transaction identification.

10. A communication data recording system including switching means actuable to establish communication channels, means to produce units of data relating to communications over said channels, each unit comprising one or more predetermined frequencies in accordance with a code, frequency recording means common to a plurality of said channels, means responsive to the successive production of units of data relating to a communication over a channel for successively associating said recording means with that channel, and means for actuating said recording means over the channel to which it is connected for making a frequency record of a data unit relating to the communication over that channel.

11. A communication data recording system in accordance with claim 10, with means for actuating said recording means to make a frequency record identifying the communication to which each data unit relates.

12. A communication data recording system including switching means for establishing communication channels, means for producing sequential time spaced units of data relating to each communication including the identification of each communication, said data units and said identification comprising combinations of frequencies in accordance with a code, a recorder for making a record of frequencies, means for successively associating said recorder with any of said channels in response to production of data units relating to a communication over said channel, means for actuating said recorder over the channel to which it is operatively associated to make a record of data relating to a communication thereover, and means to actuate said recorder to record in accordance with a code the identification of the communication to which each recorded data unit relates, whereby a sequential frequency record is made comprising interspersed identified data units of a plurality of communications.

13. A data recording system comprising in combination a record containing thereon entries of a plurality of identifiable transactions with each transaction comprising one or more time spaced entries and each entry comprising data representations accompanied by an identification of the transaction of which it is a part, means for analyzing said record in reverse order to that in which said entries were entered on said record, means for preparing a plurality of sensible records, means responsive to said analyzing means sensing the entries of said record in said reverse order for actuating said record-preparing means to prepare in said reverse order data records individual to each of said transactions with the entries thereof on said individual records in the same order to that in which said entries were entered on said first record.

14. A data recording system comprising in combination a sequential sensible record of entires of a plurality of identifiable transactions, with each entry comprising sequential digital representations of data in descending order and terminating with an identification of the transaction of which the entry is a part, a plurality of recorders corresponding to said transaction identifications, means for analyzing said record in opposite sequence to that in which said entries are entered on said record, whereby each of said transaction identifications is analyzed by said analyzing means in advance of analyzing the associated digital representations of each transaction entry, means responsive to the sensing of a transaction identification for selecting the one of said recorders corresponding thereto, and means responsive to said analyzing means sensing the digital representations of said latter entry for actuating said selected recorder to make a record of the digits of said entry in an ascending order.

15. A data recording system comprising in combination a sequential record of a plurality of identifiable plural entry transactions including an entry designating a particular incomplete transaction, means for analyzing said record in the reverse order to that in which the entries were entered upon said record, a plurality of recorders, each recorder corresponding to a particular transaction identification, means responsive to said analyzing means sensing transaction identifications on said record for selecting the recorders corresponding thereto, means for actuating a selected recorder in response to said analyzing means sensing the data entry on said record corresponding thereto to cause a record of said data entry to be made by said recorder, and means responsive to said analyzing means sensing an entry designating an incomplete transaction for disabling the correspondingly selected recorder from making a record of the data entry for said incomplete transaction.

16. A data recording system in accordance with claim 15 with means responsive to said analyzing means completing the sensing of all entries of an incomplete transaction for restoring to operation the disabled recorder corresponding thereto.

17. A data recording system comprising in combination a record containing data designations comprising combinations of different frequencies in accordance with a code to form plural digit entries of a plurality of identifiable transactions, all of said entries being identified as to the transactions of which they are a part by combinations of certain frequencies, analyzing means for analyzing said record in the reverse sequence to that in which the entries thereon were entered on said record, a plurality of recorders each of which corresponds to a transaction identification, means responsive to said analyzing means sensing the transaction identification of an entry for selecting the recorder corresponding to that identification, and means responsive to said analyzing means sensing the data designations of latter said entry for actuating the latter said recorder in said reverse sequence to make a record of that entry.

18. A data recording system including a record containing thereon data designations comprising combinations of different frequencies in accordance with a code to form plural digit entries of a plurality of identifiable transactions with said entries identified as to the transactions of which they are a part by combinations of certain frequencies and with each data designation including a pilot frequency which is higher than any of the above-mentioned frequencies, means to reproduce the frequencies of said record in the reverse sequence to that in which said record was prepared, a filter corresponding to and adapted to pass each of the reproduced frequencies, a plurality of recorders each of which corresponds to a transaction identification, means including the filter which passes the pilot frequency to connect the other said filters to said reproducing means under control of the means which reproduces the pilot frequency, means including certain of said filters responsive to the reproduction of the frequencies identifying the transaction of an entry to select the recorder corresponding to that transaction identification, and means including other of said filters responsive to the reproduction of data designating frequencies of latter said entry for actuating latter said recorder to make a record of that entry.

19. A data recording system in accordance with claim 18 with means responsive to failure to reproduce the pilot frequency accompanying an entry to stop the reproduction of the frequencies of the record.

JUDSON O'D. SHEPHERD.

REFERENCES CITED

The following references are of record in the file of this patent:

UNITED STATES PATENTS

| Number | Name | Date |
|---|---|---|
| 1,927,556 | Nelson | Sept. 19, 1933 |
| 1,962,619 | Rumpf | June 12, 1934 |
| 2,112,951 | Carpenter et al. | Apr. 5, 1938 |
| 2,165,924 | Goodrum | July 11, 1939 |
| 2,165,925 | Goodrum | July 11, 1939 |
| 2,204,957 | Carpenter et al. | June 18, 1940 |
| 2,246,499 | Marshall et al. | June 17, 1941 |
| 2,247,905 | Bryce | July 1, 1941 |
| 2,253,998 | Beerman et al. | Aug. 26, 1941 |
| 2,258,106 | Bryce | Oct. 7, 1941 |
| 2,268,203 | Carpenter et al. | Dec. 30, 1941 |
| 2,297,365 | Ostline | Sept. 29, 1942 |
| 2,386,763 | Williams | Oct. 16, 1945 |
| 2,402,700 | Williams | June 25, 1946 |
| 2,466,186 | Thompson | Apr. 5, 1949 |

FOREIGN PATENTS

| Number | Country | Date |
|---|---|---|
| 264,186 | Great Britain | Jan. 10, 1927 |
| 329,775 | Great Britain | May 29, 1930 |